US012685315B2

(12) United States Patent     (10) Patent No.:   US 12,685,315 B2

Fabri et al.     (45) Date of Patent:     Jul. 21, 2026

(54) HERBICIDAL COMBINATION

(71) Applicants: UPL do Brasil Industria e Comercio de Insumos Agropecuarios S.A., Ituverava (BR); UPL Corporation Limited, Port Louis (MU)

(72) Inventors: Carlos Eduardo Fabri, Port Louis (MU); Rafael Henriq Pereira, Port Louis (MU); Ferdinando Silva, Port Louis (MU)

(73) Assignees: UPL DO BRASIL INDUSTRIA E COMERCIO DE INSUMOS AGROPECUARIOS S.A., Ituverava (BR); UPL CORPORATION LIMITED, Port Louis (MU)

( * ) Notice: Subject to any disclaimer, the term of this patent is extended or adjusted under 35 U.S.C. 154(b) by 570 days.

(21) Appl. No.: 17/632,567

(22) PCT Filed: Aug. 6, 2020

(86) PCT No.: PCT/IB2020/057441

§ 371 (c)(1),
(2) Date: Feb. 3, 2022

(87) PCT Pub. No.: WO2021/024221

PCT Pub. Date: Feb. 11, 2021

(65) Prior Publication Data

US 2022/0272979 A1     Sep. 1, 2022

(30) Foreign Application Priority Data

Aug. 6, 2019   (IN) .............................. 201911031874

(51) Int. Cl.

| | |
|---|---|
| *A01N 43/653* | (2006.01) |
| *A01N 43/70* | (2006.01) |
| *A01N 43/80* | (2006.01) |
| *A01N 43/88* | (2006.01) |
| *A01N 47/30* | (2006.01) |
| *A01N 47/36* | (2006.01) |
| *A01N 47/38* | (2006.01) |

(52) U.S. Cl.

CPC ........... *A01N 43/653* (2013.01); *A01N 43/70* (2013.01); *A01N 43/80* (2013.01); *A01N 43/88* (2013.01); *A01N 47/30* (2013.01); *A01N 47/36* (2013.01); *A01N 47/38* (2013.01)

(58) Field of Classification Search

None

See application file for complete search history.

(56) References Cited

U.S. PATENT DOCUMENTS

| | | | |
|---|---|---|---|
| 4,315,767 A | 2/1982 | Wolf | |
| 8,785,351 B2 | 7/2014 | Mann et al. | |
| 2005/0026782 A1 | 2/2005 | Hacker et al. | |
| 2010/0311589 A1* | 12/2010 | Nakatani | A01N 43/80 |
| | | | 504/134 |
| 2012/0190547 A1 | 7/2012 | Liu | |
| 2020/0146291 A1 | 5/2020 | Delsantro et al. | |
| 2021/0137117 A1 | 5/2021 | Menne et al. | |
| 2023/0117137 A1 | 4/2023 | Saini et al. | |

FOREIGN PATENT DOCUMENTS

| | | |
|---|---|---|
| CN | 101642122 A | 2/2010 |
| CN | 101953373 A | 1/2011 |
| CN | 102524278 A | 7/2012 |
| CN | 103283779 B | 9/2014 |
| CN | 108849930 A | 11/2018 |
| CN | 112514905 A | 3/2021 |
| GB | 2562072 A | 11/2018 |
| JP | 2018104337 A | 7/2018 |
| WO | 2009153246 A2 | 12/2009 |
| WO | 2021024221 A1 | 2/2021 |

OTHER PUBLICATIONS

Colby, S.; "Calculating Synergistic and Antagonistic Responses of Herbicide Combinations"; Weeds, vol. 15, Issue No. 1; 1967; pp. 20-22.

International Search Report and Written Opinion for International Application PCT/IB2020/07441; International Filing Date: Aug. 6, 2020; Date of Mailing: Jan. 11, 2021; 13 pages.

First Examination Report for India Application No. 202121044726; Date of Mailing: Apr. 8, 2024, 8 pages.

* cited by examiner

*Primary Examiner* — Ali Soroush

*Assistant Examiner* — Afua Bamfoaa Boateng

(74) *Attorney, Agent, or Firm* — CANTOR COLBURN LLP

(57) ABSTRACT

The present invention relates to combinations of herbicides for controlling harmful undesirable plants. The present invention more specifically relates to a synergistic combination of herbicides, compositions and use of this composition for the preparation of a herbicide product and the method of application of said composition for combating weeds.

9 Claims, No Drawings

HERBICIDAL COMBINATION

CROSS REFERENCE TO RELATED APPLICATIONS

This application is a National Stage application of PCT/IB2020/057441, filed Aug. 6, 2020, which claims priority to Indian Patent Application number 201911031874, filed Aug. 6, 2019, both of which are incorporated by reference in their entirety herein.

FIELD OF INVENTION

The present invention relates to combinations of herbicides for controlling harmful undesirable plants. The present invention more specifically relates to a synergistic combination of herbicides.

BACKGROUND OF THE INVENTION

Weeds are undesirable plants that can severely damage yield in crops. Farmers usually control these plants at the pre-plant stage as well as after sowing. Modern herbicides are used to either control or suppress these undesirable plants so as to allow sown crops a greater share of nutrient.

Current practices include combining herbicides with varied modes of action, which allows for broader spectrum of control and resistance management. However, the combinations currently known are not sufficient to control the resistant and persistent weeds. Growers increasingly face complex weed situations that may not be controlled with just one herbicide.

Combinations of herbicides are used to control a broader range of weeds. However, the combination of herbicides may not always result in the desired effect. Combination of herbicides may lead to an additive effect or an antagonistic effect. It may also result in phytotoxicity to the crops making it an undesirable combination. Agronomists must therefore carefully select the herbicides that can be combined to offer a synergistic effect that would control weeds while having no phytotoxic effect on the crop, and reduce the chances of development of herbicide resistant weeds.

U.S. Pat. No. 8,785,351 discloses a combination comprising bentazon, an ALS inhibitor and an ACCase inhibitor. Sulfonylureas are indicated as potential long list of ALS inhibitors, while some PPO inhibitors are merely indicated as a possible additional herbicide, amongst an equally large number of herbicides. This disclosure is generic and does not provide guidance towards the present combinations.

There is therefore a need in the art for combinations that have advantageous properties such as a herbicidal combination that is synergistic, helps in resistance management, reduces dosage of herbicides used thus causing minimal damage to the environment, and a herbicidal combination that has excellent residual effects.

Embodiments of the present invention may therefore ameliorate one or more of the above-mentioned problems:

SUMMARY OF THE INVENTION

Therefore, in one aspect, the present invention may provide a herbicidal combination comprising:
  (a) at least one triazolone herbicide selected from ami-carbazone, bencarbazone, carfentrazone, flucarbazone, ipfencarbazone, propoxycarbazone, sulfentrazone, or thiencarbazone;

(b) at least one photosystem II inhibitor selected from the group consisting of (i) a phenylcarbamate herbicide; (ii) a triazine herbicide; (iii) a triazinone herbicide; (iv) an uracil herbicide; (v) a benthiadiazole herbicide; (vi) a nitrile herbicide; and (vii) an urea herbicide; and
  (c) at least a third herbicide selected from a 4-(4-hydroxy-phenyl-pyruvate dioxygenase) HPPD inhibitor, bleaching inhibitor, cell division inhibitor, PPO inhibitor, ALS inhibitor, microtubule assembly inhibitor, or a cellulose biosynthesis inhibitor.

In another aspect, the present invention may provide a method of controlling weeds at a locus, said method comprising applying to the locus a herbicidal combination comprising:
  (a) at least one triazolone herbicide selected from ami-carbazone, bencarbazone, carfentrazone, flucarbazone, ipfencarbazone, propoxycarbazone, sulfentrazone, or thiencarbazone;
  (b) at least a photosystem II inhibitor selected from the group consisting of (i) a phenylcarbamate herbicide; (ii) a triazine herbicide; (iii) a triazinone herbicide; (iv) an uracil herbicide; (v) a benthiadiazole herbicide; (vi) a nitrile herbicide; and (vii) an urea herbicide; and
  (c) at least a third herbicide selected from a 4-(4-hydroxy-phenyl-pyruvate dioxygenase) HPPD inhibitor, bleaching inhibitor, cell division inhibitor, PPO inhibitor, ALS inhibitor, microtubule assembly inhibitor, or a cellulose biosynthesis inhibitor.

In an aspect, the present invention may provide a herbicidal composition comprising:
  (a) at least one triazolone herbicide selected from ami-carbazone, bencarbazone, carfentrazone, flucarbazone, ipfencarbazone, propoxycarbazone, sulfentrazone, or thiencarbazone;
  (b) at least a photosystem II inhibitor selected from the group consisting of (i) a phenylcarbamate herbicide; (ii) a triazine herbicide; (iii) a triazinone herbicide; (iv) an uracil herbicide; (v) a benthiadiazole herbicide; (vi) a nitrile herbicide; and (vii) an urea herbicide;
  (c) at least a third herbicide selected from a 4-(4-hydroxy-phenyl-pyruvate dioxygenase) HPPD inhibitor, bleaching inhibitor, cell division inhibitor, PPO inhibitor, ALS inhibitor, microtubule assembly inhibitor, or a cellulose biosynthesis inhibitor; and
  (d) at least one agrochemically acceptable excipient.

Yet another aspect of the present invention may provide a method of increasing yield in a crop, said method comprising applying, to the crop, a combination comprising:
  (a) at least one triazolone herbicide selected from ami-carbazone, bencarbazone, carfentrazone, flucarbazone, ipfencarbazone, propoxycarbazone, sulfentrazone, or thiencarbazone;
  (b) at least a photosystem II inhibitor selected from the group consisting of (i) a phenylcarbamate herbicide; (ii) a triazine herbicide; (iii) a triazinone herbicide; (iv) an uracil herbicide; (v) a benthiadiazole herbicide; (vi) a nitrile herbicide; and (vii) an urea herbicide; and
  (c) at least a third herbicide selected from a 4-(4-hydroxy-phenyl-pyruvate dioxygenase) HPPD inhibitor, bleaching inhibitor, cell division inhibitor, PPO inhibitor, ALS inhibitor, microtubule assembly inhibitor, or a cellulose biosynthesis inhibitor.

Another aspect of the present invention may provide a method of improving the plant health, said method comprising, applying to the plant or to the locus at which said plant is growing or intended to grow, a combination comprising:

(a) at least one triazolone herbicide selected from amicarbazone, bencarbazone, carfentrazone, flucarbazone, ipfencarbazone, propoxycarbazone, sulfentrazone, or thiencarbazone;

(b) at least a photosystem II inhibitor selected from the group consisting of (i) a phenylcarbamate herbicide; (ii) a triazine herbicide; (iii) a triazinone herbicide; (iv) an uracil herbicide; (v) a benthiadiazole herbicide; (vi) a nitrile herbicide; and (vii) an urea herbicide; and (c) at least a third herbicide selected from a 4-(4-hydroxyphenyl-pyruvate dioxygenase) HPPD inhibitor, bleaching inhibitor, cell division inhibitor, PPO inhibitor, ALS inhibitor, microtubule assembly inhibitor, or a cellulose biosynthesis inhibitor.

DETAILED DESCRIPTION OF THE INVENTION

The term herbicide, as used herein, shall mean an active ingredient that kills, controls or otherwise adversely modifies the growth of weeds. As used herein, a herbicidally effective or vegetation controlling amount is an amount of active ingredient that causes a "herbicidal effect," i.e., an adversely modifying effect and includes deviations from natural development, killing, regulation, desiccation, retardation. The terms "plants" and "vegetation" include, but are not limited to, germinant seeds, emerging seedlings, plants emerging from vegetative propagules, and established vegetation. The term "locus" as used herein shall denote the vicinity of a desired crop in which weed control, typically selective weed control, of weeds is desired. The locus includes the vicinity of desired crop plants wherein the weed infestation has either emerged or is yet to emerge. The term crop shall include a multitude of desired crop plants or an individual crop plant growing at a locus.

In any aspect or embodiment described hereinbelow, the phrase comprising may be replaced by the phrases "consisting of" or "consisting essentially of" or "consisting essentially of". In these aspects or embodiment, the combination or composition described includes or comprises or consists of or consists essentially of or consists substantially of the specific components recited therein, to the exclusion of other fungicides or insecticide or herbicides or plant growth promoting agents or adjuvants or excipients not specifically recited therein.

The term synergy: in general, this can be defined as a combination of two elements such that the result of this combination is greater than the sum of the results that these elements would have separately. It is an unexpected result only achieved by bringing the components into contact, and therefore it is not possible to predict, infer or suggest. The term Plants: includes germinating seeds, cuttings, emerging seedlings and established vegetation, including roots and portions above the ground, for example leaves, stems, flowers, fruits, branches, limbs, roots and the like. The term, plant of agricultural interest: should be understood as any type of plant intended for commercial consumption, and may be of the edible or inedible plant type, floral or non-floral, trees, grasses [couch grass, herbs or grass]. The term Weeds: according to Lorenzi (2014) this is any plant that grows where it is not desired, interfering directly and indirectly in the crops of interest, causing significant reductions in the overall productivity of these crops. The term, biotic factors: this can be understood as the sum of all the effects caused by the organisms in an ecosystem, which condition the populations that form it, and for the present invention the organisms are understood to be weeds. The term, agrochemicals: also known as insecticides, pesticides, biocides, plant pharmaceuticals or plant sanitary products are generic terms for the various chemicals used in agriculture.

The present inventors have surprisingly found that the efficacy of a triazolinone herbicide is synergistically potentiated by the presence of at least another photo system II inhibitor and a third non-specific herbicide.

Without wishing to be bound by theory, the present inventors believe that the triazolinone herbicide inhibits protoporphyrinogen oxidase (PPG oxidase or Protox), an enzyme of chlorophyll and heme biosynthesis catalyzing the oxidation of protoporphyrinogen IX (PPGIX) to protoporphyrin IX (PPIX). Protox inhibition leads to accumulation of PPIX, the first light-absorbing chlorophyll precursor. Light absorption by PPIX apparently produces triplet state PPIX which interacts with ground state oxygen to form singlet oxygen. Both triplet PPIX and singlet oxygen can abstract hydrogen from unsaturated lipids, producing a lipid radical and initiating a chain reaction of lipid peroxidation. Lipids and proteins are attacked and oxidized, resulting in loss of chlorophyll and carotenoids and in leaky membranes which allows cells and cell organelles to dry and disintegrate rapidly (Duke 1991).

This activity is synergistically enhanced by the presence of at least two other herbicides apart from the triazolone herbicide, at least one of which leads to the formation of triplet chlorophyll and singlet oxygen thus potentiating the first route of herbicidal action, while the third herbicide is non-specific and synergizes the single oxygen mode of herbicidal activity by at least another route.

Thus, the second herbicide of the combination is a photosystem II inhibitor that inhibits photosynthesis by binding to the QB-binding niche on the D1 protein of the photosystem II complex in chloroplast thylakoid membranes. Inability to reoxidize QA promotes the formation of triplet state chlorophyll which interacts with ground state oxygen to form singlet oxygen.

Both triplet chlorophyll and singlet oxygen can abstract hydrogen from unsaturated lipids, producing a lipid radical and initiating a chain reaction of lipid peroxidation, thus simultaneously synergistically potentiating the triazolinone herbicide activity. Lipids and proteins are attacked and oxidized, resulting in loss of chlorophyll and carotenoids and in leaky membranes which allow cells and cell organelles to dry and disintegrate rapidly.

The third herbicide mode of action of the present combination is a 4-HPPD inhibitor, bleaching inhibitor, cell division inhibitor, PPO inhibitor, ALS inhibitor, microtubule assembly inhibitor, or a cellulose biosynthesis inhibitor.

Therefore, in an aspect, the present invention provides a herbicidal combination comprising:

(a) at least one triazolone herbicide selected from amicarbazone, bencarbazone, carfentrazone, flucarbazone, ipfencarbazone, propoxycarbazone, sulfentrazone, or thiencarbazone;

(b) at least a photosystem II inhibitor as second herbicide selected from the group consisting of (i) a phenylcarbamate herbicide; (ii) a triazine herbicide; (iii) a triazinone herbicide; (iv) an uracil herbicide; (v) a benthiadiazole herbicide; (vi) a nitrile herbicide; and an urea herbicide; and (c) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the triazolone herbicides exhibit ALS inhibitory activity as well, which is further synergistically potentiated when the second herbicide is a photosystem II inhibitor, and wherein the third herbicide is a further ALS inhibitor.

In an embodiment, the triazolone herbicide is amicarbazone.

In an embodiment, the triazolone herbicide is bencarbazone.

In an embodiment, the triazolone herbicide is carfentrazone.

In an embodiment, the triazolone herbicide is flucarbazone.

In an embodiment, the triazolone herbicide is ipfencarbazone.

In an embodiment, the triazolone herbicide is sulfentrazone.

According to an embodiment, the present invention provides a herbicidal combination comprising:
  (a) at least one triazolone herbicide;
  (b) at least a photo system II inhibitor selected from the group consisting of
    (i) a phenyl-carbamate herbicide;
    (ii) a triazine herbicide;
    (iii) a triazinone herbicide;
    (iv) an uracil herbicide;
    (v) a benthiadiazole herbicide;
    (vi) a nitrile herbicide; and
    (vii) an urea herbicide;
  and
  (c) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the herbicidal combinations of the present invention comprise one herbicide from these three classes of herbicides.

In an embodiment the herbicidal combinations of the present invention further comprise at least one safener.

In an embodiment, the crop safeners for herbicides can be classified chemically in the following groups:
  1) naphthopyranones
  2) dichloroacetamides
  3) dichloromethyl acetals and ketals 4) oxime ethers
  5) derivatives of 2,4-disubstituted 5-thiazolecarboxylates
  6) substituted phenyl pyrimidines
  7) substituted phenyl pyrazoles
  8) quinolyloxycarboxylic acid esters
  9) thiolcarbamates
  10) diaryl ketones
  11) haloalkylarylsulfones.

In an embodiment the safener can be selected from the group comprising isoxadifen-ethyl, cloquintocet-mexyl, mefenpyr-diethyl, naphthalic anhydride, oxabetrinil, benzenesulfonamide, N-(aminocarbonyl)-2-chlorobenzenesulfonamide (2-CBSU), daimuron, dichloroacetamide, dicyclonon, fenchlorazole-ethyl, fenclorim, fluxofenim, Dichloroacetamide safeners (e.g., AD-67, benoxacor, dichlormid, and furilazole), naphthopyranone, naphthalic anhydride (NA), oxime, phenylpyrimidine, phenylurea, phenyl pyrazoles compounds, naphthalic anhydride, cyometrinil, flurazole, dimepiperate, methoxyphenone, cloquintocet-mexyl (CGA-185072), 1-dichloroacetylhexahydro-3,3,8α-trimethylpyrrolo[1,2-α]pyrimidin-6-(2H-one) (BAS-145138), dichloromethyl-1,3-dioxolane (MG-191), quinolinyloxyacetate compounds, or agriculturally acceptable salts, esters, or mixtures thereof.

In another embodiment, the present invention provides a the herbicidal composition comprising:
  (a) at least one triazolone herbicide selected from amicarbazone, bencarbazone, carfentrazone, flucarbazone, ipfencarbazone, propoxycarbazone, sulfentrazone, or thiencarbazone;
  (b) at least a photosystem II inhibitor selected from the group consisting of
    (i) a phenylcarbamate herbicide;
    (ii) a triazine herbicide;
    (iii) a triazinone herbicide;
    (iv) an uracil herbicide;
    (v) a benthiadiazole herbicide;
    (vi) a nitrile herbicide; and
    (vii) an urea herbicide;
  and
  (c) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor; and
  (d) at least one agrochemically acceptable excipient.

In another aspect, the present invention may provide a method of controlling weeds at a locus, said method comprising applying the combination of the present invention to the locus.

Thus, in this aspect, the present invention may provide a method of controlling weeds at a locus, said method comprising applying, to the locus, a combination comprising:
  (a) at least one triazolone herbicide;
  (b) at least a photo system II inhibitor selected from the group consisting of
    (i) a phenylcarbamate herbicide;
    (ii) a triazine herbicide;
    (iii) a triazinone herbicide;
    (iv) an uracil herbicide;
    (v) a benthiadiazole herbicide;
    (vi) a nitrile herbicide; and
    (vii) an urea herbicide;
  and
  (c) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In another aspect, the present invention provides a method for increasing yield in a crop by applying any combination of the present invention.

Yet another aspect of the present invention may provide a method of increasing yield in a crop by application of a combination comprising:
  (a) at least one triazolone herbicide;
  (b) at least a photo system II inhibitor selected from the group consisting of
    (i) a phenylcarbamate herbicide;
    (ii) a triazine herbicide;
    (iii) a triazinone herbicide;
    (iv) an uracil herbicide;
    (v) a benthiadiazole herbicide;
    (vi) a nitrile herbicide; and
    (vii) an urea herbicide;
  and
  (c) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In another aspect, the present invention may provide a method of improving the plant health using any combination of the present invention.

Another aspect of the present invention may provide a method of improving the plant health, said method comprising applying, at the locus of the plant, a combination comprising:

(a) at least one triazolone herbicide;

(b) at least a photo system II inhibitor selected from the group consisting of
   (i) a phenylcarbamate herbicide;
   (ii) a triazine herbicide;
   (iii) a triazinone herbicide;
   (iv) an uracil herbicide;
   (v) a benthiadiazole herbicide;
   (vi) a nitrile herbicide; and
   (vii) an urea herbicide;
and (c) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the herbicidal combinations of the present invention comprise one herbicide from these three classes of herbicides.

In an embodiment, the photosystem II inhibitor is a phenylcarbamate herbicide.

In an embodiment, the phenylcarbamate herbicide is selected from the group consisting of barban, BCPC, carbasulam, carbetamide, CEPC, chlorbufam, chlorpropham, CPPC, desmedipham, phenisopham, phenmedipham, phenmedipham-ethyl, propham and swep.

In an embodiment, the phenylcarbamate herbicide is selected from the group consisting of chlorpropham, desmedipham, phenmedipham, and phenmedipham-ethyl.

In an embodiment, the phenylcarbamate herbicide is chlorpropham.

In an embodiment, the phenylcarbamate herbicide is desmedipham.

In an embodiment, the phenylcarbamate herbicide is phenmedipham.

In an embodiment, the phenylcarbamate herbicide is phenmedipham-ethyl.

In an embodiment, the photosystem II inhibitor is a triazine herbicide.

In an embodiment, the triazine herbicide is selected from the group consisting of dipropetryn, fucaojing, trihydroxytriazine, atrazine, chlorazine, cyanazine, cyprazine, eglinazine, ipazine, mesoprazine, procyazine, proglinazine, propazine, sebuthylazine, simazine, terbuthylazine, trietazine, indaziflam, triaziflam, atraton, methometon, prometon, secbumeton, simeton, terbumeton, ametryn, aziprotryne, cyanatryn, desmetryn, dimethametryn, methoprotryne, propmetryn, simetryn, and terbutryn.

In an embodiment, the triazine herbicide is atrazine.

In an embodiment, the triazine herbicide is ametryn.

In an embodiment, the photosystem II inhibitor is a triazinone herbicide.

In an embodiment, the triazinone herbicide is selected from the group consisting of ametridione, amibuzin, ethiozin, hexazinone, isomethiozin, metamitron, metribuzin and trifludimoxazin.

In an embodiment, the triazinone herbicide is hexazinone.

In an embodiment, the triazinone herbicide is metamitron.

In an embodiment, the triazinone herbicide is metribuzin.

In an embodiment, the photosystem II inhibitor is a uracil herbicide.

In an embodiment, the uracil herbicide is selected from the group consisting of benzfendizone, bromacil, butafenacil, flupropacil, isocil, lenacil, saflufenacil, terbacil and tiafenacil.

In an embodiment, the uracil herbicide is bromacil.

In an embodiment, the uracil herbicide is saflufenacil.

In an embodiment, the photosystem II inhibitor is a benzothiazole herbicide or a benzothiadiazole herbicide.

In an embodiment, the benzothiazole herbicide is selected from the group consisting of benazolin, benzthiazuron, fenthiaprop, mefenacet, and methabenzthiazuron.

In an embodiment, the photosystem II inhibitor is a benzothiadiazole herbicide.

In an embodiment, the benzothiadiazole herbicide is bentazone or bentazone-sodium.

In an embodiment, the photosystem II inhibitor is a nitrile herbicide.

In an embodiment, the nitrile herbicide is selected from the group consisting of bromobonil, bromoxynil, chloroxynil, cyclopyranil, dichlobenil, iodobenil, ioxynil and pyraclonil.

In an embodiment, the nitrile herbicide is bromoxynil.

In an embodiment, the photosystem II inhibitor is a urea herbicide.

In an embodiment, the urea herbicide is a phenylurea herbicide.

In an embodiment, the phenylurea herbicide is selected from the group consisting of anisuron, buturon, chlorbromuron, chloreturon, chlorotoluron, chloroxuron, daimuron, difenoxuron, dimefuron, diruon, fenuron, fluometuron, fluothiuron, isoproturon, linuron, methiruon, methyldymuron, metobenzuron, metobromuron, metoxuron, monolinuron, monuron, neburon, parafluron, phenobenzuron, siduron, tetrafluron, and thidiazuron.

In an embodiment, the phenylurea herbicide is diruon.

In an embodiment, the phenylurea herbicide is linuron.

In an embodiment, the photosystem II inhibitor is selected from the group consisting of chlorpropham, desmedipham, phenmedipham, phenmedipham-ethyl, atrazine, hexazinone, metamitron, metribuzin, bromacil, saflufenacil, bentazone, bentazone-sodium, bromoxynil, diruon, and linuron.

In an embodiment, the third herbicide is selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment 4-HPPD inhibitor is selected from a group comprising isoxazole, pyrazolone and triketone or callistemone herbicides.

In an embodiment 4-HPPD inhibitor is an isoxazole herbicide.

In an embodiment 4-HPPD inhibitor is a pyrazolone herbicide.

In an embodiment 4-HPPD inhibitor is a triketone herbicide.

In an embodiment 4-HPPD inhibitor is a callistemone herbicide.

In an embodiment 4-HPPD inhibitor is selected from benzobicyclon, benzofenap, bicyclopyrone, fenquinotrione, isoxachlortole, isoxaflutole, mesotrione, pyrasulfotole, pyrazolynate, pyrazoxyfen, sulcotrione, tefuryltrione, tembotrione, tolpyralate, topramezone.

In an embodiment 4-HPPD inhibitor is fenquinotrione.

In an embodiment 4-HPPD inhibitor is mesotrione.

In an embodiment 4-HPPD inhibitor is sulcotrione.

In an embodiment 4-HPPD inhibitor is tembotrione.

In an embodiment 4-HPPD inhibitor is topramezone.

In an embodiment, PPO inhibitor is selected from diphenylether, N-phenylphthalimide, Phenylpyrazole Oxadiazole, Thiadiazole, triazolinone, Oxazolidinedione and pyrimidinedione herbicides.

In an embodiment, PPO inhibitor is diphenylether.

In an embodiment, PPO inhibitor is N-phenylphthalimide.

In an embodiment, PPO inhibitor is aryl triazoinone.

In an embodiment, PPO inhibitor is pyrimidinedione.

In an embodiment, PPO inhibitor is selected from acifluorfen, fomesafen, lactofen, flumiclorac, flumioxazin, sulfentrazone, carfentrazone, fluthiacet-ethyl and saflufenacil, azafenidin, benzfendizone, bifenox, butafenacil, carfentrazone, carfentrazone-ethyl, chlomethoxyfen, cinidon-ethyl, fluazolate, flufenpyr-ethyl, flumiclorac-pentyl, fluoroglycofen-ethyl, fluthiacet-methyl, fomesafen, halosafen, lactofen, oxadiargyl, oxadiazon, oxyfluorfen, pentoxazone, profluazol, pyraclonil, pyraflufen-ethyl, saflufenacil, thidiazimin, trifludimoxazin and tiafenacil.

In an embodiment, microtubule assembly inhibitor is selected from benzamide, benzoic acid, dinitroaniline and pyridine herbicides.

In another embodiment, the microtubule assembly inhibitor is selected from Benzamide, Benzoic acid, Dinitroaniline, Phosphoroamidate amiprophos and Pyridine herbicides.

In an embodiment, the microtubule assembly inhibitor is selected from dinitroaniline for example benfluralin, butralin, dinitramine, benfluralin, butralin, dinitramine, trifluralin, Propyzamide, DCPA, Pendimethalin, Ethalfluralin, Oryzalin, Trifluralin, Prodiamine, Dithiopyr, Thiazopyr, or methyl butamiphos.

In another embodiment, cellulose biosynthesis inhibitor is selected from Alkylazine, Benzamide and Nitrile Triazolocarboxamide herbicides.

In an embodiment, cellulose biosynthesis inhibitor is selected from Dichlobenil, chlorthiamide, Indaziflam, Isoxaben, Dichlobenil and flupoxam.

In an embodiment cell division inhibitor is selected from chloroacetamide, acetamide, oxyacetamide and tetrazolinone herbicides.

In an embodiment cell division inhibitor is selected from acetochlor, alachlor, butachlor, dimethachlor, dimethenamid, metazachlor, metolachlor, S-metolachlor, pethoxamid, pretilachlor, propisochlor, thenylchlor, diphenamid, napropamide, D-napropamide, napropamide-M, naproanilide, flufenacet, mefenacet, fentrazamide, propachlor, anilofos, cafenstrole, piperophos, DSMA and MSMA.

In an embodiment bleaching inhibitor is selected from triazoles, triketones, isoxazoles, pyrazole, pyridazinone, pyridinecarboxamide, Isoxazolidinone, urea, diphenylether amitrole, mesotrione, sulcotrione, Isoxazoles, isoxachlortole, isoxaflutole, benzofenap, pyrazolynate, pyrazoxyfen, pyridazinone, norflurazon, pyridinecarboxamide, diflufenican, picolinafen, Isoxazolidinone, clomazone, fluometuron, aclonifen, beflubutamid, fluridone, flurochloridone, flurtamone, bromobutide (chloro)-flurenol, cinmethylin, cumyluron, dazomet, dymron, methyl-dimuron, etobenzanid, fosamine, indanofan, metam, oxaziclomefone oleic acid, pelargonic acid and pyributicarb.

In an embodiment, the ALS inhibitor is selected from the group consisting of:

(i) an imidazolinone herbicide;

(ii) a sulfonylamino-carbonyltriazolinone herbicide;

(iii) a sulfonylurea herbicide;

(iv) a pyrazole herbicide;

(v) a triazolpyramidine herbicide; and (vi) a triazolone herbicide;

In an embodiment, the ALS inhibitor herbicide is an imidazolinone herbicide.

In an embodiment, the imidazolinone herbicide is selected from the group consisting of imazamethabenz, imazamox, imazapic, imazapyr, imazaquin, and imazethapyr.

In an embodiment, the imidazolinone herbicide is imazamox.

In an embodiment, the imidazolinone herbicide is imazapic.

In an embodiment, the imidazolinone herbicide is imazapyr.

In an embodiment, the imidazolinone herbicide is imazethapyr.

In an embodiment, the ALS inhibitor is a triazolone herbicide.

In an embodiment, the triazolone herbicide is selected from the group consisting of amicarbazone, bencarbazone, carfentrazone, flucarbazone, ipfencarbazone, propoxycarbazone, sulfentrazone, and thiencarbazone.

In an embodiment, the triazolone herbicide is carfentrazone.

In an embodiment, the triazolone herbicide is flucarbazone.

In an embodiment, the triazolone herbicide is sulfentrazone.

In an embodiment, the triazolone herbicide is amicarbazone.

In an embodiment, when the selected ALS inhibitor is a triazolone herbicide, the combinations of the present invention may thus comprise at least two triazolone herbicides which are not same.

Therefore, in an embodiment, when the triazolone herbicide is amicarbazone, the selected ALS inhibitor is a triazolone herbicide other than amicarbazone.

In an embodiment, the ALS inhibitor herbicide is a sulfonylamino-carbonyltriazolinone herbicide.

In an embodiment, the sulfonylamino-carbonyltriazolinone herbicide is flucarbazone.

In an embodiment, the sulfonylamino-carbonyltriazolinone herbicide is flucarbazone-sodium.

In an embodiment, the ALS inhibitor herbicide is a sulfonylurea herbicide.

In an embodiment, the sulfonylurea herbicide is selected from the group consisting of amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, metazosulfuron, methiopyrisulfuron, monosulfuron, nicosulfuron, orthosulfamuron, oxasulfuron, primisulfuron, propyrisulfuron, pyrazosulfuron, rimsulfuron, sulfometuron, sulfosulfuron, trifloxysulfuron, zuomihuanglong, chlorsulfuron, cinosulfuron, ethametsulfuron, iodosulfuron, iofensulfuron, metsulfuron, prosulfuron, thifensulfuron, triasulfuron, tribenuron, trflusulfuron, and tritosulfuron.

In an embodiment, the sulfonylurea herbicide is bensulfuron.

In an embodiment, the sulfonylurea herbicide is halosulfuron.

In an embodiment, the sulfonylurea herbicide is pyrazosulfuron.

In an embodiment, the sulfonylurea herbicide is pyrazosulfuron ethyl.

In an embodiment, the sulfonylurea herbicide is sulfosulfuron.

In an embodiment, the sulfonylurea herbicide is trifloxysulfuron.

In an embodiment, the sulfonylurea herbicide is metsulfuron.

In an embodiment, the sulfonylurea herbicide is flazasulfuron.

In an embodiment, the ALS inhibitor herbicide is a pyrazole herbicide.

In an embodiment, the pyrazole herbicide is selected from the group consisting of azimsulfuron, cyclopyranil, difenzoquat, halosulfuron, flazasulfuron, metazachlor, metazosulfuron, pyrazosulfuron, pyrazosulfuron ethyl, pyraclonil, pyroxasulfone, benzofenap, pyrasulfotole, pyrazolynate, pyrazoxyfen, tolpyralate, topramezone, fluazolate, nipyraclofen, pinoxaden, and pyraflufen.

In an embodiment, the pyrazole herbicide is metazachlor.

In an embodiment, the pyrazole herbicide is pinoxaden.

In an embodiment, the pyrazole herbicide is pyraflufen.

In an embodiment, the ALS inhibitor herbicide is a triazolopyrimidine herbicide.

In an embodiment, the triazolopyrimidine herbicide is selected from the group consisting of chloransulam, diclosulam, florasulam, flumetsulam, metosulam, penoxsulam, and pyroxsulam.

In an embodiment, the triazolopyrimidine herbicide is diclosulam.

In an embodiment, the triazolopyrimidine herbicide is penoxsulam.

In an embodiment, the ALS inhibitor herbicide is selected from the group consisting of imazamox, imazapic, imazapyr, imazethapyr, carfentrazone, flucarbazone, sulfentrazone, flucarbazone, amicarbazone, flucarbazone-sodium, bensulfuron, halosulfuron, pyrazosulfuron, pyrazosulfuron ethyl, flazasulfuron, sulfosulfuron, trifloxysulfuron, metsulfuron, metazachlor, pinoxaden, pyraflufen, diclosulam, and penoxsulam.

In an embodiment, the triazolone herbicide, photosystem II inhibitor and the third herbicide are not same. In this embodiment, the three herbicides are selected such that the selected herbicides are different from each other.

In an embodiment, the combinations of the present invention comprise at least three different herbicides.

In an embodiment, the combinations of the present invention comprise only the three different herbicides disclosed herein. In this embodiment, any other fungicide, herbicide, insecticide, or any other agrochemical, is not present within the combinations.

In an embodiment, the present invention provides preferred combinations, compositions and methods thereof. The methods of the invention include a method of controlling weeds at a locus by applying to the locus the combination or the composition, a method of increasing yield in a crop by application of the combination or composition, or a method of improving the plant health by application at the locus of the plant the combination or the composition. The embodiments described herein describe the preferred embodiments of all these possible combinations, compositions and methods of the invention.

According to an embodiment, the present invention provides a herbicidal combination comprising:
(i) amicarbazone;
(ii) a phenyl-carbamate herbicide;
(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:

(i) amicarbazone;
(ii) a triazine herbicide;
(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:
(i) amicarbazone;
(ii) a triazinone herbicide;
(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:
(i) amicarbazone;
(ii) an uracil herbicide;
(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:
(i) amicarbazone;
(ii) a benthiadiazole herbicide;
(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:
(i) amicarbazone;
(ii) a nitrile herbicide;
(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:
(i) amicarbazone;
(ii) an urea herbicide;
(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

According to an embodiment, the present invention provides a herbicidal combination comprising:
(i) amicarbazone;
(ii) chlorpropham;
(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:
(i) amicarbazone;
(ii) desmedipham;
(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:
(i) amicarbazone;
(ii) phenmedipham;
(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:

(i) amicarbazone;

(ii) phenmedipham-ethyl;

(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:

(i) amicarbazone;

(ii) atrazine;

(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:

(i) amicarbazone;

(ii) ametryn;

(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:

(i) amicarbazone;

(ii) hexazinone;

(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:

(i) amicarbazone;

(ii) metamitron;

(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:

(i) amicarbazone;

(ii) metribuzin;

(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:

(i) amicarbazone;

(ii) bromacil;

(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:

(i) amicarbazone;

(ii) saflufenacil;

(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:

(i) amicarbazone;

(ii) bromoxynil;

(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:

(i) amicarbazone;

(ii) diruon;

(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention provides a herbicidal combination comprising:

(i) amicarbazone;

(ii) linuron;

(iii) at least a third herbicide selected from a 4-HPPD inhibitor, bleaching inhibitor, cell division inhibitor, PPO inhibitor, ALS inhibitor, microtubule assembly inhibitor, or a cellulose biosynthesis inhibitor.

In an embodiment, the herbicidal combination is preferably selected from (i) Amicarbazone+Isoxaflutole+Ametryne/Diuron/Atrazine (ii) Amicarbazone+Clomazone+Diuron (iii) Amicarbazone+S metolachlor+Ametryne/Diuron/Atrazine (iv) Amicarbazone+Sulfentrazone+Ametryne/Diuron (v) Amicarbazone+Halossulfuron-methyl+Diuron (vi) Amicarbazone+Imazapic+Ametryne/Diuron (vii) Amicarbazone+Trifloxissulfuron sodium+Diuron (viii) Amicarbazone+Pendimethalin+Ametryne/Diuron (ix) Amicarbazone+Napropamide+Ametryne/Diuron and (x) Amicarbazone+D-Napropamide+Ametryne/Diuron.

(xi) Amicarbazone+Mesotrione+Ametryne/Diuron/Atrazine (xii) Amicarbazone+Tembotrione+Ametryne/Diuron/Atrazine and (xiii) Amicarbazone+Indaziflan+Ametryne/Diuron In an embodiment, the present invention provides a herbicidal combination comprising:

(i) amicarbazone;

(ii) at least a photosystem II inhibitor and (iii) flumioxazin

In an embodiment, the present invention provides a herbicidal combination comprising:

(i) Amicarbazone (ii) Propisochlor (iii) terbuthylazine

In an embodiment, the present invention provides a herbicidal combination comprising:

(i) Amicarbazone (ii) Isoxaflutole (iii) Atrazine

In an embodiment, the present invention provides a herbicidal combination comprising:

(i) Amicarbazone (ii) Clomazone (iii) Diuron

In an embodiment, the present invention provides a herbicidal combination comprising:

(i) Amicarbazone (ii) Sulfentrazone (iii) Diuron

In an embodiment, the present invention provides a herbicidal combination comprising:

(i) Amicarbazone (ii) S-metolachlor (iii) Atrazine

In an embodiment, the present invention provides a herbicidal combination comprising:

(i) Amicarbazone (ii) Mesotrione (iii) Ametryn

In an embodiment, the present invention provides a herbicidal combination comprising:

(i) Amicarbazone (ii) Metribuzine (iii) Pyrazosulfurone ethyl

In an embodiment, each individual row appearing in the table below represents the combinations in an embodiment of the present invention.

| Triazolone Herbicide | Photosystem II Inhibitor | Third Herbicide |
| --- | --- | --- |
| Amicarbazone | Chlorpropham | Benzobicyclon |
| Amicarbazone | Chlorpropham | Benzofenap |
| Amicarbazone | Chlorpropham | Bicyclopyrone |
| Amicarbazone | Chlorpropham | Fenquinotrione |
| Amicarbazone | Chlorpropham | Isoxachlortole |
| Amicarbazone | Chlorpropham | Isoxaflutole |
| Amicarbazone | Chlorpropham | Mesotrione |
| Amicarbazone | Chlorpropham | Pyrasulfotole |
| Amicarbazone | Chlorpropham | Pyrazolynate |
| Amicarbazone | Chlorpropham | Pyrazoxyfen |
| Amicarbazone | Chlorpropham | Sulcotrione |
| Amicarbazone | Chlorpropham | Tefuryltrione |
| Amicarbazone | Chlorpropham | Tolpyralate |
| Amicarbazone | Chlorpropham | Topramezone |
| Amicarbazone | Desmedipham | Benzobicyclon |
| Amicarbazone | Desmedipham | Benzofenap |
| Amicarbazone | Desmedipham | Bicyclopyrone |
| Amicarbazone | Desmedipham | Fenquinotrione |
| Amicarbazone | Desmedipham | Isoxachlortole |
| Amicarbazone | Desmedipham | Isoxaflutole |
| Amicarbazone | Desmedipham | Mesotrione |
| Amicarbazone | Desmedipham | Pyrasulfotole |
| Amicarbazone | Desmedipham | Pyrazolynate |
| Amicarbazone | Desmedipham | Pyrazoxyfen |
| Amicarbazone | Desmedipham | Sulcotrione |
| Amicarbazone | Desmedipham | Tefuryltrione |
| Amicarbazone | Desmedipham | Tolpyralate |
| Amicarbazone | Desmedipham | Topramezone |
| Amicarbazone | Phenmedipham | Benzobicyclon |
| Amicarbazone | Phenmedipham | Benzofenap |
| Amicarbazone | Phenmedipham | Bicyclopyrone |
| Amicarbazone | Phenmedipham | Fenquinotrione |
| Amicarbazone | Phenmedipham | Isoxachlortole |
| Amicarbazone | Phenmedipham | Isoxaflutole |
| Amicarbazone | Phenmedipham | Mesotrione |
| Amicarbazone | Phenmedipham | Pyrasulfotole |
| Amicarbazone | Phenmedipham | Pyrazolynate |
| Amicarbazone | Phenmedipham | Pyrazoxyfen |
| Amicarbazone | Phenmedipham | Sulcotrione |
| Amicarbazone | Phenmedipham | Tefuryltrione |
| Amicarbazone | Phenmedipham | Tolpyralate |
| Amicarbazone | Phenmedipham | Topramezone |
| Amicarbazone | Phenmedipham-Ethyl | Benzobicyclon |
| Amicarbazone | Phenmedipham-Ethyl | Benzofenap |
| Amicarbazone | Phenmedipham-Ethyl | Bicyclopyrone |
| Amicarbazone | Phenmedipham-Ethyl | Fenquinotrione |
| Amicarbazone | Phenmedipham-Ethyl | Isoxachlortole |
| Amicarbazone | Phenmedipham-Ethyl | Isoxaflutole |
| Amicarbazone | Phenmedipham-Ethyl | Mesotrione |
| Amicarbazone | Phenmedipham-Ethyl | Pyrasulfotole |
| Amicarbazone | Phenmedipham-Ethyl | Pyrazolynate |
| Amicarbazone | Phenmedipham-Ethyl | Pyrazoxyfen |
| Amicarbazone | Phenmedipham-Ethyl | Sulcotrione |
| Amicarbazone | Phenmedipham-Ethyl | Tefuryltrione |
| Amicarbazone | Phenmedipham-Ethyl | Tolpyralate |

-continued

| Triazolone Herbicide | Photosystem II Inhibitor | Third Herbicide |
| --- | --- | --- |
| Amicarbazone | Phenmedipham-Ethyl | Topramezone |
| Amicarbazone | Atrazine | Benzobicyclon |
| Amicarbazone | Atrazine | Benzofenap |
| Amicarbazone | Atrazine | Bicyclopyrone |
| Amicarbazone | Atrazine | Fenquinotrione |
| Amicarbazone | Atrazine | Isoxachlortole |
| Amicarbazone | Atrazine | Isoxaflutole |
| Amicarbazone | Atrazine | Mesotrione |
| Amicarbazone | Atrazine | Pyrasulfotole |
| Amicarbazone | Atrazine | Pyrazolynate |
| Amicarbazone | Atrazine | Pyrazoxyfen |
| Amicarbazone | Atrazine | Sulcotrione |
| Amicarbazone | Atrazine | Tefuryltrione |
| Amicarbazone | Atrazine | Tolpyralate |
| Amicarbazone | Atrazine | Topramezone |
| Amicarbazone | Bentazon | Benzobicyclon |
| Amicarbazone | Bentazon | Benzofenap |
| Amicarbazone | Bentazon | Bicyclopyrone |
| Amicarbazone | Bentazon | Fenquinotrione |
| Amicarbazone | Bentazon | Isoxachlortole |
| Amicarbazone | Bentazon | Isoxaflutole |
| Amicarbazone | Bentazon | Mesotrione |
| Amicarbazone | Bentazon | Pyrasulfotole |
| Amicarbazone | Bentazon | Pyrazolynate |
| Amicarbazone | Bentazon | Pyrazoxyfen |
| Amicarbazone | Bentazon | Sulcotrione |
| Amicarbazone | Bentazon | Tefuryltrione |
| Amicarbazone | Bentazon | Tolpyralate |
| Amicarbazone | Bentazon | Topramezone |
| Amicarbazone | Metamitron | Benzobicyclon |
| Amicarbazone | Metamitron | Benzofenap |
| Amicarbazone | Metamitron | Bicyclopyrone |
| Amicarbazone | Metamitron | Fenquinotrione |
| Amicarbazone | Metamitron | Isoxachlortole |
| Amicarbazone | Metamitron | Isoxaflutole |
| Amicarbazone | Metamitron | Mesotrione |
| Amicarbazone | Metamitron | Pyrasulfotole |
| Amicarbazone | Metamitron | Pyrazolynate |
| Amicarbazone | Metamitron | Pyrazoxyfen |
| Amicarbazone | Metamitron | Sulcotrione |
| Amicarbazone | Metamitron | Tefuryltrione |
| Amicarbazone | Metamitron | Tolpyralate |
| Amicarbazone | Metamitron | Topramezone |
| Amicarbazone | Metribuzin | Benzobicyclon |
| Amicarbazone | Metribuzin | Benzofenap |
| Amicarbazone | Metribuzin | Bicyclopyrone |
| Amicarbazone | Metribuzin | Fenquinotrione |
| Amicarbazone | Metribuzin | Isoxachlortole |
| Amicarbazone | Metribuzin | Isoxaflutole |
| Amicarbazone | Metribuzin | Mesotrione |
| Amicarbazone | Metribuzin | Pyrasulfotole |
| Amicarbazone | Metribuzin | Pyrazolynate |
| Amicarbazone | Metribuzin | Pyrazoxyfen |
| Amicarbazone | Metribuzin | Sulcotrione |
| Amicarbazone | Metribuzin | Tefuryltrione |
| Amicarbazone | Metribuzin | Tolpyralate |
| Amicarbazone | Metribuzin | Topramezone |
| Amicarbazone | Diuron | Benzobicyclon |
| Amicarbazone | Diuron | Benzofenap |
| Amicarbazone | Diuron | Bicyclopyrone |
| Amicarbazone | Diuron | Fenquinotrione |
| Amicarbazone | Diuron | Isoxachlortole |
| Amicarbazone | Diuron | Isoxaflutole |
| Amicarbazone | Diuron | Mesotrione |
| Amicarbazone | Diuron | Pyrasulfotole |
| Amicarbazone | Diuron | Pyrazolynate |
| Amicarbazone | Diuron | Pyrazoxyfen |
| Amicarbazone | Diuron | Sulcotrione |
| Amicarbazone | Diuron | Tefuryltrione |
| Amicarbazone | Diuron | Tolpyralate |
| Amicarbazone | Diuron | Topramezone |
| Amicarbazone | Linuron | Benzobicyclon |
| Amicarbazone | Linuron | Benzofenap |
| Amicarbazone | Linuron | Bicyclopyrone |
| Amicarbazone | Linuron | Fenquinotrione |
| Amicarbazone | Linuron | Isoxachlortole |

-continued

| Triazolone Herbicide | Photosystem II Inhibitor | Third Herbicide |
|---|---|---|
| Amicarbazone | Linuron | Isoxaflutole |
| Amicarbazone | Linuron | Mesotrione |
| Amicarbazone | Linuron | Pyrasulfotole |
| Amicarbazone | Linuron | Pyrazolynate |
| Amicarbazone | Linuron | Pyrazoxyfen |
| Amicarbazone | Linuron | Sulcotrione |
| Amicarbazone | Linuron | Tefuryltrione |
| Amicarbazone | Linuron | Tolpyralate |
| Amicarbazone | Linuron | Topramezone |
| Amicarbazone | Chlorpropham | Amitrole |
| Amicarbazone | Chlorpropham | Mesotrione |
| Amicarbazone | Chlorpropham | Sulcotrione |
| Amicarbazone | Chlorpropham | Isoxachlortole |
| Amicarbazone | Chlorpropham | Isoxaflutole |
| Amicarbazone | Chlorpropham | Benzofenap |
| Amicarbazone | Chlorpropham | Pyrazolynate |
| Amicarbazone | Chlorpropham | Pyrazoxyfen |
| Amicarbazone | Chlorpropham | Norflurazon |
| Amicarbazone | Chlorpropham | Diflufenican |
| Amicarbazone | Chlorpropham | Picolinafen |
| Amicarbazone | Chlorpropham | Clomazone |
| Amicarbazone | Chlorpropham | Fluometuron |
| Amicarbazone | Chlorpropham | Aclonifen |
| Amicarbazone | Desmedipham | Amitrole |
| Amicarbazone | Desmedipham | Mesotrione |
| Amicarbazone | Desmedipham | Sulcotrione |
| Amicarbazone | Desmedipham | Isoxachlortole |
| Amicarbazone | Desmedipham | Isoxaflutole |
| Amicarbazone | Desmedipham | Benzofenap |
| Amicarbazone | Desmedipham | Pyrazolynate |
| Amicarbazone | Desmedipham | Pyrazoxyfen |
| Amicarbazone | Desmedipham | Norflurazon |
| Amicarbazone | Desmedipham | Diflufenican |
| Amicarbazone | Desmedipham | Picolinafen |
| Amicarbazone | Desmedipham | Clomazone |
| Amicarbazone | Desmedipham | Fluometuron |
| Amicarbazone | Desmedipham | Aclonifen |
| Amicarbazone | Phenmedipham | Amitrole |
| Amicarbazone | Phenmedipham | Mesotrione |
| Amicarbazone | Phenmedipham | Sulcotrione |
| Amicarbazone | Phenmedipham | Isoxachlortole |
| Amicarbazone | Phenmedipham | Isoxaflutole |
| Amicarbazone | Phenmedipham | Benzofenap |
| Amicarbazone | Phenmedipham | Pyrazolynate |
| Amicarbazone | Phenmedipham | Pyrazoxyfen |
| Amicarbazone | Phenmedipham | Norflurazon |
| Amicarbazone | Phenmedipham | Diflufenican |
| Amicarbazone | Phenmedipham | Picolinafen |
| Amicarbazone | Phenmedipham | Clomazone |
| Amicarbazone | Phenmedipham | Fluometuron |
| Amicarbazone | Phenmedipham | Aclonifen |
| Amicarbazone | Phenmedipham-Ethyl | Amitrole |
| Amicarbazone | Phenmedipham-Ethyl | Mesotrione |
| Amicarbazone | Phenmedipham-Ethyl | Sulcotrione |
| Amicarbazone | Phenmedipham-Ethyl | Isoxachlortole |
| Amicarbazone | Phenmedipham-Ethyl | Isoxaflutole |
| Amicarbazone | Phenmedipham-Ethyl | Benzofenap |
| Amicarbazone | Phenmedipham-Ethyl | Pyrazolynate |
| Amicarbazone | Phenmedipham-Ethyl | Pyrazoxyfen |
| Amicarbazone | Phenmedipham-Ethyl | Norflurazon |
| Amicarbazone | Phenmedipham-Ethyl | Diflufenican |
| Amicarbazone | Phenmedipham-Ethyl | Picolinafen |
| Amicarbazone | Phenmedipham-Ethyl | Clomazone |
| Amicarbazone | Phenmedipham-Ethyl | Fluometuron |
| Amicarbazone | Phenmedipham-Ethyl | Aclonifen |
| Amicarbazone | Atrazine | Amitrole |
| Amicarbazone | Atrazine | Mesotrione |
| Amicarbazone | Atrazine | Sulcotrione |
| Amicarbazone | Atrazine | Isoxachlortole |
| Amicarbazone | Atrazine | Isoxaflutole |
| Amicarbazone | Atrazine | Benzofenap |
| Amicarbazone | Atrazine | Pyrazolynate |
| Amicarbazone | Atrazine | Pyrazoxyfen |
| Amicarbazone | Atrazine | Norflurazon |
| Amicarbazone | Atrazine | Diflufenican |
| Amicarbazone | Atrazine | Picolinafen |
| Amicarbazone | Atrazine | Clomazone |

-continued

| Triazolone Herbicide | Photosystem II Inhibitor | Third Herbicide |
|---|---|---|
| Amicarbazone | Atrazine | Fluometuron |
| Amicarbazone | Atrazine | Aclonifen |
| Amicarbazone | Bentazon | Amitrole |
| Amicarbazone | Bentazon | Mesotrione |
| Amicarbazone | Bentazon | Sulcotrione |
| Amicarbazone | Bentazon | Isoxachlortole |
| Amicarbazone | Bentazon | Isoxaflutole |
| Amicarbazone | Bentazon | Benzofenap |
| Amicarbazone | Bentazon | Pyrazolynate |
| Amicarbazone | Bentazon | Pyrazoxyfen |
| Amicarbazone | Bentazon | Norflurazon |
| Amicarbazone | Bentazon | Diflufenican |
| Amicarbazone | Bentazon | Picolinafen |
| Amicarbazone | Bentazon | Clomazone |
| Amicarbazone | Bentazon | Fluometuron |
| Amicarbazone | Bentazon | Aclonifen |
| Amicarbazone | Metamitron | Amitrole |
| Amicarbazone | Metamitron | Mesotrione |
| Amicarbazone | Metamitron | Sulcotrione |
| Amicarbazone | Metamitron | Isoxachlortole |
| Amicarbazone | Metamitron | Isoxaflutole |
| Amicarbazone | Metamitron | Benzofenap |
| Amicarbazone | Metamitron | Pyrazolynate |
| Amicarbazone | Metamitron | Pyrazoxyfen |
| Amicarbazone | Metamitron | Norflurazon |
| Amicarbazone | Metamitron | Diflufenican |
| Amicarbazone | Metamitron | Picolinafen |
| Amicarbazone | Metamitron | Clomazone |
| Amicarbazone | Metamitron | Fluometuron |
| Amicarbazone | Metamitron | Aclonifen |
| Amicarbazone | Metribuzin | Amitrole |
| Amicarbazone | Metribuzin | Mesotrione |
| Amicarbazone | Metribuzin | Sulcotrione |
| Amicarbazone | Metribuzin | Isoxachlortole |
| Amicarbazone | Metribuzin | Isoxaflutole |
| Amicarbazone | Metribuzin | Benzofenap |
| Amicarbazone | Metribuzin | Pyrazolynate |
| Amicarbazone | Metribuzin | Pyrazoxyfen |
| Amicarbazone | Metribuzin | Norflurazon |
| Amicarbazone | Metribuzin | Diflufenican |
| Amicarbazone | Metribuzin | Picolinafen |
| Amicarbazone | Metribuzin | Clomazone |
| Amicarbazone | Metribuzin | Fluometuron |
| Amicarbazone | Metribuzin | Aclonifen |
| Amicarbazone | Diuron | Amitrole |
| Amicarbazone | Diuron | Mesotrione |
| Amicarbazone | Diuron | Sulcotrione |
| Amicarbazone | Diuron | Isoxachlortole |
| Amicarbazone | Diuron | Isoxaflutole |
| Amicarbazone | Diuron | Benzofenap |
| Amicarbazone | Diuron | Pyrazolynate |
| Amicarbazone | Diuron | Pyrazoxyfen |
| Amicarbazone | Diuron | Norflurazon |
| Amicarbazone | Diuron | Diflufenican |
| Amicarbazone | Diuron | Picolinafen |
| Amicarbazone | Diuron | Clomaz |
| Amicarbazone | Diuron | Fluometuron |
| Amicarbazone | Diuron | Aclonifen |
| Amicarbazone | Linuron | Amitrole |
| Amicarbazone | Linuron | Mesotrione |
| Amicarbazone | Linuron | Sulcotrione |
| Amicarbazoneiso | Linuron | Isoxachlortole |
| Amicarbazone | Linuron | Isoxaflutole |
| Amicarbazone | Linuron | Benzofenap |
| Amicarbazone | Linuron | Pyrazolynate |
| Amicarbazone | Linuron | Pyrazoxyfen |
| Amicarbazone | Linuron | Norflurazon |
| Amicarbazone | Linuron | Diflufenican |
| Amicarbazone | Linuron | Picolinafen |
| Amicarbazone | Linuron | Clomazone |
| Amicarbazone | Linuron | Fluometuron |
| Amicarbazone | Linuron | Aclonifen |
| Amicarbazone | Chlorpropham | Acetochlor |
| Amicarbazone | Chlorpropham | Alachlor |
| Amicarbazone | Chlorpropham | Butachlor |
| Amicarbazone | Chlorpropham | Dimethachlor |
| Amicarbazone | Chlorpropham | Dimethanamid |

-continued

-continued

| Triazolone Herbicide | Photosystem II Inhibitor | Third Herbicide |
| --- | --- | --- |
| Amicarbazone | Chlorpropham | Metazachlor |
| Amicarbazone | Chlorpropham | Metolachlor |
| Amicarbazone | Chlorpropham | Pethoxamid |
| Amicarbazone | Chlorpropham | Pretilachlor |
| Amicarbazone | Chlorpropham | Propachlor |
| Amicarbazone | Chlorpropham | Propisochlor |
| Amicarbazone | Chlorpropham | Thenylchlor |
| Amicarbazone | Chlorpropham | Diphenamid |
| Amicarbazone | Chlorpropham | Napropamide |
| Amicarbazone | Desmedipham | Acetochlor |
| Amicarbazone | Desmedipham | Alachlor |
| Amicarbazone | Desmedipham | Butachlor |
| Amicarbazone | Desmedipham | Dimethachlor |
| Amicarbazone | Desmedipham | Dimethanamid |
| Amicarbazone | Desmedipham | Metazachlor |
| Amicarbazone | Desmedipham | Metolachlor |
| Amicarbazone | Desmedipham | Pethoxamid |
| Amicarbazone | Desmedipham | Pretilachlor |
| Amicarbazone | Desmedipham | Propachlor |
| Amicarbazone | Desmedipham | Propisochlor |
| Amicarbazone | Desmedipham | Thenylchlor |
| Amicarbazone | Desmedipham | Diphenamid |
| Amicarbazone | Desmedipham | Napropamide |
| Amicarbazone | Phenmedipham | Acetochlor |
| Amicarbazone | Phenmedipham | Alachlor |
| Amicarbazone | Phenmedipham | Butachlor |
| Amicarbazone | Phenmedipham | Dimethachlor |
| Amicarbazone | Phenmedipham | Dimethanamid |
| Amicarbazone | Phenmedipham | Metazachlor |
| Amicarbazone | Phenmedipham | Metolachlor |
| Amicarbazone | Phenmedipham | Pethoxamid |
| Amicarbazone | Phenmedipham | Pretilachlor |
| Amicarbazone | Phenmedipham | Propachlor |
| Amicarbazone | Phenmedipham | Propisochlor |
| Amicarbazone | Phenmedipham | Thenylchlor |
| Amicarbazone | Phenmedipham | Diphenamid |
| Amicarbazone | Phenmedipham | Napropamide |
| Amicarbazone | Phenmedipham-Ethyl | Acetochlor |
| Amicarbazone | Phenmedipham-Ethyl | Alachlor |
| Amicarbazone | Phenmedipham-Ethyl | Butachlor |
| Amicarbazone | Phenmedipham-Ethyl | Dimethachlor |
| Amicarbazone | Phenmedipham-Ethyl | Dimethanamid |
| Amicarbazone | Phenmedipham-Ethyl | Metazachlor |
| Amicarbazone | Phenmedipham-Ethyl | Metolachlor |
| Amicarbazone | Phenmedipham-Ethyl | Pethoxamid |
| Amicarbazone | Phenmedipham-Ethyl | Pretilachlor |
| Amicarbazone | Phenmedipham-Ethyl | Propachlor |
| Amicarbazone | Phenmedipham-Ethyl | Propisochlor |
| Amicarbazone | Phenmedipham-Ethyl | Thenylchlor |
| Amicarbazone | Phenmedipham-Ethyl | Diphenamid |
| Amicarbazone | Phenmedipham-Ethyl | Napropamide |
| Amicarbazone | Atrazine | Acetochlor |
| Amicarbazone | Atrazine | Alachlor |
| Amicarbazone | Atrazine | Butachlor |
| Amicarbazone | Atrazine | Dimethachlor |
| Amicarbazone | Atrazine | Dimethanamid |
| Amicarbazone | Atrazine | Metazachlor |
| Amicarbazone | Atrazine | Metolachlor |
| Amicarbazone | Atrazine | Pethoxamid |
| Amicarbazone | Atrazine | Pretilachlor |
| Amicarbazone | Atrazine | Propachlor |
| Amicarbazone | Atrazine | Propisochlor |
| Amicarbazone | Atrazine | Thenylchlor |
| Amicarbazone | Atrazine | Diphenamid |
| Amicarbazone | Atrazine | Napropamide |
| Amicarbazone | Bentazon | Acetochlor |
| Amicarbazone | Bentazon | Alachlor |
| Amicarbazone | Bentazon | Butachlor |
| Amicarbazone | Bentazon | Dimethachlor |
| Amicarbazone | Bentazon | Dimethanamid |
| Amicarbazone | Bentazon | Metazachlor |
| Amicarbazone | Bentazon | Metolachlor |
| Amicarbazone | Bentazon | Pethoxamid |
| Amicarbazone | Bentazon | Pretilachlor |
| Amicarbazone | Bentazon | Propachlor |
| Amicarbazone | Bentazon | Propisochlor |
| Amicarbazone | Bentazon | Thenylchlor |

| Triazolone Herbicide | Photosystem II Inhibitor | Third Herbicide |
| --- | --- | --- |
| Amicarbazone | Bentazon | Diphenamid |
| Amicarbazone | Bentazon | Napropamide |
| Amicarbazone | Metamitron | Acetochlor |
| Amicarbazone | Metamitron | Alachlor |
| Amicarbazone | Metamitron | Butachlor |
| Amicarbazone | Metamitron | Dimethachlor |
| Amicarbazone | Metamitron | Dimethanamid |
| Amicarbazone | Metamitron | Metazachlor |
| Amicarbazone | Metamitron | Metolachlor |
| Amicarbazone | Metamitron | Pethoxamid |
| Amicarbazone | Metamitron | Pretilachlor |
| Amicarbazone | Metamitron | Propachlor |
| Amicarbazone | Metamitron | Propisochlor |
| Amicarbazone | Metamitron | Thenylchlor |
| Amicarbazone | Metamitron | Diphenamid |
| Amicarbazone | Metamitron | Napropamide |
| Amicarbazone | Metribuzin | Acetochlor |
| Amicarbazone | Metribuzin | Alachlor |
| Amicarbazone | Metribuzin | Butachlor |
| Amicarbazone | Metribuzin | Dimethachlor |
| Amicarbazone | Metribuzin | Dimethanamid |
| Amicarbazone | Metribuzin | Metazachlor |
| Amicarbazone | Metribuzin | Metolachlor |
| Amicarbazone | Metribuzin | Pethoxamid |
| Amicarbazone | Metribuzin | Pretilachlor |
| Amicarbazone | Metribuzin | Propachlor |
| Amicarbazone | Metribuzin | Propisochlor |
| Amicarbazone | Metribuzin | Thenylchlor |
| Amicarbazone | Metribuzin | Diphenamid |
| Amicarbazone | Metribuzin | Napropamide |
| Amicarbazone | Diuron | Acetochlor |
| Amicarbazone | Diuron | Alachlor |
| Amicarbazone | Diuron | Butachlor |
| Amicarbazone | Diuron | Dimethachlor |
| Amicarbazone | Diuron | Dimethanamid |
| Amicarbazone | Diuron | Metazachlor |
| Amicarbazone | Diuron | Metolachlor |
| Amicarbazone | Diuron | Pethoxamid |
| Amicarbazone | Diuron | Pretilachlor |
| Amicarbazone | Diuron | Propachlor |
| Amicarbazone | Diuron | Propisochlor |
| Amicarbazone | Diuron | Thenylchlor |
| Amicarbazone | Diuron | Diphenamid |
| Amicarbazone | Diuron | Napropamide |
| Amicarbazone | Linuron | Acetochlor |
| Amicarbazone | Linuron | Alachlor |
| Amicarbazone | Linuron | Butachlor |
| Amicarbazone | Linuron | Dimethachlor |
| Amicarbazone | Linuron | Dimethanamid |
| Amicarbazone | Linuron | Metazachlor |
| Amicarbazone | Linuron | Metolachlor |
| Amicarbazone | Linuron | Pethoxamid |
| Amicarbazone | Linuron | Pretilachlor |
| Amicarbazone | Linuron | Propachlor |
| Amicarbazone | Linuron | Propisochlor |
| Amicarbazone | Linuron | Thenylchlor |
| Amicarbazone | Linuron | Diphenamid |
| Amicarbazone | Linuron | Napropamide |
| Amicarbazone | Chlorpropham | Benfluralin |
| Amicarbazone | Chlorpropham | Butralin |
| Amicarbazone | Chlorpropham | Dinitramine |
| Amicarbazone | Chlorpropham | Oryzalin |
| Amicarbazone | Chlorpropham | Pendimethalin |
| Amicarbazone | Chlorpropham | Trifluralin |
| Amicarbazone | Chlorpropham | Propyzamide |
| Amicarbazone | Chlorpropham | DCPA |
| Amicarbazone | Chlorpropham | Pendimethalin |
| Amicarbazone | Chlorpropham | Ethalfluralin |
| Amicarbazone | Chlorpropham | Oryzalin |
| Amicarbazone | Chlorpropham | Trifluralin |
| Amicarbazone | Chlorpropham | Prodiamine |
| Amicarbazone | Chlorpropham | Dithiopyr |
| Amicarbazone | Desmedipham | Benfluralin |
| Amicarbazone | Desmedipham | Butralin |
| Amicarbazone | Desmedipham | Dinitramine |
| Amicarbazone | Desmedipham | Oryzalin |
| Amicarbazone | Desmedipham | Pendimethalin |

-continued

| Triazolone Herbicide | Photosystem II Inhibitor | Third Herbicide |
|---|---|---|
| Amicarbazone | Desmedipham | Trifluralin |
| Amicarbazone | Desmedipham | Propyzamide |
| Amicarbazone | Desmedipham | DCPA |
| Amicarbazone | Desmedipham | Pendimethalin |
| Amicarbazone | Desmedipham | Ethalfluralin |
| Amicarbazone | Desmedipham | Oryzalin |
| Amicarbazone | Desmedipham | Trifluralin |
| Amicarbazone | Desmedipham | Prodiamine |
| Amicarbazone | Desmedipham | Dithiopyr |
| Amicarbazone | Phenmedipham | Benfluralin |
| Amicarbazone | Phenmedipham | Butralin |
| Amicarbazone | Phenmedipham | Dinitramine |
| Amicarbazone | Phenmedipham | Oryzalin |
| Amicarbazone | Phenmedipham | Pendimethalin |
| Amicarbazone | Phenmedipham | Trifluralin |
| Amicarbazone | Phenmedipham | Propyzamide |
| Amicarbazone | Phenmedipham | DCPA |
| Amicarbazone | Phenmedipham | Pendimethalin |
| Amicarbazone | Phenmedipham | Ethalfluralin |
| Amicarbazone | Phenmedipham | Oryzalin |
| Amicarbazone | Phenmedipham | Trifluralin |
| Amicarbazone | Phenmedipham | Prodiamine |
| Amicarbazone | Phenmedipham | Dithiopyr |
| Amicarbazone | Phenmedipham-Ethyl | Benfluralin |
| Amicarbazone | Phenmedipham-Ethyl | Butralin |
| Amicarbazone | Phenmedipham-Ethyl | Dinitramine |
| Amicarbazone | Phenmedipham-Ethyl | Oryzalin |
| Amicarbazone | Phenmedipham-Ethyl | Pendimethalin |
| Amicarbazone | Phenmedipham-Ethyl | Trifluralin |
| Amicarbazone | Phenmedipham-Ethyl | Propyzamide |
| Amicarbazone | Phenmedipham-Ethyl | DCPA |
| Amicarbazone | Phenmedipham-Ethyl | Pendimethalin |
| Amicarbazone | Phenmedipham-Ethyl | Ethalfluralin |
| Amicarbazone | Phenmedipham-Ethyl | Oryzalin |
| Amicarbazone | Phenmedipham-Ethyl | Trifluralin |
| Amicarbazone | Phenmedipham-Ethyl | Prodiamine |
| Amicarbazone | Phenmedipham-Ethyl | Dithiopyr |
| Amicarbazone | Atrazine | Benfluralin |
| Amicarbazone | Atrazine | Butralin |
| Amicarbazone | Atrazine | Dinitramine |
| Amicarbazone | Atrazine | Oryzalin |
| Amicarbazone | Atrazine | Trifluralin |
| Amicarbazone | Atrazine | Propyzamide |
| Amicarbazone | Atrazine | DCPA |
| Amicarbazone | Atrazine | Pendimethalin |
| Amicarbazone | Atrazine | Ethalfluralin |
| Amicarbazone | Atrazine | Oryzalin |
| Amicarbazone | Atrazine | Trifluralin |
| Amicarbazone | Atrazine | Prodiamine |
| Amicarbazone | Atrazine | Dithiopyr |
| Amicarbazone | Bentazon | Benfluralin |
| Amicarbazone | Bentazon | Butralin |
| Amicarbazone | Bentazon | Dinitramine |
| Amicarbazone | Bentazon | Oryzalin |
| Amicarbazone | Bentazon | Pendimethalin |
| Amicarbazone | Bentazon | Propyzamide |
| Amicarbazone | Bentazon | DCPA |
| Amicarbazone | Bentazon | Pendimethalin |
| Amicarbazone | Bentazon | Ethalfluralin |
| Amicarbazone | Bentazon | Trifluralin |
| Amicarbazone | Bentazon | Prodiamine |
| Amicarbazone | Bentazon | Dithiopyr |
| Amicarbazone | Metamitron | Benfluralin |
| Amicarbazone | Metamitron | Butralin |
| Amicarbazone | Metamitron | Dinitramine |
| Amicarbazone | Metamitron | Oryzalin |
| Amicarbazone | Metamitron | Pendimethalin |
| Amicarbazone | Metamitron | Trifluralin |
| Amicarbazone | Metamitron | Propyzamide |
| Amicarbazone | Metamitron | DCPA |
| Amicarbazone | Metamitron | Pendimethalin |
| Amicarbazone | Metamitron | Ethalfluralin |
| Amicarbazone | Metamitron | Oryzalin |
| Amicarbazone | Metamitron | Trifluralin |
| Amicarbazone | Metamitron | Prodiamine |
| Amicarbazone | Metamitron | Dithiopyr |
| Amicarbazone | Metribuzin | Benfluralin |

-continued

| Triazolone Herbicide | Photosystem II Inhibitor | Third Herbicide |
|---|---|---|
| Amicarbazone | Metribuzin | Butralin |
| Amicarbazone | Metribuzin | Dinitramine |
| Amicarbazone | Metribuzin | Oryzalin |
| Amicarbazone | Metribuzin | Pendimethalin |
| Amicarbazone | Metribuzin | Trifluralin |
| Amicarbazone | Metribuzin | Propyzamide |
| Amicarbazone | Metribuzin | DCPA |
| Amicarbazone | Metribuzin | Ethalfluralin |
| Amicarbazone | Metribuzin | Prodiamine |
| Amicarbazone | Metribuzin | Dithiopyr |
| Amicarbazone | Diuron | Benfluralin |
| Amicarbazone | Diuron | Butralin |
| Amicarbazone | Diuron | Dinitramine |
| Amicarbazone | Diuron | Oryzalin |
| Amicarbazone | Diuron | Pendimethalin |
| Amicarbazone | Diuron | Trifluralin |
| Amicarbazone | Diuron | Propyzamide |
| Amicarbazone | Diuron | DCPA |
| Amicarbazone | Diuron | Pendimethalin |
| Amicarbazone | Diuron | Ethalfluralin |
| Amicarbazone | Diuron | Prodiamine |
| Amicarbazone | Diuron | Dithiopyr |
| Amicarbazone | Linuron | Benfluralin |
| Amicarbazone | Linuron | Butralin |
| Amicarbazone | Linuron | Dinitramine |
| Amicarbazone | Linuron | Pendimethalin |
| Amicarbazone | Linuron | Trifluralin |
| Amicarbazone | Linuron | Propyzamide |
| Amicarbazone | Linuron | DCPA |
| Amicarbazone | Linuron | Ethalfluralin |
| Amicarbazone | Linuron | Oryzalin |
| Amicarbazone | Linuron | Prodiamine |
| Amicarbazone | Linuron | Dithiopyr |
| Amicarbazone | Chlorpropham | Acifluorfen |
| Amicarbazone | Chlorpropham | Fomesafen |
| Amicarbazone | Chlorpropham | Lactofen |
| Amicarbazone | Chlorpropham | Flumiclorac |
| Amicarbazone | Chlorpropham | Flumioxazin |
| Amicarbazone | Chlorpropham | Flufenpyr-Ethyl |
| Amicarbazone | Chlorpropham | Fomesafen |
| Amicarbazone | Chlorpropham | Fluthiacet-Ethyl |
| Amicarbazone | Chlorpropham | Saflufenacil |
| Amicarbazone | Chlorpropham | Azafenidin |
| Amicarbazone | Chlorpropham | Benzfendizone |
| Amicarbazone | Chlorpropham | Bifenox |
| Amicarbazone | Chlorpropham | Butafenacil |
| Amicarbazone | Chlorpropham | Oxadiazon |
| Amicarbazone | Desmedipham | Acifluorfen |
| Amicarbazone | Desmedipham | Fomesafen |
| Amicarbazone | Desmedipham | Lactofen |
| Amicarbazone | Desmedipham | Flumiclorac |
| Amicarbazone | Desmedipham | Flumioxazin |
| Amicarbazone | Desmedipham | Flufenpyr-Ethyl |
| Amicarbazone | Desmedipham | Fomesafen |
| Amicarbazone | Desmedipham | Fluthiacet-Ethyl |
| Amicarbazone | Desmedipham | Saflufenacil |
| Amicarbazone | Desmedipham | Azafenidin |
| Amicarbazone | Desmedipham | Benzfendizone |
| Amicarbazone | Desmedipham | Bifenox |
| Amicarbazone | Desmedipham | Butafenacil |
| Amicarbazone | Desmedipham | Oxadiazon |
| Amicarbazone | Phenmedipham | Acifluorfen |
| Amicarbazone | Phenmedipham | Fomesafen |
| Amicarbazone | Phenmedipham | Lactofen |
| Amicarbazone | Phenmedipham | Flumiclorac |
| Amicarbazone | Phenmedipham | Flumioxazin |
| Amicarbazone | Phenmedipham | Flufenpyr-Ethyl |
| Amicarbazone | Phenmedipham | Fomesafen |
| Amicarbazone | Phenmedipham | Fluthiacet-Ethyl |
| Amicarbazone | Phenmedipham | Saflufenacil |
| Amicarbazone | Phenmedipham | Azafenidin |
| Amicarbazone | Phenmedipham | Benzfendizone |
| Amicarbazone | Phenmedipham | Bifenox |
| Amicarbazone | Phenmedipham | Butafenacil |
| Amicarbazone | Phenmedipham | Oxadiazon |
| Amicarbazone | Phenmedipham-Ethyl | Acifluorfen |
| Amicarbazone | Phenmedipham-Ethyl | Fomesafen |

-continued

| Triazolone Herbicide | Photosystem II Inhibitor | Third Herbicide |
|---|---|---|
| Amicarbazone | Phenmedipham-Ethyl | Lactofen |
| Amicarbazone | Phenmedipham-Ethyl | Flumiclorac |
| Amicarbazone | Phenmedipham-Ethyl | Flumioxazin |
| Amicarbazone | Phenmedipham-Ethyl | Flufenpyr-Ethyl |
| Amicarbazone | Phenmedipham-Ethyl | Fomesafen |
| Amicarbazone | Phenmedipham-Ethyl | Fluthiacet-Ethyl |
| Amicarbazone | Phenmedipham-Ethyl | Saflufenacil |
| Amicarbazone | Phenmedipham-Ethyl | Azafenidin |
| Amicarbazone | Phenmedipham-Ethyl | Benzfendizone |
| Amicarbazone | Phenmedipham-Ethyl | Bifenox |
| Amicarbazone | Phenmedipham-Ethyl | Butafenacil |
| Amicarbazone | Phenmedipham-Ethyl | Oxadiazon |
| Amicarbazone | Atrazine | Acifluorfen |
| Amicarbazone | Atrazine | Fomesafen |
| Amicarbazone | Atrazine | Lactofen |
| Amicarbazone | Atrazine | Flumiclorac |
| Amicarbazone | Atrazine | Flumioxazin |
| Amicarbazone | Atrazine | Flufenpyr-Ethyl |
| Amicarbazone | Atrazine | Fomesafen |
| Amicarbazone | Atrazine | Fluthiacet-Ethyl |
| Amicarbazone | Atrazine | Saflufenacil |
| Amicarbazone | Atrazine | Azafenidin |
| Amicarbazone | Atrazine | Benzfendizone |
| Amicarbazone | Atrazine | Bifenox |
| Amicarbazone | Atrazine | Butafenacil |
| Amicarbazone | Atrazine | Oxadiazon |
| Amicarbazone | Bentazon | Acifluorfen |
| Amicarbazone | Bentazon | Fomesafen |
| Amicarbazone | Bentazon | Lactofen |
| Amicarbazone | Bentazon | Flumiclorac |
| Amicarbazone | Bentazon | Flumioxazin |
| Amicarbazone | Bentazon | Flufenpyr-Ethyl |
| Amicarbazone | Bentazon | Fomesafen |
| Amicarbazone | Bentazon | Fluthiacet-Ethyl |
| Amicarbazone | Bentazon | Saflufenacil |
| Amicarbazone | Bentazon | Azafenidin |
| Amicarbazone | Bentazon | Benzfendizone |
| Amicarbazone | Bentazon | Bifenox |
| Amicarbazone | Bentazon | Butafenacil |
| Amicarbazone | Bentazon | Oxadiazon |
| Amicarbazone | Metamitron | Acifluorfen |
| Amicarbazone | Metamitron | Fomesafen |
| Amicarbazone | Metamitron | Lactofen |
| Amicarbazone | Metamitron | Flumiclorac |
| Amicarbazone | Metamitron | Flumioxazin |
| Amicarbazone | Metamitron | Flufenpyr-Ethyl |
| Amicarbazone | Metamitron | Fomesafen |
| Amicarbazone | Metamitron | Fluthiacet-Ethyl |
| Amicarbazone | Metamitron | Saflufenacil |
| Amicarbazone | Metamitron | Azafenidin |
| Amicarbazone | Metamitron | Benzfendizone |
| Amicarbazone | Metamitron | Bifenox |
| Amicarbazone | Metamitron | Butafenacil |
| Amicarbazone | Metamitron | Oxadiazon |
| Amicarbazone | Metribuzin | Acifluorfen |
| Amicarbazone | Metribuzin | Fomesafen |
| Amicarbazone | Metribuzin | Lactofen |
| Amicarbazone | Metribuzin | Flumiclorac |
| Amicarbazone | Metribuzin | Flumioxazin |
| Amicarbazone | Metribuzin | Flufenpyr-Ethyl |
| Amicarbazone | Metribuzin | Fomesafen |
| Amicarbazone | Metribuzin | Fluthiacet-Ethyl |
| Amicarbazone | Metribuzin | Saflufenacil |
| Amicarbazone | Metribuzin | Azafenidin |
| Amicarbazone | Metribuzin | Benzfendizone |
| Amicarbazone | Metribuzin | Bifenox |
| Amicarbazone | Metribuzin | Butafenacil |
| Amicarbazone | Metribuzin | Oxadiazon |
| Amicarbazone | Diuron | Acifluorfen |
| Amicarbazone | Diuron | Fomesafen |
| Amicarbazone | Diuron | Lactofen |
| Amicarbazone | Diuron | Flumiclorac |
| Amicarbazone | Diuron | Flumioxazin |
| Amicarbazone | Diuron | Flufenpyr-Ethyl |
| Amicarbazone | Diuron | Fomesafen |
| Amicarbazone | Diuron | Fluthiacet-Ethyl |
| Amicarbazone | Diuron | Saflufenacil |

-continued

| Triazolone Herbicide | Photosystem II Inhibitor | Third Herbicide |
|---|---|---|
| Amicarbazone | Diuron | Azafenidin |
| Amicarbazone | Diuron | Benzfendizone |
| Amicarbazone | Diuron | Bifenox |
| Amicarbazone | Diuron | Butafenacil |
| Amicarbazone | Diuron | Oxadiazon |
| Amicarbazone | Linuron | Acifluorfen |
| Amicarbazone | Linuron | Fomesafen |
| Amicarbazone | Linuron | Lactofen |
| Amicarbazone | Linuron | Flumiclorac |
| Amicarbazone | Linuron | Flumioxazin |
| Amicarbazone | Linuron | Flufenpyr-Ethyl |
| Amicarbazone | Linuron | Fomesafen |
| Amicarbazone | Linuron | Fluthiacet-Ethyl |
| Amicarbazone | Linuron | Saflufenacil |
| Amicarbazone | Linuron | Azafenidin |
| Amicarbazone | Linuron | Benzfendizone |
| Amicarbazone | Linuron | Bifenox |
| Amicarbazone | Linuron | Butafenacil |
| Amicarbazone | Linuron | Oxadiazon |
| Amicarbazone | Chlorpropham | Dichlobenil |
| Amicarbazone | Chlorpropham | Chlorthiamid |
| Amicarbazone | Chlorpropham | Indaziflam |
| Amicarbazone | Chlorpropham | Isoxaben |
| Amicarbazone | Chlorpropham | Dichlobenil |
| Amicarbazone | Chlorpropham | Flupoxam |
| Amicarbazone | Desmedipham | Dichlobenil |
| Amicarbazone | Desmedipham | Chlorthiamid |
| Amicarbazone | Desmedipham | Indaziflam |
| Amicarbazone | Desmedipham | Isoxaben |
| Amicarbazone | Desmedipham | Dichlobenil |
| Amicarbazone | Desmedipham | Flupoxam |
| Amicarbazone | Phenmedipham | Dichlobenil |
| Amicarbazone | Phenmedipham | Chlorthiamid |
| Amicarbazone | Phenmedipham | Indaziflam |
| Amicarbazone | Phenmedipham | Isoxaben |
| Amicarbazone | Phenmedipham | Dichlobenil |
| Amicarbazone | Phenmedipham | Flupoxam |
| Amicarbazone | Phenmedipham-Ethyl | Dichlobenil |
| Amicarbazone | Phenmedipham-Ethyl | Chlorthiamid |
| Amicarbazone | Phenmedipham-Ethyl | Indaziflam |
| Amicarbazone | Phenmedipham-Ethyl | Isoxaben |
| Amicarbazone | Phenmedipham-Ethyl | Dichlobenil |
| Amicarbazone | Phenmedipham-Ethyl | Flupoxam |
| Amicarbazone | Atrazine | Dichlobenil |
| Amicarbazone | Atrazine | Chlorthiamid |
| Amicarbazone | Atrazine | Indaziflam |
| Amicarbazone | Atrazine | Isoxaben |
| Amicarbazone | Atrazine | Dichlobenil |
| Amicarbazone | Atrazine | Flupoxam |
| Amicarbazone | Bentazon | Dichlobenil |
| Amicarbazone | Bentazon | Chlorthiamid |
| Amicarbazone | Bentazon | Indaziflam |
| Amicarbazone | Bentazon | Isoxaben |
| Amicarbazone | Bentazon | Flupoxam |
| Amicarbazone | Metamitron | Dichlobenil |
| Amicarbazone | Metamitron | Chlorthiamid |
| Amicarbazone | Metamitron | Indaziflam |
| Amicarbazone | Metamitron | Isoxaben |
| Amicarbazone | Metamitron | Flupoxam |
| Amicarbazone | Metribuzin | Chlorthiamid |
| Amicarbazone | Metribuzin | Indaziflam |
| Amicarbazone | Metribuzin | Isoxaben |
| Amicarbazone | Metribuzin | Dichlobenil |
| Amicarbazone | Metribuzin | Flupoxam |
| Amicarbazone | Diuron | Dichlobenil |
| Amicarbazone | Diuron | Chlorthiamid |
| Amicarbazone | Diuron | Indaziflam |
| Amicarbazone | Diuron | Isoxaben |
| Amicarbazone | Diuron | Flupoxam |
| Amicarbazone | Linuron | Dichlobenil |
| Amicarbazone | Linuron | Chlorthiamid |
| Amicarbazone | Linuron | Indaziflam |
| Amicarbazone | Linuron | Isoxaben |
| Amicarbazone | Linuron | Flupoxam |
| Amicarbazone | Chlorpropham | Imazamox |
| Amicarbazone | Chlorpropham | Imazapic |
| Amicarbazone | Chlorpropham | Imazapyr |

-continued

| Triazolone Herbicide | Photosystem II Inhibitor | Third Herbicide |
| --- | --- | --- |
| Amicarbazone | Chlorpropham | Imazethapyr |
| Amicarbazone | Chlorpropham | Sulfentrazone |
| Amicarbazone | Chlorpropham | Flucarbazone-Sodium |
| Amicarbazone | Chlorpropham | Flucarbazone-Sodium |
| Amicarbazone | Chlorpropham | Bensulfuron |
| Amicarbazone | Chlorpropham | Halosulfuron |
| Amicarbazone | Chlorpropham | Metsulfuron |
| Amicarbazone | Chlorpropham | Metazachlor |
| Amicarbazone | Chlorpropham | Metazachlor |
| Amicarbazone | Chlorpropham | Pinoxaden |
| Amicarbazone | Desmedipham | Imazamox |
| Amicarbazone | Desmedipham | Imazapic |
| Amicarbazone | Desmedipham | Imazapyr |
| Amicarbazone | Desmedipham | Imazapyr |
| Amicarbazone | Desmedipham | Imazethapyr |
| Amicarbazone | Desmedipham | Sulfentrazone |
| Amicarbazone | Desmedipham | Flucarbazone-Sodium |
| Amicarbazone | Desmedipham | Flucarbazone-Sodium |
| Amicarbazone | Desmedipham | Bensulfuron |
| Amicarbazone | Desmedipham | Halosulfuron |
| Amicarbazone | Desmedipham | Metsulfuron |
| Amicarbazone | Desmedipham | Metazachlor |
| Amicarbazone | Desmedipham | Metazachlor |
| Amicarbazone | Desmedipham | Pinoxaden |
| Amicarbazone | Phenmedipham | Imazamox |
| Amicarbazone | Phenmedipham | Imazapic |
| Amicarbazone | Phenmedipham | Imazapyr |
| Amicarbazone | Phenmedipham | Imazapyr |
| Amicarbazone | Phenmedipham | Imazethapyr |
| Amicarbazone | Phenmedipham | Sulfentrazone |
| Amicarbazone | Phenmedipham | Flucarbazone-Sodium |
| Amicarbazone | Phenmedipham | Flucarbazone-Sodium |
| Amicarbazone | Phenmedipham | Bensulfuron |
| Amicarbazone | Phenmedipham | Halosulfuron |
| Amicarbazone | Phenmedipham | Metsulfuron |
| Amicarbazone | Phenmedipham | Metazachlor |
| Amicarbazone | Phenmedipham | Metazachlor |
| Amicarbazone | Phenmedipham | Pinoxaden |
| Amicarbazone | Phenmedipham-Ethyl | Imazamox |
| Amicarbazone | Phenmedipham-Ethyl | Imazapic |
| Amicarbazone | Phenmedipham-Ethyl | Imazapyr |
| Amicarbazone | Phenmedipham-Ethyl | Imazapyr |
| Amicarbazone | Phenmedipham-Ethyl | Imazethapyr |
| Amicarbazone | Phenmedipham-Ethyl | Sulfentrazone |
| Amicarbazone | Phenmedipham-Ethyl | Flucarbazone-Sodium |
| Amicarbazone | Phenmedipham-Ethyl | Flucarbazone-Sodium |
| Amicarbazone | Phenmedipham-Ethyl | Bensulfuron |
| Amicarbazone | Phenmedipham-Ethyl | Halosulfuron |
| Amicarbazone | Phenmedipham-Ethyl | Metsulfuron |
| Amicarbazone | Phenmedipham-Ethyl | Metazachlor |
| Amicarbazone | Phenmedipham-Ethyl | Metazachlor |
| Amicarbazone | Phenmedipham-Ethyl | Pinoxaden |
| Amicarbazone | Atrazine | Imazamox |
| Amicarbazone | Atrazine | Imazapic |
| Amicarbazone | Atrazine | Imazapyr |
| Amicarbazone | Atrazine | Imazapyr |
| Amicarbazone | Atrazine | Imazethapyr |
| Amicarbazone | Atrazine | Sulfentrazone |
| Amicarbazone | Atrazine | Flucarbazone-Sodium |
| Amicarbazone | Atrazine | Flucarbazone-Sodium |
| Amicarbazone | Atrazine | Bensulfuron |
| Amicarbazone | Atrazine | Halosulfuron |
| Amicarbazone | Atrazine | Metsulfuron |
| Amicarbazone | Atrazine | Metazachlor |
| Amicarbazone | Atrazine | Metazachlor |
| Amicarbazone | Atrazine | Pinoxaden |
| Amicarbazone | Bentazon | Imazamox |
| Amicarbazone | Bentazon | Imazapic |
| Amicarbazone | Bentazon | Imazapyr |
| Amicarbazone | Bentazon | Imazapyr |
| Amicarbazone | Bentazon | Imazethapyr |
| Amicarbazone | Bentazon | Sulfentrazone |
| Amicarbazone | Bentazon | Flucarbazone-Sodium |
| Amicarbazone | Bentazon | Flucarbazone-Sodium |
| Amicarbazone | Bentazon | Bensulfuron |
| Amicarbazone | Bentazon | Halosulfuron |
| Amicarbazone | Bentazon | Metsulfuron |

| Triazolone Herbicide | Photosystem II Inhibitor | Third Herbicide |
| --- | --- | --- |
| Amicarbazone | Bentazon | Metazachlor |
| Amicarbazone | Bentazon | Metazachlor |
| Amicarbazone | Bentazon | Pinoxaden |
| Amicarbazone | Metamitron | Imazamox |
| Amicarbazone | Metamitron | Imazapic |
| Amicarbazone | Metamitron | Imazapyr |
| Amicarbazone | Metamitron | Imazapyr |
| Amicarbazone | Metamitron | Imazethapyr |
| Amicarbazone | Metamitron | Sulfentrazone |
| Amicarbazone | Metamitron | Flucarbazone-Sodium |
| Amicarbazone | Metamitron | Flucarbazone-Sodium |
| Amicarbazone | Metamitron | Bensulfuron |
| Amicarbazone | Metamitron | Halosulfuron |
| Amicarbazone | Metamitron | Metsulfuron |
| Amicarbazone | Metamitron | Metazachlor |
| Amicarbazone | Metamitron | Metazachlor |
| Amicarbazone | Metamitron | Pinoxaden |
| Amicarbazone | Metribuzin | Imazamox |
| Amicarbazone | Metribuzin | Imazapic |
| Amicarbazone | Metribuzin | Imazapyr |
| Amicarbazone | Metribuzin | Imazapyr |
| Amicarbazone | Metribuzin | Imazethapyr |
| Amicarbazone | Metribuzin | Sulfentrazone |
| Amicarbazone | Metribuzin | Flucarbazone-Sodium |
| Amicarbazone | Metribuzin | Flucarbazone-Sodium |
| Amicarbazone | Metribuzin | Bensulfuron |
| Amicarbazone | Metribuzin | Halosulfuron |
| Amicarbazone | Metribuzin | Metsulfuron |
| Amicarbazone | Metribuzin | Metazachlor |
| Amicarbazone | Metribuzin | Metazachlor |
| Amicarbazone | Metribuzin | Pinoxaden |
| Amicarbazone | Diuron | Imazamox |
| Amicarbazone | Diuron | Imazapic |
| Amicarbazone | Diuron | Imazapyr |
| Amicarbazone | Diuron | Imazapyr |
| Amicarbazone | Diuron | Imazethapyr |
| Amicarbazone | Diuron | Sulfentrazone |
| Amicarbazone | Diuron | Flucarbazone-Sodium |
| Amicarbazone | Diuron | Flucarbazone-Sodium |
| Amicarbazone | Diuron | Bensulfuron |
| Amicarbazone | Diuron | Halosulfuron |
| Amicarbazone | Diuron | Metsulfuron |
| Amicarbazone | Diuron | Metazachlor |
| Amicarbazone | Diuron | Metazachlor |
| Amicarbazone | Diuron | Pinoxaden |
| Amicarbazone | Linuron | Imazamox |
| Amicarbazone | Linuron | Imazapic |
| Amicarbazone | Linuron | Imazapyr |
| Amicarbazone | Linuron | Imazapyr |
| Amicarbazone | Linuron | Imazethapyr |
| Amicarbazone | Linuron | Sulfentrazone |
| Amicarbazone | Linuron | Flucarbazone-Sodium |
| Amicarbazone | Linuron | Flucarbazone-Sodium |
| Amicarbazone | Linuron | Bensulfuron |
| Amicarbazone | Linuron | Halosulfuron |
| Amicarbazone | Linuron | Metsulfuron |
| Amicarbazone | Linuron | Metazachlor |
| Amicarbazone | Linuron | Metazachlor |
| Amicarbazone | Linuron | Pinoxaden |
| Sulfentrazone | Chlorpropham | Benzobicyclon |
| Sulfentrazone | Chlorpropham | Benzofenap |
| Sulfentrazone | Chlorpropham | Bicyclopyrone |
| Sulfentrazone | Chlorpropham | Fenquinotrione |
| Sulfentrazone | Chlorpropham | Isoxachlortole |
| Sulfentrazone | Chlorpropham | Isoxaflutole |
| Sulfentrazone | Chlorpropham | Mesotrione |
| Sulfentrazone | Chlorpropham | Pyrasulfotole |
| Sulfentrazone | Chlorpropham | Pyrazolynate |
| Sulfentrazone | Chlorpropham | Pyrazoxyfen |
| Sulfentrazone | Chlorpropham | Sulcotrione |
| Sulfentrazone | Chlorpropham | Tefuryltrione |
| Sulfentrazone | Chlorpropham | Tolpyralate |
| Sulfentrazone | Chlorpropham | Topramezone |
| Sulfentrazone | Desmedipham | Benzobicyclon |
| Sulfentrazone | Desmedipham | Benzofenap |
| Sulfentrazone | Desmedipham | Bicyclopyrone |
| Sulfentrazone | Desmedipham | Fenquinotrione |

-continued

| Triazolone Herbicide | Photosystem II Inhibitor | Third Herbicide |
|---|---|---|
| Sulfentrazone | Desmedipham | Isoxachlortole |
| Sulfentrazone | Desmedipham | Isoxaflutole |
| Sulfentrazone | Desmedipham | Mesotrione |
| Sulfentrazone | Desmedipham | Pyrasulfotole |
| Sulfentrazone | Desmedipham | Pyrazolynate |
| Sulfentrazone | Desmedipham | Pyrazoxyfen |
| Sulfentrazone | Desmedipham | Sulcotrione |
| Sulfentrazone | Desmedipham | Tefuryltrione |
| Sulfentrazone | Desmedipham | Tolpyralate |
| Sulfentrazone | Desmedipham | Topramezone |
| Sulfentrazone | Phenmedipham | Benzobicyclon |
| Sulfentrazone | Phenmedipham | Benzofenap |
| Sulfentrazone | Phenmedipham | Bicyclopyrone |
| Sulfentrazone | Phenmedipham | Fenquinotrione |
| Sulfentrazone | Phenmedipham | Isoxachlortole |
| Sulfentrazone | Phenmedipham | Isoxaflutole |
| Sulfentrazone | Phenmedipham | Mesotrione |
| Sulfentrazone | Phenmedipham | Pyrasulfotole |
| Sulfentrazone | Phenmedipham | Pyrazolynate |
| Sulfentrazone | Phenmedipham | Pyrazoxyfen |
| Sulfentrazone | Phenmedipham | Sulcotrione |
| Sulfentrazone | Phenmedipham | Tefuryltrione |
| Sulfentrazone | Phenmedipham | Tolpyralate |
| Sulfentrazone | Phenmedipham | Topramezone |
| Sulfentrazone | Phenmedipham-Ethyl | Benzobicyclon |
| Sulfentrazone | Phenmedipham-Ethyl | Benzofenap |
| Sulfentrazone | Phenmedipham-Ethyl | Bicyclopyrone |
| Sulfentrazone | Phenmedipham-Ethyl | Fenquinotrione |
| Sulfentrazone | Phenmedipham-Ethyl | Isoxachlortole |
| Sulfentrazone | Phenmedipham-Ethyl | Isoxaflutole |
| Sulfentrazone | Phenmedipham-Ethyl | Mesotrione |
| Sulfentrazone | Phenmedipham-Ethyl | Pyrasulfotole |
| Sulfentrazone | Phenmedipham-Ethyl | Pyrazolynate |
| Sulfentrazone | Phenmedipham-Ethyl | Pyrazoxyfen |
| Sulfentrazone | Phenmedipham-Ethyl | Sulcotrione |
| Sulfentrazone | Phenmedipham-Ethyl | Tefuryltrione |
| Sulfentrazone | Phenmedipham-Ethyl | Tolpyralate |
| Sulfentrazone | Phenmedipham-Ethyl | Topramezone |
| Sulfentrazone | Atrazine | Benzobicyclon |
| Sulfentrazone | Atrazine | Benzofenap |
| Sulfentrazone | Atrazine | Bicyclopyrone |
| Sulfentrazone | Atrazine | Fenquinotrione |
| Sulfentrazone | Atrazine | Isoxachlortole |
| Sulfentrazone | Atrazine | Isoxaflutole |
| Sulfentrazone | Atrazine | Mesotrione |
| Sulfentrazone | Atrazine | Pyrasulfotole |
| Sulfentrazone | Atrazine | Pyrazolynate |
| Sulfentrazone | Atrazine | Pyrazoxyfen |
| Sulfentrazone | Atrazine | Sulcotrione |
| Sulfentrazone | Atrazine | Tefuryltrione |
| Sulfentrazone | Atrazine | Tolpyralate |
| Sulfentrazone | Atrazine | Topramezone |
| Sulfentrazone | Bentazon | Benzobicyclon |
| Sulfentrazone | Bentazon | Benzofenap |
| Sulfentrazone | Bentazon | Bicyclopyrone |
| Sulfentrazone | Bentazon | Fenquinotrione |
| Sulfentrazone | Bentazon | Isoxachlortole |
| Sulfentrazone | Bentazon | Isoxaflutole |
| Sulfentrazone | Bentazon | Mesotrione |
| Sulfentrazone | Bentazon | Pyrasulfotole |
| Sulfentrazone | Bentazon | Pyrazolynate |
| Sulfentrazone | Bentazon | Pyrazoxyfen |
| Sulfentrazone | Bentazon | Sulcotrione |
| Sulfentrazone | Bentazon | Tefuryltrione |
| Sulfentrazone | Bentazon | Tolpyralate |
| Sulfentrazone | Bentazon | Topramezone |
| Sulfentrazone | Metamitron | Benzobicyclon |
| Sulfentrazone | Metamitron | Benzofenap |
| Sulfentrazone | Metamitron | Bicyclopyrone |
| Sulfentrazone | Metamitron | Fenquinotrione |
| Sulfentrazone | Metamitron | Isoxachlortole |
| Sulfentrazone | Metamitron | Isoxaflutole |
| Sulfentrazone | Metamitron | Mesotrione |
| Sulfentrazone | Metamitron | Pyrasulfotole |
| Sulfentrazone | Metamitron | Pyrazolynate |
| Sulfentrazone | Metamitron | Pyrazoxyfen |
| Sulfentrazone | Metamitron | Sulcotrione |

-continued

| Triazolone Herbicide | Photosystem II Inhibitor | Third Herbicide |
|---|---|---|
| Sulfentrazone | Metamitron | Tefuryltrione |
| Sulfentrazone | Metamitron | Tolpyralate |
| Sulfentrazone | Metamitron | Topramezone |
| Sulfentrazone | Metribuzin | Benzobicyclon |
| Sulfentrazone | Metribuzin | Benzofenap |
| Sulfentrazone | Metribuzin | Bicyclopyrone |
| Sulfentrazone | Metribuzin | Fenquinotrione |
| Sulfentrazone | Metribuzin | Isoxachlortole |
| Sulfentrazone | Metribuzin | Isoxaflutole |
| Sulfentrazone | Metribuzin | Mesotrione |
| Sulfentrazone | Metribuzin | Pyrasulfotole |
| Sulfentrazone | Metribuzin | Pyrazolynate |
| Sulfentrazone | Metribuzin | Pyrazoxyfen |
| Sulfentrazone | Metribuzin | Sulcotrione |
| Sulfentrazone | Metribuzin | Tefuryltrione |
| Sulfentrazone | Metribuzin | Tolpyralate |
| Sulfentrazone | Metribuzin | Topramezone |
| Sulfentrazone | Diuron | Benzobicyclon |
| Sulfentrazone | Diuron | Benzofenap |
| Sulfentrazone | Diuron | Bicyclopyrone |
| Sulfentrazone | Diuron | Fenquinotrione |
| Sulfentrazone | Diuron | Isoxachlortole |
| Sulfentrazone | Diuron | Isoxaflutole |
| Sulfentrazone | Diuron | Mesotrione |
| Sulfentrazone | Diuron | Pyrasulfotole |
| Sulfentrazone | Diuron | Pyrazolynate |
| Sulfentrazone | Diuron | Pyrazoxyfen |
| Sulfentrazone | Diuron | Sulcotrione |
| Sulfentrazone | Diuron | Tefuryltrione |
| Sulfentrazone | Diuron | Tolpyralate |
| Sulfentrazone | Diuron | Topramezone |
| Sulfentrazone | Linuron | Benzobicyclon |
| Sulfentrazone | Linuron | Benzofenap |
| Sulfentrazone | Linuron | Bicyclopyrone |
| Sulfentrazone | Linuron | Fenquinotrione |
| Sulfentrazone | Linuron | Isoxachlortole |
| Sulfentrazone | Linuron | Isoxaflutole |
| Sulfentrazone | Linuron | Mesotrione |
| Sulfentrazone | Linuron | Pyrasulfotole |
| Sulfentrazone | Linuron | Pyrazolynate |
| Sulfentrazone | Linuron | Pyrazoxyfen |
| Sulfentrazone | Linuron | Sulcotrione |
| Sulfentrazone | Linuron | Tefuryltrione |
| Sulfentrazone | Linuron | Tolpyralate |
| Sulfentrazone | Linuron | Topramezone |
| Sulfentrazone | Chlorpropham | Amitrole |
| Sulfentrazone | Chlorpropham | Mesotrione |
| Sulfentrazone | Chlorpropham | Sulcotrione |
| Sulfentrazone | Chlorpropham | Isoxachlortole |
| Sulfentrazone | Chlorpropham | Isoxaflutole |
| Sulfentrazone | Chlorpropham | Benzofenap |
| Sulfentrazone | Chlorpropham | Pyrazolynate |
| Sulfentrazone | Chlorpropham | Pyrazoxyfen |
| Sulfentrazone | Chlorpropham | Norflurazon |
| Sulfentrazone | Chlorpropham | Diflufenican |
| Sulfentrazone | Chlorpropham | Picolinafen |
| Sulfentrazone | Chlorpropham | Clomazone |
| Sulfentrazone | Chlorpropham | Fluometuron |
| Sulfentrazone | Chlorpropham | Aclonifen |
| Sulfentrazone | Desmedipham | Amitrole |
| Sulfentrazone | Desmedipham | Mesotrione |
| Sulfentrazone | Desmedipham | Sulcotrione |
| Sulfentrazone | Desmedipham | Isoxachlortole |
| Sulfentrazone | Desmedipham | Isoxaflutole |
| Sulfentrazone | Desmedipham | Benzofenap |
| Sulfentrazone | Desmedipham | Pyrazolynate |
| Sulfentrazone | Desmedipham | Pyrazoxyfen |
| Sulfentrazone | Desmedipham | Norflurazon |
| Sulfentrazone | Desmedipham | Diflufenican |
| Sulfentrazone | Desmedipham | Picolinafen |
| Sulfentrazone | Desmedipham | Clomazone |
| Sulfentrazone | Desmedipham | Fluometuron |
| Sulfentrazone | Desmedipham | Aclonifen |
| Sulfentrazone | Phenmedipham | Amitrole |
| Sulfentrazone | Phenmedipham | Mesotrione |
| Sulfentrazone | Phenmedipham | Sulcotrione |
| Sulfentrazone | Phenmedipham | Isoxachlortole |

-continued

| Triazolone Herbicide | Photosystem II Inhibitor | Third Herbicide |
| --- | --- | --- |
| Sulfentrazone | Phenmedipham | Isoxaflutole |
| Sulfentrazone | Phenmedipham | Benzofenap |
| Sulfentrazone | Phenmedipham | Pyrazolynate |
| Sulfentrazone | Phenmedipham | Pyrazoxyfen |
| Sulfentrazone | Phenmedipham | Norflurazon |
| Sulfentrazone | Phenmedipham | Diflufenican |
| Sulfentrazone | Phenmedipham | Picolinafen |
| Sulfentrazone | Phenmedipham | Clomazone |
| Sulfentrazone | Phenmedipham | Fluometuron |
| Sulfentrazone | Phenmedipham | Aclonifen |
| Sulfentrazone | Phenmedipham-Ethyl | Amitrole |
| Sulfentrazone | Phenmedipham-Ethyl | Mesotrione |
| Sulfentrazone | Phenmedipham-Ethyl | Sulcotrione |
| Sulfentrazone | Phenmedipham-Ethyl | Isoxachlortole |
| Sulfentrazone | Phenmedipham-Ethyl | Isoxaflutole |
| Sulfentrazone | Phenmedipham-Ethyl | Benzofenap |
| Sulfentrazone | Phenmedipham-Ethyl | Pyrazolynate |
| Sulfentrazone | Phenmedipham-Ethyl | Pyrazoxyfen |
| Sulfentrazone | Phenmedipham-Ethyl | Norflurazon |
| Sulfentrazone | Phenmedipham-Ethyl | Diflufenican |
| Sulfentrazone | Phenmedipham-Ethyl | Picolinafen |
| Sulfentrazone | Phenmedipham-Ethyl | Clomazone |
| Sulfentrazone | Phenmedipham-Ethyl | Fluometuron |
| Sulfentrazone | Phenmedipham-Ethyl | Aclonifen |
| Sulfentrazone | Atrazine | Amitrole |
| Sulfentrazone | Atrazine | Mesotrione |
| Sulfentrazone | Atrazine | Sulcotrione |
| Sulfentrazone | Atrazine | Isoxachlortole |
| Sulfentrazone | Atrazine | Isoxaflutole |
| Sulfentrazone | Atrazine | Benzofenap |
| Sulfentrazone | Atrazine | Pyrazolynate |
| Sulfentrazone | Atrazine | Pyrazoxyfen |
| Sulfentrazone | Atrazine | Norflurazon |
| Sulfentrazone | Atrazine | Diflufenican |
| Sulfentrazone | Atrazine | Picolinafen |
| Sulfentrazone | Atrazine | Clomazone |
| Sulfentrazone | Atrazine | Fluometuron |
| Sulfentrazone | Atrazine | Aclonifen |
| Sulfentrazone | Bentazon | Amitrole |
| Sulfentrazone | Bentazon | Mesotrione |
| Sulfentrazone | Bentazon | Sulcotrione |
| Sulfentrazone | Bentazon | Isoxachlortole |
| Sulfentrazone | Bentazon | Isoxaflutole |
| Sulfentrazone | Bentazon | Benzofenap |
| Sulfentrazone | Bentazon | Pyrazolynate |
| Sulfentrazone | Bentazon | Pyrazoxyfen |
| Sulfentrazone | Bentazon | Norflurazon |
| Sulfentrazone | Bentazon | Diflufenican |
| Sulfentrazone | Bentazon | Picolinafen |
| Sulfentrazone | Bentazon | Clomazone |
| Sulfentrazone | Bentazon | Fluometuron |
| Sulfentrazone | Bentazon | Aclonifen |
| Sulfentrazone | Metamitron | Amitrole |
| Sulfentrazone | Metamitron | Mesotrione |
| Sulfentrazone | Metamitron | Sulcotrione |
| Sulfentrazone | Metamitron | Isoxachlortole |
| Sulfentrazone | Metamitron | Isoxaflutole |
| Sulfentrazone | Metamitron | Benzofenap |
| Sulfentrazone | Metamitron | Pyrazolynate |
| Sulfentrazone | Metamitron | Pyrazoxyfen |
| Sulfentrazone | Metamitron | Norflurazon |
| Sulfentrazone | Metamitron | Diflufenican |
| Sulfentrazone | Metamitron | Picolinafen |
| Sulfentrazone | Metamitron | Clomazone |
| Sulfentrazone | Metamitron | Fluometuron |
| Sulfentrazone | Metamitron | Aclonifen |
| Sulfentrazone | Metribuzin | Amitrole |
| Sulfentrazone | Metribuzin | Mesotrione |
| Sulfentrazone | Metribuzin | Sulcotrione |
| Sulfentrazone | Metribuzin | Isoxachlortole |
| Sulfentrazone | Metribuzin | Isoxaflutole |
| Sulfentrazone | Metribuzin | Benzofenap |
| Sulfentrazone | Metribuzin | Pyrazolynate |
| Sulfentrazone | Metribuzin | Pyrazoxyfen |
| Sulfentrazone | Metribuzin | Norflurazon |
| Sulfentrazone | Metribuzin | Diflufenican |
| Sulfentrazone | Metribuzin | Picolinafen |

-continued

| Triazolone Herbicide | Photosystem II Inhibitor | Third Herbicide |
| --- | --- | --- |
| Sulfentrazone | Metribuzin | Clomazone |
| Sulfentrazone | Metribuzin | Fluometuron |
| Sulfentrazone | Metribuzin | Aclonifen |
| Sulfentrazone | Diuron | Amitrole |
| Sulfentrazone | Diuron | Mesotrione |
| Sulfentrazone | Diuron | Sulcotrione |
| Sulfentrazone | Diuron | Isoxachlortole |
| Sulfentrazone | Diuron | Isoxaflutole |
| Sulfentrazone | Diuron | Benzofenap |
| Sulfentrazone | Diuron | Pyrazolynate |
| Sulfentrazone | Diuron | Pyrazoxyfen |
| Sulfentrazone | Diuron | Norflurazon |
| Sulfentrazone | Diuron | Diflufenican |
| Sulfentrazone | Diuron | Picolinafen |
| Sulfentrazone | Diuron | Clomazone |
| Sulfentrazone | Diuron | Fluometuron |
| Sulfentrazone | Diuron | Aclonifen |
| Sulfentrazone | Linuron | Amitrole |
| Sulfentrazone | Linuron | Mesotrione |
| Sulfentrazone | Linuron | Sulcotrione |
| Sulfentrazone | Linuron | Isoxachlortole |
| Sulfentrazone | Linuron | Isoxaflutole |
| Sulfentrazone | Linuron | Benzofenap |
| Sulfentrazone | Linuron | Pyrazolynate |
| Sulfentrazone | Linuron | Pyrazoxyfen |
| Sulfentrazone | Linuron | Norflurazon |
| Sulfentrazone | Linuron | Diflufenican |
| Sulfentrazone | Linuron | Picolinafen |
| Sulfentrazone | Linuron | Clomazone |
| Sulfentrazone | Linuron | Fluometuron |
| Sulfentrazone | Linuron | Aclonifen |
| Sulfentrazone | Chlorpropham | Acetochlor |
| Sulfentrazone | Chlorpropham | Alachlor |
| Sulfentrazone | Chlorpropham | Butachlor |
| Sulfentrazone | Chlorpropham | Dimethachlor |
| Sulfentrazone | Chlorpropham | Dimethanamid |
| Sulfentrazone | Chlorpropham | Metazachlor |
| Sulfentrazone | Chlorpropham | Metolachlor |
| Sulfentrazone | Chlorpropham | Pethoxamid |
| Sulfentrazone | Chlorpropham | Pretilachlor |
| Sulfentrazone | Chlorpropham | Propachlor |
| Sulfentrazone | Chlorpropham | Propisochlor |
| Sulfentrazone | Chlorpropham | Thenylchlor |
| Sulfentrazone | Chlorpropham | Diphenamid |
| Sulfentrazone | Chlorpropham | Napropamide |
| Sulfentrazone | Desmedipham | Acetochlor |
| Sulfentrazone | Desmedipham | Alachlor |
| Sulfentrazone | Desmedipham | Butachlor |
| Sulfentrazone | Desmedipham | Dimethachlor |
| Sulfentrazone | Desmedipham | Dimethanamid |
| Sulfentrazone | Desmedipham | Metazachlor |
| Sulfentrazone | Desmedipham | Metolachlor |
| Sulfentrazone | Desmedipham | Pethoxamid |
| Sulfentrazone | Desmedipham | Pretilachlor |
| Sulfentrazone | Desmedipham | Propachlor |
| Sulfentrazone | Desmedipham | Propisochlor |
| Sulfentrazone | Desmedipham | Thenylchlor |
| Sulfentrazone | Desmedipham | Diphenamid |
| Sulfentrazone | Desmedipham | Napropamide |
| Sulfentrazone | Phenmedipham | Acetochlor |
| Sulfentrazone | Phenmedipham | Alachlor |
| Sulfentrazone | Phenmedipham | Butachlor |
| Sulfentrazone | Phenmedipham | Dimethachlor |
| Sulfentrazone | Phenmedipham | Dimethanamid |
| Sulfentrazone | Phenmedipham | Metazachlor |
| Sulfentrazone | Phenmedipham | Metolachlor |
| Sulfentrazone | Phenmedipham | Pethoxamid |
| Sulfentrazone | Phenmedipham | Pretilachlor |
| Sulfentrazone | Phenmedipham | Propachlor |
| Sulfentrazone | Phenmedipham | Propisochlor |
| Sulfentrazone | Phenmedipham | Thenylchlor |
| Sulfentrazone | Phenmedipham | Diphenamid |
| Sulfentrazone | Phenmedipham | Napropamide |
| Sulfentrazone | Phenmedipham-Ethyl | Acetochlor |
| Sulfentrazone | Phenmedipham-Ethyl | Alachlor |
| Sulfentrazone | Phenmedipham-Ethyl | Butachlor |
| Sulfentrazone | Phenmedipham-Ethyl | Dimethachlor |

-continued

| Triazolone Herbicide | Photosystem II Inhibitor | Third Herbicide |
|---|---|---|
| Sulfentrazone | Phenmedipham-Ethyl | Dimethanamid |
| Sulfentrazone | Phenmedipham-Ethyl | Metazachlor |
| Sulfentrazone | Phenmedipham-Ethyl | Metolachlor |
| Sulfentrazone | Phenmedipham-Ethyl | Pethoxamid |
| Sulfentrazone | Phenmedipham-Ethyl | Pretilachlor |
| Sulfentrazone | Phenmedipham-Ethyl | Propachlor |
| Sulfentrazone | Phenmedipham-Ethyl | Propisochlor |
| Sulfentrazone | Phenmedipham-Ethyl | Thenylchlor |
| Sulfentrazone | Phenmedipham-Ethyl | Diphenamid |
| Sulfentrazone | Phenmedipham-Ethyl | Napropamide |
| Sulfentrazone | Atrazine | Acetochlor |
| Sulfentrazone | Atrazine | Alachlor |
| Sulfentrazone | Atrazine | Butachlor |
| Sulfentrazone | Atrazine | Dimethachlor |
| Sulfentrazone | Atrazine | Dimethanamid |
| Sulfentrazone | Atrazine | Metazachlor |
| Sulfentrazone | Atrazine | Metolachlor |
| Sulfentrazone | Atrazine | Pethoxamid |
| Sulfentrazone | Atrazine | Pretilachlor |
| Sulfentrazone | Atrazine | Propachlor |
| Sulfentrazone | Atrazine | Propisochlor |
| Sulfentrazone | Atrazine | Thenylchlor |
| Sulfentrazone | Atrazine | Diphenamid |
| Sulfentrazone | Atrazine | Napropamide |
| Sulfentrazone | Bentazon | Acetochlor |
| Sulfentrazone | Bentazon | Alachlor |
| Sulfentrazone | Bentazon | Butachlor |
| Sulfentrazone | Bentazon | Dimethachlor |
| Sulfentrazone | Bentazon | Dimethanamid |
| Sulfentrazone | Bentazon | Metazachlor |
| Sulfentrazone | Bentazon | Metolachlor |
| Sulfentrazone | Bentazon | Pethoxamid |
| Sulfentrazone | Bentazon | Pretilachlor |
| Sulfentrazone | Bentazon | Propachlor |
| Sulfentrazone | Bentazon | Propisochlor |
| Sulfentrazone | Bentazon | Thenylchlor |
| Sulfentrazone | Bentazon | Diphenamid |
| Sulfentrazone | Bentazon | Napropamide |
| Sulfentrazone | Metamitron | Acetochlor |
| Sulfentrazone | Metamitron | Alachlor |
| Sulfentrazone | Metamitron | Butachlor |
| Sulfentrazone | Metamitron | Dimethachlor |
| Sulfentrazone | Metamitron | Dimethanamid |
| Sulfentrazone | Metamitron | Metazachlor |
| Sulfentrazone | Metamitron | Metolachlor |
| Sulfentrazone | Metamitron | Pethoxamid |
| Sulfentrazone | Metamitron | Pretilachlor |
| Sulfentrazone | Metamitron | Propachlor |
| Sulfentrazone | Metamitron | Propisochlor |
| Sulfentrazone | Metamitron | Thenylchlor |
| Sulfentrazone | Metamitron | Diphenamid |
| Sulfentrazone | Metamitron | Napropamide |
| Sulfentrazone | Metribuzin | Acetochlor |
| Sulfentrazone | Metribuzin | Alachlor |
| Sulfentrazone | Metribuzin | Butachlor |
| Sulfentrazone | Metribuzin | Dimethachlor |
| Sulfentrazone | Metribuzin | Dimethanamid |
| Sulfentrazone | Metribuzin | Metazachlor |
| Sulfentrazone | Metribuzin | Metolachlor |
| Sulfentrazone | Metribuzin | Pethoxamid |
| Sulfentrazone | Metribuzin | Pretilachlor |
| Sulfentrazone | Metribuzin | Propachlor |
| Sulfentrazone | Metribuzin | Propisochlor |
| Sulfentrazone | Metribuzin | Thenylchlor |
| Sulfentrazone | Metribuzin | Diphenamid |
| Sulfentrazone | Metribuzin | Napropamide |
| Sulfentrazone | Diuron | Acetochlor |
| Sulfentrazone | Diuron | Alachlor |
| Sulfentrazone | Diuron | Butachlor |
| Sulfentrazone | Diuron | Dimethachlor |
| Sulfentrazone | Diuron | Dimethanamid |
| Sulfentrazone | Diuron | Metazachlor |
| Sulfentrazone | Diuron | Metolachlor |
| Sulfentrazone | Diuron | Pethoxamid |
| Sulfentrazone | Diuron | Pretilachlor |
| Sulfentrazone | Diuron | Propachlor |
| Sulfentrazone | Diuron | Propisochlor |

-continued

| Triazolone Herbicide | Photosystem II Inhibitor | Third Herbicide |
|---|---|---|
| Sulfentrazone | Diuron | Thenylchlor |
| Sulfentrazone | Diuron | Diphenamid |
| Sulfentrazone | Diuron | Napropamide |
| Sulfentrazone | Linuron | Acetochlor |
| Sulfentrazone | Linuron | Alachlor |
| Sulfentrazone | Linuron | Butachlor |
| Sulfentrazone | Linuron | Dimethachlor |
| Sulfentrazone | Linuron | Dimethanamid |
| Sulfentrazone | Linuron | Metazachlor |
| Sulfentrazone | Linuron | Metolachlor |
| Sulfentrazone | Linuron | Pethoxamid |
| Sulfentrazone | Linuron | Pretilachlor |
| Sulfentrazone | Linuron | Propachlor |
| Sulfentrazone | Linuron | Propisochlor |
| Sulfentrazone | Linuron | Thenylchlor |
| Sulfentrazone | Linuron | Diphenamid |
| Sulfentrazone | Linuron | Napropamide |
| Sulfentrazone | Chlorpropham | Benfluralin |
| Sulfentrazone | Chlorpropham | Butralin |
| Sulfentrazone | Chlorpropham | Dinitramine |
| Sulfentrazone | Chlorpropham | Pendimethalin |
| Sulfentrazone | Chlorpropham | Propyzamide |
| Sulfentrazone | Chlorpropham | DCPA |
| Sulfentrazone | Chlorpropham | Pendimethalin |
| Sulfentrazone | Chlorpropham | Ethalfluralin |
| Sulfentrazone | Chlorpropham | Oryzalin |
| Sulfentrazone | Chlorpropham | Trifluralin |
| Sulfentrazone | Chlorpropham | Prodiamine |
| Sulfentrazone | Chlorpropham | Dithiopyr |
| Sulfentrazone | Desmedipham | Benfluralin |
| Sulfentrazone | Desmedipham | Butralin |
| Sulfentrazone | Desmedipham | Dinitramine |
| Sulfentrazone | Desmedipham | Pendimethalin |
| Sulfentrazone | Desmedipham | Propyzamide |
| Sulfentrazone | Desmedipham | DCPA |
| Sulfentrazone | Desmedipham | Pendimethalin |
| Sulfentrazone | Desmedipham | Ethalfluralin |
| Sulfentrazone | Desmedipham | Oryzalin |
| Sulfentrazone | Desmedipham | Trifluralin |
| Sulfentrazone | Desmedipham | Prodiamine |
| Sulfentrazone | Desmedipham | Dithiopyr |
| Sulfentrazone | Phenmedipham | Benfluralin |
| Sulfentrazone | Phenmedipham | Butralin |
| Sulfentrazone | Phenmedipham | Dinitramine |
| Sulfentrazone | Phenmedipham | Pendimethalin |
| Sulfentrazone | Phenmedipham | Propyzamide |
| Sulfentrazone | Phenmedipham | DCPA |
| Sulfentrazone | Phenmedipham | Ethalfluralin |
| Sulfentrazone | Phenmedipham | Oryzalin |
| Sulfentrazone | Phenmedipham | Trifluralin |
| Sulfentrazone | Phenmedipham | Prodiamine |
| Sulfentrazone | Phenmedipham | Dithiopyr |
| Sulfentrazone | Phenmedipham-Ethyl | Benfluralin |
| Sulfentrazone | Phenmedipham-Ethyl | Butralin |
| Sulfentrazone | Phenmedipham-Ethyl | Dinitramine |
| Sulfentrazone | Phenmedipham-Ethyl | Propyzamide |
| Sulfentrazone | Phenmedipham-Ethyl | DCPA |
| Sulfentrazone | Phenmedipham-Ethyl | Pendimethalin |
| Sulfentrazone | Phenmedipham-Ethyl | Ethalfluralin |
| Sulfentrazone | Phenmedipham-Ethyl | Oryzalin |
| Sulfentrazone | Phenmedipham-Ethyl | Trifluralin |
| Sulfentrazone | Phenmedipham-Ethyl | Prodiamine |
| Sulfentrazone | Phenmedipham-Ethyl | Dithiopyr |
| Sulfentrazone | Atrazine | Benfluralin |
| Sulfentrazone | Atrazine | Butralin |
| Sulfentrazone | Atrazine | Dinitramine |
| Sulfentrazone | Atrazine | Oryzalin |
| Sulfentrazone | Atrazine | Trifluralin |
| Sulfentrazone | Atrazine | Propyzamide |
| Sulfentrazone | Atrazine | DCPA |
| Sulfentrazone | Atrazine | Pendimethalin |
| Sulfentrazone | Atrazine | Ethalfluralin |
| Sulfentrazone | Atrazine | Prodiamine |
| Sulfentrazone | Atrazine | Dithiopyr |
| Sulfentrazone | Bentazon | Benfluralin |
| Sulfentrazone | Bentazon | Butralin |
| Sulfentrazone | Bentazon | Dinitramine |

-continued

| Triazolone Herbicide | Photosystem II Inhibitor | Third Herbicide |
| --- | --- | --- |
| Sulfentrazone | Bentazon | Oryzalin |
| Sulfentrazone | Bentazon | Pendimethalin |
| Sulfentrazone | Bentazon | Propyzamide |
| Sulfentrazone | Bentazon | DCPA |
| Sulfentrazone | Bentazon | Pendimethalin |
| Sulfentrazone | Bentazon | Ethalfluralin |
| Sulfentrazone | Bentazon | Trifluralin |
| Sulfentrazone | Bentazon | Prodiamine |
| Sulfentrazone | Bentazon | Dithiopyr |
| Sulfentrazone | Metamitron | Benfluralin |
| Sulfentrazone | Metamitron | Butralin |
| Sulfentrazone | Metamitron | Dinitramine |
| Sulfentrazone | Metamitron | Propyzamide |
| Sulfentrazone | Metamitron | DCPA |
| Sulfentrazone | Metamitron | Pendimethalin |
| Sulfentrazone | Metamitron | Ethalfluralin |
| Sulfentrazone | Metamitron | Oryzalin |
| Sulfentrazone | Metamitron | Trifluralin |
| Sulfentrazone | Metamitron | Prodiamine |
| Sulfentrazone | Metamitron | Dithiopyr |
| Sulfentrazone | Metribuzin | Benfluralin |
| Sulfentrazone | Metribuzin | Butralin |
| Sulfentrazone | Metribuzin | Dinitramine |
| Sulfentrazone | Metribuzin | Oryzalin |
| Sulfentrazone | Metribuzin | Pendimethalin |
| Sulfentrazone | Metribuzin | Trifluralin |
| Sulfentrazone | Metribuzin | Propyzamide |
| Sulfentrazone | Metribuzin | DCPA |
| Sulfentrazone | Metribuzin | Ethalfluralin |
| Sulfentrazone | Metribuzin | Prodiamine |
| Sulfentrazone | Metribuzin | Dithiopyr |
| Sulfentrazone | Diuron | Benfluralin |
| Sulfentrazone | Diuron | Butralin |
| Sulfentrazone | Diuron | Dinitramine |
| Sulfentrazone | Diuron | Oryzalin |
| Sulfentrazone | Diuron | Trifluralin |
| Sulfentrazone | Diuron | Propyzamide |
| Sulfentrazone | Diuron | DCPA |
| Sulfentrazone | Diuron | Pendimethalin |
| Sulfentrazone | Diuron | Ethalfluralin |
| Sulfentrazone | Diuron | Prodiamine |
| Sulfentrazone | Diuron | Dithiopyr |
| Sulfentrazone | Linuron | Benfluralin |
| Sulfentrazone | Linuron | Butralin |
| Sulfentrazone | Linuron | Dinitramine |
| Sulfentrazone | Linuron | Pendimethalin |
| Sulfentrazone | Linuron | Trifluralin |
| Sulfentrazone | Linuron | Propyzamide |
| Sulfentrazone | Linuron | DCPA |
| Sulfentrazone | Linuron | Ethalfluralin |
| Sulfentrazone | Linuron | Oryzalin |
| Sulfentrazone | Linuron | Prodiamine |
| Sulfentrazone | Linuron | Dithiopyr |
| Sulfentrazone | Chlorpropham | Acifluorfen |
| Sulfentrazone | Chlorpropham | Fomesafen |
| Sulfentrazone | Chlorpropham | Lactofen |
| Sulfentrazone | Chlorpropham | Flumiclorac |
| Sulfentrazone | Chlorpropham | Flumioxazin |
| Sulfentrazone | Chlorpropham | Flufenpyr-Ethyl |
| Sulfentrazone | Chlorpropham | Fomesafen |
| Sulfentrazone | Chlorpropham | Fluthiacet-Ethyl |
| Sulfentrazone | Chlorpropham | Saflufenacil |
| Sulfentrazone | Chlorpropham | Azafenidin |
| Sulfentrazone | Chlorpropham | Benzfendizone |
| Sulfentrazone | Chlorpropham | Bifenox |
| Sulfentrazone | Chlorpropham | Butafenacil |
| Sulfentrazone | Chlorpropham | Oxadiazon |
| Sulfentrazone | Desmedipham | Acifluorfen |
| Sulfentrazone | Desmedipham | Fomesafen |
| Sulfentrazone | Desmedipham | Lactofen |
| Sulfentrazone | Desmedipham | Flumiclorac |
| Sulfentrazone | Desmedipham | Flumioxazin |
| Sulfentrazone | Desmedipham | Flufenpyr-Ethyl |
| Sulfentrazone | Desmedipham | Fomesafen |
| Sulfentrazone | Desmedipham | Fluthiacet-Ethyl |
| Sulfentrazone | Desmedipham | Saflufenacil |
| Sulfentrazone | Desmedipham | Azafenidin |

-continued

| Triazolone Herbicide | Photosystem II Inhibitor | Third Herbicide |
| --- | --- | --- |
| Sulfentrazone | Desmedipham | Benzfendizone |
| Sulfentrazone | Desmedipham | Bifenox |
| Sulfentrazone | Desmedipham | Butafenacil |
| Sulfentrazone | Desmedipham | Oxadiazon |
| Sulfentrazone | Phenmedipham | Acifluorfen |
| Sulfentrazone | Phenmedipham | Fomesafen |
| Sulfentrazone | Phenmedipham | Lactofen |
| Sulfentrazone | Phenmedipham | Flumiclorac |
| Sulfentrazone | Phenmedipham | Flumioxazin |
| Sulfentrazone | Phenmedipham | Flufenpyr-Ethyl |
| Sulfentrazone | Phenmedipham | Fomesafen |
| Sulfentrazone | Phenmedipham | Fluthiacel-Ethyl |
| Sulfentrazone | Phenmedipham | Saflufenacil |
| Sulfentrazone | Phenmedipham | Azafenidin |
| Sulfentrazone | Phenmedipham | Benzfendizone |
| Sulfentrazone | Phenmedipham | Bifenox |
| Sulfentrazone | Phenmedipham | Butafenacil |
| Sulfentrazone | Phenmedipham | Oxadiazon |
| Sulfentrazone | Phenmedipham-Ethyl | Acifluorfen |
| Sulfentrazone | Phenmedipham-Ethyl | Fomesafen |
| Sulfentrazone | Phenmedipham-Ethyl | Lactofen |
| Sulfentrazone | Phenmedipham-Ethyl | Flumiclorac |
| Sulfentrazone | Phenmedipham-Ethyl | Flumioxazin |
| Sulfentrazone | Phenmedipham-Ethyl | Flufenpyr-Ethyl |
| Sulfentrazone | Phenmedipham-Ethyl | Fomesafen |
| Sulfentrazone | Phenmedipham-Ethyl | Fluthiacet-Ethyl |
| Sulfentrazone | Phenmedipham-Ethyl | Saflufenacil |
| Sulfentrazone | Phenmedipham-Ethyl | Azafenidin |
| Sulfentrazone | Phenmedipham-Ethyl | Benzfendizone |
| Sulfentrazone | Phenmedipham-Ethyl | Bifenox |
| Sulfentrazone | Phenmedipham-Ethyl | Butafenacil |
| Sulfentrazone | Phenmedipham-Ethyl | Oxadiazon |
| Sulfentrazone | Atrazine | Acifluorfen |
| Sulfentrazone | Atrazine | Fomesafen |
| Sulfentrazone | Atrazine | Lactofen |
| Sulfentrazone | Atrazine | Flumiclorac |
| Sulfentrazone | Atrazine | Flumioxazin |
| Sulfentrazone | Atrazine | Flufenpyr-Ethyl |
| Sulfentrazone | Atrazine | Fomesafen |
| Sulfentrazone | Atrazine | Fluthiacet-Ethyl |
| Sulfentrazone | Atrazine | Saflufenacil |
| Sulfentrazone | Atrazine | Azafenidin |
| Sulfentrazone | Atrazine | Benzfendizone |
| Sulfentrazone | Atrazine | Bifenox |
| Sulfentrazone | Atrazine | Butafenacil |
| Sulfentrazone | Atrazine | Oxadiazon |
| Sulfentrazone | Bentazon | Acifluorfen |
| Sulfentrazone | Bentazon | Fomesafen |
| Sulfentrazone | Bentazon | Lactofen |
| Sulfentrazone | Bentazon | Flumiclorac |
| Sulfentrazone | Bentazon | Flumioxazin |
| Sulfentrazone | Bentazon | Flufenpyr-Ethyl |
| Sulfentrazone | Bentazon | Fomesafen |
| Sulfentrazone | Bentazon | Fluthiacet-Ethyl |
| Sulfentrazone | Bentazon | Saflufenacil |
| Sulfentrazone | Bentazon | Azafenidin |
| Sulfentrazone | Bentazon | Benzfendizone |
| Sulfentrazone | Bentazon | Bifenox |
| Sulfentrazone | Bentazon | Butafenacil |
| Sulfentrazone | Bentazon | Oxadiazon |
| Sulfentrazone | Metamitron | Acifluorfen |
| Sulfentrazone | Metamitron | Fomesafen |
| Sulfentrazone | Metamitron | Lactofen |
| Sulfentrazone | Metamitron | Flumiclorac |
| Sulfentrazone | Metamitron | Flumioxazin |
| Sulfentrazone | Metamitron | Flufenpyr-Ethyl |
| Sulfentrazone | Metamitron | Fomesafen |
| Sulfentrazone | Metamitron | Fluthiacet-Ethyl |
| Sulfentrazone | Metamitron | Saflufenacil |
| Sulfentrazone | Metamitron | Azafenidin |
| Sulfentrazone | Metamitron | Benzfendizone |
| Sulfentrazone | Metamitron | Bifenox |
| Sulfentrazone | Metamitron | Butafenacil |
| Sulfentrazone | Metamitron | Oxadiazon |
| Sulfentrazone | Metribuzin | Acifluorfen |
| Sulfentrazone | Metribuzin | Fomesafen |
| Sulfentrazone | Metribuzin | Lactofen |

-continued

| Triazolone Herbicide | Photosystem II Inhibitor | Third Herbicide |
|---|---|---|
| Sulfentrazone | Metribuzin | Flumiclorac |
| Sulfentrazone | Metribuzin | Flumioxazin |
| Sulfentrazone | Metribuzin | Flufenpyr-Ethyl |
| Sulfentrazone | Metribuzin | Fomesafen |
| Sulfentrazone | Metribuzin | Fluthiacet-Ethyl |
| Sulfentrazone | Metribuzin | Saflufenacil |
| Sulfentrazone | Metribuzin | Azafenidin |
| Sulfentrazone | Metribuzin | Benzfendizone |
| Sulfentrazone | Metribuzin | Bifenox |
| Sulfentrazone | Metribuzin | Butafenacil |
| Sulfentrazone | Metribuzin | Oxadiazon |
| Sulfentrazone | Diuron | Acifluorfen |
| Sulfentrazone | Diuron | Fomesafen |
| Sulfentrazone | Diuron | Lactofen |
| Sulfentrazone | Diuron | Flumiclorac |
| Sulfentrazone | Diuron | Flumioxazin |
| Sulfentrazone | Diuron | Flufenpyr-Ethyl |
| Sulfentrazone | Diuron | Fomesafen |
| Sulfentrazone | Diuron | Fluthiacet-Ethyl |
| Sulfentrazone | Diuron | Saflufenacil |
| Sulfentrazone | Diuron | Azafenidin |
| Sulfentrazone | Diuron | Benzfendizone |
| Sulfentrazone | Diuron | Bifenox |
| Sulfentrazone | Diuron | Butafenacil |
| Sulfentrazone | Diuron | Oxadiazon |
| Sulfentrazone | Linuron | Acifluorfen |
| Sulfentrazone | Linuron | Fomesafen |
| Sulfentrazone | Linuron | Lactofen |
| Sulfentrazone | Linuron | Flumiclorac |
| Sulfentrazone | Linuron | Flumioxazin |
| Sulfentrazone | Linuron | Flufenpyr-Ethyl |
| Sulfentrazone | Linuron | Fomesafen |
| Sulfentrazone | Linuron | Fluthiacet-Ethyl |
| Sulfentrazone | Linuron | Saflufenacil |
| Sulfentrazone | Linuron | Azafenidin |
| Sulfentrazone | Linuron | Benzfendizone |
| Sulfentrazone | Linuron | Bifenox |
| Sulfentrazone | Linuron | Butafenacil |
| Sulfentrazone | Linuron | Oxadiazon |
| Sulfentrazone | Chlorpropham | Dichlobenil |
| Sulfentrazone | Chlorpropham | Chlorthiamid |
| Sulfentrazone | Chlorpropham | Indaziflam |
| Sulfentrazone | Chlorpropham | Isoxaben |
| Sulfentrazone | Chlorpropham | Dichlobenil |
| Sulfentrazone | Chlorpropham | Flupoxam |
| Sulfentrazone | Desmedipham | Dichlobenil |
| Sulfentrazone | Desmedipham | Chlorthiamid |
| Sulfentrazone | Desmedipham | Indaziflam |
| Sulfentrazone | Desmedipham | Isoxaben |
| Sulfentrazone | Desmedipham | Dichlobenil |
| Sulfentrazone | Desmedipham | Flupoxam |
| Sulfentrazone | Phenmedipham | Dichlobenil |
| Sulfentrazone | Phenmedipham | Chlorthiamid |
| Sulfentrazone | Phenmedipham | Indaziflam |
| Sulfentrazone | Phenmedipham | Isoxaben |
| Sulfentrazone | Phenmedipham | Dichlobenil |
| Sulfentrazone | Phenmedipham | Flupoxam |
| Sulfentrazone | Phenmedipham-Ethyl | Dichlobenil |
| Sulfentrazone | Phenmedipham-Ethyl | Chlorthiamid |
| Sulfentrazone | Phenmedipham-Ethyl | Indaziflam |
| Sulfentrazone | Phenmedipham-Ethyl | Isoxaben |
| Sulfentrazone | Phenmedipham-Ethyl | Dichlobenil |
| Sulfentrazone | Phenmedipham-Ethyl | Flupoxam |
| Sulfentrazone | Atrazine | Dichlobenil |
| Sulfentrazone | Atrazine | Chlorthiamid |
| Sulfentrazone | Atrazine | Indaziflam |
| Sulfentrazone | Atrazine | Isoxaben |
| Sulfentrazone | Atrazine | Dichlobenil |
| Sulfentrazone | Atrazine | Flupoxam |
| Sulfentrazone | Bentazon | Dichlobenil |
| Sulfentrazone | Bentazon | Chlorthiamid |
| Sulfentrazone | Bentazon | Indaziflam |
| Sulfentrazone | Bentazon | Isoxaben |
| Sulfentrazone | Bentazon | Flupoxam |
| Sulfentrazone | Metamitron | Dichlobenil |
| Sulfentrazone | Metamitron | Chlorthiamid |
| Sulfentrazone | Metamitron | Indaziflam |

-continued

| Triazolone Herbicide | Photosystem II Inhibitor | Third Herbicide |
|---|---|---|
| Sulfentrazone | Metamitron | Isoxaben |
| Sulfentrazone | Metamitron | Flupoxam |
| Sulfentrazone | Metribuzin | Chlorthiamid |
| Sulfentrazone | Metribuzin | Indaziflam |
| Sulfentrazone | Metribuzin | Isoxaben |
| Sulfentrazone | Metribuzin | Dichlobenil |
| Sulfentrazone | Metribuzin | Flupoxam |
| Sulfentrazone | Diuron | Dichlobenil |
| Sulfentrazone | Diuron | Chlorthiamid |
| Sulfentrazone | Diuron | Indaziflam |
| Sulfentrazone | Diuron | Isoxaben |
| Sulfentrazone | Diuron | Flupoxam |
| Sulfentrazone | Linuron | Dichlobenil |
| Sulfentrazone | Linuron | Chlorthiamid |
| Sulfentrazone | Linuron | Indaziflam |
| Sulfentrazone | Linuron | Isoxaben |
| Sulfentrazone | Linuron | Flupoxam |
| Sulfentrazone | Chlorpropham | Imazamox |
| Sulfentrazone | Chlorpropham | Imazapic |
| Sulfentrazone | Chlorpropham | Imazapyr |
| Sulfentrazone | Chlorpropham | Imazethapyr |
| Sulfentrazone | Chlorpropham | Flucarbazone-Sodium |
| Sulfentrazone | Chlorpropham | Bensulfuron |
| Sulfentrazone | Chlorpropham | Halosulfuron |
| Sulfentrazone | Chlorpropham | Metsulfuron |
| Sulfentrazone | Chlorpropham | Metazachlor |
| Sulfentrazone | Chlorpropham | Pinoxaden |
| Sulfentrazone | Desmedipham | Imazamox |
| Sulfentrazone | Desmedipham | Imazapic |
| Sulfentrazone | Desmedipham | Imazapyr |
| Sulfentrazone | Desmedipham | Imazethapyr |
| Sulfentrazone | Desmedipham | Flucarbazone-Sodium |
| Sulfentrazone | Desmedipham | Bensulfuron |
| Sulfentrazone | Desmedipham | Halosulfuron |
| Sulfentrazone | Desmedipham | Metsulfuron |
| Sulfentrazone | Desmedipham | Metazachlor |
| Sulfentrazone | Desmedipham | Metazachlor |
| Sulfentrazone | Desmedipham | Pinoxaden |
| Sulfentrazone | Phenmedipham | Imazamox |
| Sulfentrazone | Phenmedipham | Imazapic |
| Sulfentrazone | Phenmedipham | Imazapyr |
| Sulfentrazone | Phenmedipham | Imazethapyr |
| Sulfentrazone | Phenmedipham | Flucarbazone-Sodium |
| Sulfentrazone | Phenmedipham | Bensulfuron |
| Sulfentrazone | Phenmedipham | Halosulfuron |
| Sulfentrazone | Phenmedipham | Metsulfuron |
| Sulfentrazone | Phenmedipham | Metazachlor |
| Sulfentrazone | Phenmedipham | Pinoxaden |
| Sulfentrazone | Phenmedipham-Ethyl | Imazamox |
| Sulfentrazone | Phenmedipham-Ethyl | Imazapic |
| Sulfentrazone | Phenmedipham-Ethyl | Imazapyr |
| Sulfentrazone | Phenmedipham-Ethyl | Imazethapyr |
| Sulfentrazone | Phenmedipham-Ethyl | carfentrazone |
| Sulfentrazone | Phenmedipham-Ethyl | Flucarbazone-Sodium |
| Sulfentrazone | Phenmedipham-Ethyl | Bensulfuron |
| Sulfentrazone | Phenmedipham-Ethyl | Halosulfuron |
| Sulfentrazone | Phenmedipham-Ethyl | Metsulfuron |
| Sulfentrazone | Phenmedipham-Ethyl | Metazachlor |
| Sulfentrazone | Phenmedipham-Ethyl | Metazachlor |
| Sulfentrazone | Phenmedipham-Ethyl | Pinoxaden |
| Sulfentrazone | Atrazine | Imazamox |
| Sulfentrazone | Atrazine | Imazapic |
| Sulfentrazone | Atrazine | Imazapyr |
| Sulfentrazone | Atrazine | Imazethapyr |
| Sulfentrazone | Atrazine | carfentrazone |
| Sulfentrazone | Atrazine | Flucarbazone-Sodium |
| Sulfentrazone | Atrazine | Bensulfuron |
| Sulfentrazone | Atrazine | Halosulfuron |
| Sulfentrazone | Atrazine | Metsulfuron |
| Sulfentrazone | Atrazine | Metazachlor |
| Sulfentrazone | Atrazine | Pinoxaden |
| Sulfentrazone | Bentazon | Imazamox |
| Sulfentrazone | Bentazon | Imazapic |
| Sulfentrazone | Bentazon | Imazapyr |
| Sulfentrazone | Bentazon | Imazethapyr |
| Sulfentrazone | Bentazon | carfentrazone |
| Sulfentrazone | Bentazon | Flucarbazone-Sodium |

-continued

| Triazolone Herbicide | Photosystem II Inhibitor | Third Herbicide |
|---|---|---|
| Sulfentrazone | Bentazon | Bensulfuron |
| Sulfentrazone | Bentazon | Halosulfuron |
| Sulfentrazone | Bentazon | Metsulfuron |
| Sulfentrazone | Bentazon | Metazachlor |
| Sulfentrazone | Bentazon | Pinoxaden |
| Sulfentrazone | Metamitron | Imazamox |
| Sulfentrazone | Metamitron | Imazapic |
| Sulfentrazone | Metamitron | Imazapyr |
| Sulfentrazone | Metamitron | Imazethapyr |
| Sulfentrazone | Metamitron | carfentrazone |
| Sulfentrazone | Metamitron | Flucarbazone-Sodium |
| Sulfentrazone | Metamitron | Bensulfuron |
| Sulfentrazone | Metamitron | Halosulfuron |
| Sulfentrazone | Metamitron | Metsulfuron |
| Sulfentrazone | Metamitron | Metazachlor |
| Sulfentrazone | Metamitron | Pinoxaden |
| Sulfentrazone | Metribuzin | Imazamox |
| Sulfentrazone | Metribuzin | Imazapic |
| Sulfentrazone | Metribuzin | Imazapyr |
| Sulfentrazone | Metribuzin | Imazethapyr |
| Sulfentrazone | Metribuzin | carfentrazone |
| Sulfentrazone | Metribuzin | Flucarbazone-Sodium |
| Sulfentrazone | Metribuzin | Bensulfuron |
| Sulfentrazone | Metribuzin | Halosulfuron |
| Sulfentrazone | Metribuzin | Metsulfuron |
| Sulfentrazone | Metribuzin | Metazachlor |
| Sulfentrazone | Metribuzin | Pinoxaden |
| Sulfentrazone | Diuron | Imazamox |
| Sulfentrazone | Diuron | Imazapic |
| Sulfentrazone | Diuron | Imazapyr |
| Sulfentrazone | Diuron | Imazethapyr |
| Sulfentrazone | Diuron | carfentrazone |
| Sulfentrazone | Diuron | Flucarbazone-Sodium |
| Sulfentrazone | Diuron | Bensulfuron |
| Sulfentrazone | Diuron | Halosulfuron |
| Sulfentrazone | Diuron | Metsulfuron |
| Flucarbazone | Chlorpropham | Benzobicyclon |
| Flucarbazone | Chlorpropham | Benzofenap |
| Flucarbazone | Chlorpropham | Bicyclopyrone |
| Flucarbazone | Chlorpropham | Fenquinotrione |
| Flucarbazone | Chlorpropham | Isoxachlortole |
| Flucarbazone | Chlorpropham | Isoxaflutole |
| Flucarbazone | Chlorpropham | Mesotrione |
| Flucarbazone | Chlorpropham | Pyrasulfotole |
| Flucarbazone | Chlorpropham | Pyrazolynate |
| Flucarbazone | Chlorpropham | Pyrazoxyfen |
| Flucarbazone | Chlorpropham | Sulcotrione |
| Flucarbazone | Chlorpropham | Tefuryltrione |
| Flucarbazone | Chlorpropham | Tolpyralate |
| Flucarbazone | Chlorpropham | Topramezone |
| Flucarbazone | Desmedipham | Benzobicyclon |
| Flucarbazone | Desmedipham | Benzofenap |
| Flucarbazone | Desmedipham | Bicyclopyrone |
| Flucarbazone | Desmedipham | Fenquinotrione |
| Flucarbazone | Desmedipham | Isoxachlortole |
| Flucarbazone | Desmedipham | Isoxaflutole |
| Flucarbazone | Desmedipham | Mesotrione |
| Flucarbazone | Desmedipham | Pyrasulfotole |
| Flucarbazone | Desmedipham | Pyrazolynate |
| Flucarbazone | Desmedipham | Pyrazoxyfen |
| Flucarbazone | Desmedipham | Sulcotrione |
| Flucarbazone | Desmedipham | Tefuryltrione |
| Flucarbazone | Desmedipham | Tolpyralate |
| Flucarbazone | Desmedipham | Topramezone |
| Flucarbazone | Phenmedipham | Benzobicyclon |
| Flucarbazone | Phenmedipham | Benzofenap |
| Flucarbazone | Phenmedipham | Bicyclopyrone |
| Flucarbazone | Phenmedipham | Fenquinotrione |
| Flucarbazone | Phenmedipham | Isoxachlortole |
| Flucarbazone | Phenmedipham | Isoxaflutole |
| Flucarbazone | Phenmedipham | Mesotrione |
| Flucarbazone | Phenmedipham | Pyrasulfotole |
| Flucarbazone | Phenmedipham | Pyrazolynate |
| Flucarbazone | Phenmedipham | Pyrazoxyfen |
| Flucarbazone | Phenmedipham | Sulcotrione |
| Flucarbazone | Phenmedipham | Tefuryltrione |
| Flucarbazone | Phenmedipham | Tolpyralate |

-continued

| Triazolone Herbicide | Photosystem II Inhibitor | Third Herbicide |
|---|---|---|
| Flucarbazone | Phenmedipham | Topramezone |
| Flucarbazone | Phenmedipham-Ethyl | Benzobicyclon |
| Flucarbazone | Phenmedipham-Ethyl | Benzofenap |
| Flucarbazone | Phenmedipham-Ethyl | Bicyclopyrone |
| Flucarbazone | Phenmedipham-Ethyl | Fenquinotrione |
| Flucarbazone | Phenmedipham-Ethyl | Isoxachlortole |
| Flucarbazone | Phenmedipham-Ethyl | Isoxaflutole |
| Flucarbazone | Phenmedipham-Ethyl | Mesotrione |
| Flucarbazone | Phenmedipham-Ethyl | Pyrasulfotole |
| Flucarbazone | Phenmedipham-Ethyl | Pyrazolynate |
| Flucarbazone | Phenmedipham-Ethyl | Pyrazoxyfen |
| Flucarbazone | Phenmedipham-Ethyl | Sulcotrione |
| Flucarbazone | Phenmedipham-Ethyl | Tefuryltrione |
| Flucarbazone | Phenmedipham-Ethyl | Tolpyralate |
| Flucarbazone | Phenmedipham-Ethyl | Topramezone |
| Flucarbazone | Atrazine | Benzobicyclon |
| Flucarbazone | Atrazine | Benzofenap |
| Flucarbazone | Atrazine | Bicyclopyrone |
| Flucarbazone | Atrazine | Fenquinotrione |
| Flucarbazone | Atrazine | Isoxachlortole |
| Flucarbazone | Atrazine | Isoxaflutole |
| Flucarbazone | Atrazine | Mesotrione |
| Flucarbazone | Atrazine | Pyrasulfotole |
| Flucarbazone | Atrazine | Pyrazolynate |
| Flucarbazone | Atrazine | Pyrazoxyfen |
| Flucarbazone | Atrazine | Sulcotrione |
| Flucarbazone | Atrazine | Tefuryltrione |
| Flucarbazone | Atrazine | Tolpyralate |
| Flucarbazone | Atrazine | Topramezone |
| Flucarbazone | Bentazon | Benzobicyclon |
| Flucarbazone | Bentazon | Benzofenap |
| Flucarbazone | Bentazon | Bicyclopyrone |
| Flucarbazone | Bentazon | Fenquinotrione |
| Flucarbazone | Bentazon | Isoxachlortole |
| Flucarbazone | Bentazon | Isoxaflutole |
| Flucarbazone | Bentazon | Mesotrione |
| Flucarbazone | Bentazon | Pyrasulfotole |
| Flucarbazone | Bentazon | Pyrazolynate |
| Flucarbazone | Bentazon | Pyrazoxyfen |
| Flucarbazone | Bentazon | Sulcotrione |
| Flucarbazone | Bentazon | Tefuryltrione |
| Flucarbazone | Bentazon | Tolpyralate |
| Flucarbazone | Bentazon | Topramezone |
| Flucarbazone | Metamitron | Benzobicyclon |
| Flucarbazone | Metamitron | Benzofenap |
| Flucarbazone | Metamitron | Bicyclopyrone |
| Flucarbazone | Metamitron | Fenquinotrione |
| Flucarbazone | Metamitron | Isoxachlortole |
| Flucarbazone | Metamitron | Isoxaflutole |
| Flucarbazone | Metamitron | Mesotrione |
| Flucarbazone | Metamitron | Pyrasulfotole |
| Flucarbazone | Metamitron | Pyrazolynate |
| Flucarbazone | Metamitron | Pyrazoxyfen |
| Flucarbazone | Metamitron | Sulcotrione |
| Flucarbazone | Metamitron | Tefuryltrione |
| Flucarbazone | Metamitron | Tolpyralate |
| Flucarbazone | Metamitron | Topramezone |
| Flucarbazone | Metribuzin | Benzobicyclon |
| Flucarbazone | Metribuzin | Benzofenap |
| Flucarbazone | Metribuzin | Bicyclopyrone |
| Flucarbazone | Metribuzin | Fenquinotrione |
| Flucarbazone | Metribuzin | Isoxachlortole |
| Flucarbazone | Metribuzin | Isoxaflutole |
| Flucarbazone | Metribuzin | Mesotrione |
| Flucarbazone | Metribuzin | Pyrasulfotole |
| Flucarbazone | Metribuzin | Pyrazolynate |
| Flucarbazone | Metribuzin | Pyrazoxyfen |
| Flucarbazone | Metribuzin | Sulcotrione |
| Flucarbazone | Metribuzin | Tefuryltrione |
| Flucarbazone | Metribuzin | Tolpyralate |
| Flucarbazone | Metribuzin | Topramezone |
| Flucarbazone | Diuron | Benzobicyclon |
| Flucarbazone | Diuron | Benzofenap |
| Flucarbazone | Diuron | Bicyclopyrone |
| Flucarbazone | Diuron | Fenquinotrione |
| Flucarbazone | Diuron | Isoxachlortole |
| Flucarbazone | Diuron | Isoxaflutole |

-continued

| Triazolone Herbicide | Photosystem II Inhibitor | Third Herbicide |
|---|---|---|
| Flucarbazone | Diuron | Mesotrione |
| Flucarbazone | Diuron | Pyrasulfotole |
| Flucarbazone | Diuron | Pyrazolynate |
| Flucarbazone | Diuron | Pyrazoxyfen |
| Flucarbazone | Diuron | Sulcotrione |
| Flucarbazone | Diuron | Tefuryltrione |
| Flucarbazone | Diuron | Tolpyralate |
| Flucarbazone | Diuron | Topramezone |
| Flucarbazone | Linuron | Benzobicyclon |
| Flucarbazone | Linuron | Benzofenap |
| Flucarbazone | Linuron | Bicyclopyrone |
| Flucarbazone | Linuron | Fenquinotrione |
| Flucarbazone | Linuron | Isoxachlortole |
| Flucarbazone | Linuron | Isoxaflutole |
| Flucarbazone | Linuron | Mesotrione |
| Flucarbazone | Linuron | Pyrasulfotole |
| Flucarbazone | Linuron | Pyrazolynate |
| Flucarbazone | Linuron | Pyrazoxyfen |
| Flucarbazone | Linuron | Sulcotrione |
| Flucarbazone | Linuron | Tefuryltrione |
| Flucarbazone | Linuron | Tolpyralate |
| Flucarbazone | Linuron | Topramezone |
| Flucarbazone | Chlorpropham | Amitrole |
| Flucarbazone | Chlorpropham | Mesotrione |
| Flucarbazone | Chlorpropham | Sulcotrione |
| Flucarbazone | Chlorpropham | Isoxachlortole |
| Flucarbazone | Chlorpropham | Isoxaflutole |
| Flucarbazone | Chlorpropham | Benzofenap |
| Flucarbazone | Chlorpropham | Pyrazolynate |
| Flucarbazone | Chlorpropham | Pyrazoxyfen |
| Flucarbazone | Chlorpropham | Norflurazon |
| Flucarbazone | Chlorpropham | Diflufenican |
| Flucarbazone | Chlorpropham | Picolinafen |
| Flucarbazone | Chlorpropham | Clomazone |
| Flucarbazone | Chlorpropham | Fluometuron |
| Flucarbazone | Chlorpropham | Aclonifen |
| Flucarbazone | Desmedipham | Amitrole |
| Flucarbazone | Desmedipham | Mesotrione |
| Flucarbazone | Desmedipham | Sulcotrione |
| Flucarbazone | Desmedipham | Isoxachlortole |
| Flucarbazone | Desmedipham | Isoxaflutole |
| Flucarbazone | Desmedipham | Benzofenap |
| Flucarbazone | Desmedipham | Pyrazolynate |
| Flucarbazone | Desmedipham | Pyrazoxyfen |
| Flucarbazone | Desmedipham | Norflurazon |
| Flucarbazone | Desmedipham | Diflufenican |
| Flucarbazone | Desmedipham | Picolinafen |
| Flucarbazone | Desmedipham | Clomazone |
| Flucarbazone | Desmedipham | Fluometuron |
| Flucarbazone | Desmedipham | Aclonifen |
| Flucarbazone | Phenmedipham | Amitrole |
| Flucarbazone | Phenmedipham | Mesotrione |
| Flucarbazone | Phenmedipham | Sulcotrione |
| Flucarbazone | Phenmedipham | Isoxachlortole |
| Flucarbazone | Phenmedipham | Isoxaflutole |
| Flucarbazone | Phenmedipham | Benzofenap |
| Flucarbazone | Phenmedipham | Pyrazolynate |
| Flucarbazone | Phenmedipham | Pyrazoxyfen |
| Flucarbazone | Phenmedipham | Norflurazon |
| Flucarbazone | Phenmedipham | Diflufenican |
| Flucarbazone | Phenmedipham | Picolinafen |
| Flucarbazone | Phenmedipham | Clomazone |
| Flucarbazone | Phenmedipham | Fluometuron |
| Flucarbazone | Phenmedipham | Aclonifen |
| Flucarbazone | Phenmedipham-Ethyl | Amitrole |
| Flucarbazone | Phenmedipham-Ethyl | Mesotrione |
| Flucarbazone | Phenmedipham-Ethyl | Sulcotrione |
| Flucarbazone | Phenmedipham-Ethyl | Isoxachlortole |
| Flucarbazone | Phenmedipham-Ethyl | Isoxaflutole |
| Flucarbazone | Phenmedipham-Ethyl | Benzofenap |
| Flucarbazone | Phenmedipham-Ethyl | Pyrazolynate |
| Flucarbazone | Phenmedipham-Ethyl | Pyrazoxyfen |
| Flucarbazone | Phenmedipham-Ethyl | Norflurazon |
| Flucarbazone | Phenmedipham-Ethyl | Diflufenican |
| Flucarbazone | Phenmedipham-Ethyl | Picolinafen |
| Flucarbazone | Phenmedipham-Ethyl | Clomazone |
| Flucarbazone | Phenmedipham-Ethyl | Fluometuron |

-continued

| Triazolone Herbicide | Photosystem II Inhibitor | Third Herbicide |
|---|---|---|
| Flucarbazone | Phenmedipham-Ethyl | Aclonifen |
| Flucarbazone | Atrazine | Amitrole |
| Flucarbazone | Atrazine | Mesotrione |
| Flucarbazone | Atrazine | Sulcotrione |
| Flucarbazone | Atrazine | Isoxachlortole |
| Flucarbazone | Atrazine | Isoxaflutole |
| Flucarbazone | Atrazine | Benzofenap |
| Flucarbazone | Atrazine | Pyrazolynate |
| Flucarbazone | Atrazine | Pyrazoxyfen |
| Flucarbazone | Atrazine | Norflurazon |
| Flucarbazone | Atrazine | Diflufenican |
| Flucarbazone | Atrazine | Picolinafen |
| Flucarbazone | Atrazine | Clomazone |
| Flucarbazone | Atrazine | Fluometuron |
| Flucarbazone | Atrazine | Aclonifen |
| Flucarbazone | Bentazon | Amitrole |
| Flucarbazone | Bentazon | Mesotrione |
| Flucarbazone | Bentazon | Sulcotrione |
| Flucarbazone | Bentazon | Isoxachlortole |
| Flucarbazone | Bentazon | Isoxaflutole |
| Flucarbazone | Bentazon | Benzofenap |
| Flucarbazone | Bentazon | Pyrazolynate |
| Flucarbazone | Bentazon | Pyrazoxyfen |
| Flucarbazone | Bentazon | Norflurazon |
| Flucarbazone | Bentazon | Diflufenican |
| Flucarbazone | Bentazon | Picolinafen |
| Flucarbazone | Bentazon | Clomazone |
| Flucarbazone | Bentazon | Fluometuron |
| Flucarbazone | Bentazon | Aclonifen |
| Flucarbazone | Metamitron | Amitrole |
| Flucarbazone | Metamitron | Mesotrione |
| Flucarbazone | Metamitron | Sulcotrione |
| Flucarbazone | Metamitron | Isoxachlortole |
| Flucarbazone | Metamitron | Isoxaflutole |
| Flucarbazone | Metamitron | Benzofenap |
| Flucarbazone | Metamitron | Pyrazolynate |
| Flucarbazone | Metamitron | Pyrazoxyfen |
| Flucarbazone | Metamitron | Norflurazon |
| Flucarbazone | Metamitron | Diflufenican |
| Flucarbazone | Metamitron | Picolinafen |
| Flucarbazone | Metamitron | Clomazone |
| Flucarbazone | Metamitron | Fluometuron |
| Flucarbazone | Metamitron | Aclonifen |
| Flucarbazone | Metribuzin | Amitrole |
| Flucarbazone | Metribuzin | Mesotrione |
| Flucarbazone | Metribuzin | Sulcotrione |
| Flucarbazone | Metribuzin | Isoxachlortole |
| Flucarbazone | Metribuzin | Isoxaflutole |
| Flucarbazone | Metribuzin | Benzofenap |
| Flucarbazone | Metribuzin | Pyrazolynate |
| Flucarbazone | Metribuzin | Pyrazoxyfen |
| Flucarbazone | Metribuzin | Norflurazon |
| Flucarbazone | Metribuzin | Diflufenican |
| Flucarbazone | Metribuzin | Picolinafen |
| Flucarbazone | Metribuzin | Clomazone |
| Flucarbazone | Metribuzin | Fluometuron |
| Flucarbazone | Metribuzin | Aclonifen |
| Flucarbazone | Diuron | Amitrole |
| Flucarbazone | Diuron | Mesotrione |
| Flucarbazone | Diuron | Sulcotrione |
| Flucarbazone | Diuron | Isoxachlortole |
| Flucarbazone | Diuron | Isoxaflutole |
| Flucarbazone | Diuron | Benzofenap |
| Flucarbazone | Diuron | Pyrazolynate |
| Flucarbazone | Diuron | Pyrazoxyfen |
| Flucarbazone | Diuron | Norflurazon |
| Flucarbazone | Diuron | Diflufenican |
| Flucarbazone | Diuron | Picolinafen |
| Flucarbazone | Diuron | Clomazone |
| Flucarbazone | Diuron | Fluometuron |
| Flucarbazone | Diuron | Aclonifen |
| Flucarbazone | Linuron | Amitrole |
| Flucarbazone | Linuron | Mesotrione |
| Flucarbazone | Linuron | Sulcotrione |
| Flucarbazone | Linuron | Isoxachlortole |
| Flucarbazone | Linuron | Isoxaflutole |
| Flucarbazone | Linuron | Benzofenap |

41

-continued

| Triazolone Herbicide | Photosystem II Inhibitor | Third Herbicide |
|---|---|---|
| Flucarbazone | Linuron | Pyrazolynate |
| Flucarbazone | Linuron | Pyrazoxyfen |
| Flucarbazone | Linuron | Norflurazon |
| Flucarbazone | Linuron | Diflufenican |
| Flucarbazone | Linuron | Picolinafen |
| Flucarbazone | Linuron | Clomazone |
| Flucarbazone | Linuron | Fluometuron |
| Flucarbazone | Linuron | Aclonifen |
| Flucarbazone | Chlorpropham | Acetochlor |
| Flucarbazone | Chlorpropham | Alachlor |
| Flucarbazone | Chlorpropham | Butachlor |
| Flucarbazone | Chlorpropham | Dimethachlor |
| Flucarbazone | Chlorpropham | Dimethanamid |
| Flucarbazone | Chlorpropham | Metazachlor |
| Flucarbazone | Chlorpropham | Metolachlor |
| Flucarbazone | Chlorpropham | Pethoxamid |
| Flucarbazone | Chlorpropham | Pretilachlor |
| Flucarbazone | Chlorpropham | Propachlor |
| Flucarbazone | Chlorpropham | Propisochlor |
| Flucarbazone | Chlorpropham | Thenylchlor |
| Flucarbazone | Chlorpropham | Diphenamid |
| Flucarbazone | Chlorpropham | Napropamide |
| Flucarbazone | Desmedipham | Acetochlor |
| Flucarbazone | Desmedipham | Alachlor |
| Flucarbazone | Desmedipham | Butachlor |
| Flucarbazone | Desmedipham | Dimethachlor |
| Flucarbazone | Desmedipham | Dimethanamid |
| Flucarbazone | Desmedipham | Metazachlor |
| Flucarbazone | Desmedipham | Metolachlor |
| Flucarbazone | Desmedipham | Pethoxamid |
| Flucarbazone | Desmedipham | Pretilachlor |
| Flucarbazone | Desmedipham | Propachlor |
| Flucarbazone | Desmedipham | Propisochlor |
| Flucarbazone | Desmedipham | Thenylchlor |
| Flucarbazone | Desmedipham | Diphenamid |
| Flucarbazone | Desmedipham | Napropamide |
| Flucarbazone | Phenmedipham | Acetochlor |
| Flucarbazone | Phenmedipham | Alachlor |
| Flucarbazone | Phenmedipham | Butachlor |
| Flucarbazone | Phenmedipham | Dimethachlor |
| Flucarbazone | Phenmedipham | Dimethanamid |
| Flucarbazone | Phenmedipham | Metazachlor |
| Flucarbazone | Phenmedipham | Metolachlor |
| Flucarbazone | Phenmedipham | Pethoxamid |
| Flucarbazone | Phenmedipham | Pretilachlor |
| Flucarbazone | Phenmedipham | Propachlor |
| Flucarbazone | Phenmedipham | Propisochlor |
| Flucarbazone | Phenmedipham | Thenylchlor |
| Flucarbazone | Phenmedipham | Diphenamid |
| Flucarbazone | Phenmedipham | Napropamide |
| Flucarbazone | Phenmedipham-Ethyl | Acetochlor |
| Flucarbazone | Phenmedipham-Ethyl | Alachlor |
| Flucarbazone | Phenmedipham-Ethyl | Butachlor |
| Flucarbazone | Phenmedipham-Ethyl | Dimethachlor |
| Flucarbazone | Phenmedipham-Ethyl | Dimethanamid |
| Flucarbazone | Phenmedipham-Ethyl | Metazachlor |
| Flucarbazone | Phenmedipham-Ethyl | Metolachlor |
| Flucarbazone | Phenmedipham-Ethyl | Pethoxamid |
| Flucarbazone | Phenmedipham-Ethyl | Pretilachlor |
| Flucarbazone | Phenmedipham-Ethyl | Propachlor |
| Flucarbazone | Phenmedipham-Ethyl | Propisochlor |
| Flucarbazone | Phenmedipham-Ethyl | Thenylchlor |
| Flucarbazone | Phenmedipham-Ethyl | Diphenamid |
| Flucarbazone | Phenmedipham-Ethyl | Napropamide |
| Flucarbazone | Atrazine | Acetochlor |
| Flucarbazone | Atrazine | Alachlor |
| Flucarbazone | Atrazine | Butachlor |
| Flucarbazone | Atrazine | Dimethachlor |
| Flucarbazone | Atrazine | Dimethanamid |
| Flucarbazone | Atrazine | Metazachlor |
| Flucarbazone | Atrazine | Metolachlor |
| Flucarbazone | Atrazine | Pethoxamid |
| Flucarbazone | Atrazine | Pretilachlor |
| Flucarbazone | Atrazine | Propachlor |
| Flucarbazone | Atrazine | Propisochlor |
| Flucarbazone | Atrazine | Thenylchlor |
| Flucarbazone | Atrazine | Diphenamid |

42

-continued

| Triazolone Herbicide | Photosystem II Inhibitor | Third Herbicide |
|---|---|---|
| Flucarbazone | Atrazine | Napropamide |
| Flucarbazone | Bentazon | Acetochlor |
| Flucarbazone | Bentazon | Alachlor |
| Flucarbazone | Bentazon | Butachlor |
| Flucarbazone | Bentazon | Dimethachlor |
| Flucarbazone | Bentazon | Dimethanamid |
| Flucarbazone | Bentazon | Metazachlor |
| Flucarbazone | Bentazon | Metolachlor |
| Flucarbazone | Bentazon | Pethoxamid |
| Flucarbazone | Bentazon | Pretilachlor |
| Flucarbazone | Bentazon | Propachlor |
| Flucarbazone | Bentazon | Propisochlor |
| Flucarbazone | Bentazon | Thenylchlor |
| Flucarbazone | Bentazon | Diphenamid |
| Flucarbazone | Bentazon | Napropamide |
| Flucarbazone | Metamitron | Acetochlor |
| Flucarbazone | Metamitron | Alachlor |
| Flucarbazone | Metamitron | Butachlor |
| Flucarbazone | Metamitron | Dimethachlor |
| Flucarbazone | Metamitron | Dimethanamid |
| Flucarbazone | Metamitron | Metazachlor |
| Flucarbazone | Metamitron | Metolachlor |
| Flucarbazone | Metamitron | Pethoxamid |
| Flucarbazone | Metamitron | Pretilachlor |
| Flucarbazone | Metamitron | Propachlor |
| Flucarbazone | Metamitron | Propisochlor |
| Flucarbazone | Metamitron | Thenylchlor |
| Flucarbazone | Metamitron | Diphenamid |
| Flucarbazone | Metamitron | Napropamide |
| Flucarbazone | Metribuzin | Acetochlor |
| Flucarbazone | Metribuzin | Alachlor |
| Flucarbazone | Metribuzin | Butachlor |
| Flucarbazone | Metribuzin | Dimethachlor |
| Flucarbazone | Metribuzin | Dimethanamid |
| Flucarbazone | Metribuzin | Metazachlor |
| Flucarbazone | Metribuzin | Metolachlor |
| Flucarbazone | Metribuzin | Pethoxamid |
| Flucarbazone | Metribuzin | Pretilachlor |
| Flucarbazone | Metribuzin | Propachlor |
| Flucarbazone | Metribuzin | Propisochlor |
| Flucarbazone | Metribuzin | Thenylchlor |
| Flucarbazone | Metribuzin | Diphenamid |
| Flucarbazone | Metribuzin | Napropamide |
| Flucarbazone | Diuron | Acetochlor |
| Flucarbazone | Diuron | Alachlor |
| Flucarbazone | Diuron | Butachlor |
| Flucarbazone | Diuron | Dimethachlor |
| Flucarbazone | Diuron | Dimethanamid |
| Flucarbazone | Diuron | Metazachlor |
| Flucarbazone | Diuron | Metolachlor |
| Flucarbazone | Diuron | Pethoxamid |
| Flucarbazone | Diuron | Pretilachlor |
| Flucarbazone | Diuron | Propachlor |
| Flucarbazone | Diuron | Propisochlor |
| Flucarbazone | Diuron | Thenylchlor |
| Flucarbazone | Diuron | Diphenamid |
| Flucarbazone | Diuron | Napropamide |
| Flucarbazone | Linuron | Acetochlor |
| Flucarbazone | Linuron | Alachlor |
| Flucarbazone | Linuron | Butachlor |
| Flucarbazone | Linuron | Dimethachlor |
| Flucarbazone | Linuron | Dimethanamid |
| Flucarbazone | Linuron | Metazachlor |
| Flucarbazone | Linuron | Metolachlor |
| Flucarbazone | Linuron | Pethoxamid |
| Flucarbazone | Linuron | Pretilachlor |
| Flucarbazone | Linuron | Propachlor |
| Flucarbazone | Linuron | Propisochlor |
| Flucarbazone | Linuron | Thenylchlor |
| Flucarbazone | Linuron | Diphenamid |
| Flucarbazone | Linuron | Napropamide |
| Flucarbazone | Chlorpropham | Benfluralin |
| Flucarbazone | Chlorpropham | Butralin |
| Flucarbazone | Chlorpropham | Dinitramine |
| Flucarbazone | Chlorpropham | Pendimethalin |
| Flucarbazone | Chlorpropham | Propyzamide |
| Flucarbazone | Chlorpropham | DCPA |

-continued

| Triazolone Herbicide | Photosystem II Inhibitor | Third Herbicide |
|---|---|---|
| Flucarbazone | Chlorpropham | Pendimethalin |
| Flucarbazone | Chlorpropham | Ethalfluralin |
| Flucarbazone | Chlorpropham | Oryzalin |
| Flucarbazone | Chlorpropham | Trifluralin |
| Flucarbazone | Chlorpropham | Prodiamine |
| Flucarbazone | Chlorpropham | Dithiopyr |
| Flucarbazone | Desmedipham | Benfluralin |
| Flucarbazone | Desmedipham | Butralin |
| Flucarbazone | Desmedipham | Dinitramine |
| Flucarbazone | Desmedipham | Pendimethalin |
| Flucarbazone | Desmedipham | Propyzamide |
| Flucarbazone | Desmedipham | DCPA |
| Flucarbazone | Desmedipham | Pendimethalin |
| Flucarbazone | Desmedipham | Ethalfluralin |
| Flucarbazone | Desmedipham | Oryzalin |
| Flucarbazone | Desmedipham | Trifluralin |
| Flucarbazone | Desmedipham | Prodiamine |
| Flucarbazone | Desmedipham | Dithiopyr |
| Flucarbazone | Phenmedipham | Benfluralin |
| Flucarbazone | Phenmedipham | Butralin |
| Flucarbazone | Phenmedipham | Dinitramine |
| Flucarbazone | Phenmedipham | Pendimethalin |
| Flucarbazone | Phenmedipham | Propyzamide |
| Flucarbazone | Phenmedipham | DCPA |
| Flucarbazone | Phenmedipham | Ethalfluralin |
| Flucarbazone | Phenmedipham | Oryzalin |
| Flucarbazone | Phenmedipham | Trifluralin |
| Flucarbazone | Phenmedipham | Prodiamine |
| Flucarbazone | Phenmedipham | Dithiopyr |
| Flucarbazone | Phenmedipham-Ethyl | Benfluralin |
| Flucarbazone | Phenmedipham-Ethyl | Butralin |
| Flucarbazone | Phenmedipham-Ethyl | Dinitramine |
| Flucarbazone | Phenmedipham-Ethyl | Propyzamide |
| Flucarbazone | Phenmedipham-Ethyl | DCPA |
| Flucarbazone | Phenmedipham-Ethyl | Pendimethalin |
| Flucarbazone | Phenmedipham-Ethyl | Ethalfluralin |
| Flucarbazone | Phenmedipham-Ethyl | Oryzalin |
| Flucarbazone | Phenmedipham-Ethyl | Trifluralin |
| Flucarbazone | Phenmedipham-Ethyl | Prodiamine |
| Flucarbazone | Phenmedipham-Ethyl | Dithiopyr |
| Flucarbazone | Atrazine | Benfluralin |
| Flucarbazone | Atrazine | Butralin |
| Flucarbazone | Atrazine | Dinitramine |
| Flucarbazone | Atrazine | Oryzalin |
| Flucarbazone | Atrazine | Trifluralin |
| Flucarbazone | Atrazine | Propyzamide |
| Flucarbazone | Atrazine | DCPA |
| Flucarbazone | Atrazine | Pendimethalin |
| Flucarbazone | Atrazine | Ethalfluralin |
| Flucarbazone | Atrazine | Prodiamine |
| Flucarbazone | Atrazine | Dithiopyr |
| Flucarbazone | Bentazon | Benfluralin |
| Flucarbazone | Bentazon | Butralin |
| Flucarbazone | Bentazon | Dinitramine |
| Flucarbazone | Bentazon | Oryzalin |
| Flucarbazone | Bentazon | Pendimethalin |
| Flucarbazone | Bentazon | Propyzamide |
| Flucarbazone | Bentazon | DCPA |
| Flucarbazone | Bentazon | Pendimethalin |
| Flucarbazone | Bentazon | Ethalfluralin |
| Flucarbazone | Bentazon | Trifluralin |
| Flucarbazone | Bentazon | Prodiamine |
| Flucarbazone | Bentazon | Dithiopyr |
| Flucarbazone | Metamitron | Benfluralin |
| Flucarbazone | Metamitron | Butralin |
| Flucarbazone | Metamitron | Dinitramine |
| Flucarbazone | Metamitron | Propyzamide |
| Flucarbazone | Metamitron | DCPA |
| Flucarbazone | Metamitron | Pendimethalin |
| Flucarbazone | Metamitron | Ethalfluralin |
| Flucarbazone | Metamitron | Oryzalin |
| Flucarbazone | Metamitron | Trifluralin |
| Flucarbazone | Metamitron | Prodiamine |
| Flucarbazone | Metamitron | Dithiopyr |
| Flucarbazone | Metribuzin | Benfluralin |
| Flucarbazone | Metribuzin | Butralin |
| Flucarbazone | Metribuzin | Dinitramine |

-continued

| Triazolone Herbicide | Photosystem II Inhibitor | Third Herbicide |
|---|---|---|
| Flucarbazone | Metribuzin | Oryzalin |
| Flucarbazone | Metribuzin | Pendimethalin |
| Flucarbazone | Metribuzin | Trifluralin |
| Flucarbazone | Metribuzin | Propyzamide |
| Flucarbazone | Metribuzin | DCPA |
| Flucarbazone | Metribuzin | Ethalfluralin |
| Flucarbazone | Metribuzin | Prodiamine |
| Flucarbazone | Metribuzin | Dithiopyr |
| Flucarbazone | Diuron | Benfluralin |
| Flucarbazone | Diuron | Butralin |
| Flucarbazone | Diuron | Dinitramine |
| Flucarbazone | Diuron | Oryzalin |
| Flucarbazone | Diuron | Trifluralin |
| Flucarbazone | Diuron | Propyzamide |
| Flucarbazone | Diuron | DCPA |
| Flucarbazone | Diuron | Pendimethalin |
| Flucarbazone | Diuron | Ethalfluralin |
| Flucarbazone | Diuron | Prodiamine |
| Flucarbazone | Diuron | Dithiopyr |
| Flucarbazone | Linuron | Benfluralin |
| Flucarbazone | Linuron | Butralin |
| Flucarbazone | Linuron | Dinitramine |
| Flucarbazone | Linuron | Pendimethalin |
| Flucarbazone | Linuron | Trifluralin |
| Flucarbazone | Linuron | Propyzamide |
| Flucarbazone | Linuron | DCPA |
| Flucarbazone | Linuron | Ethalfluralin |
| Flucarbazone | Linuron | Oryzalin |
| Flucarbazone | Linuron | Prodiamine |
| Flucarbazone | Linuron | Dithiopyr |
| Flucarbazone | Chlorpropham | Acifluorfen |
| Flucarbazone | Chlorpropham | Fomesafen |
| Flucarbazone | Chlorpropham | Lactofen |
| Flucarbazone | Chlorpropham | Flumiclorac |
| Flucarbazone | Chlorpropham | Flumioxazin |
| Flucarbazone | Chlorpropham | Flufenpyr-Ethyl |
| Flucarbazone | Chlorpropham | Fomesafen |
| Flucarbazone | Chlorpropham | Fluthiacet-Ethyl |
| Flucarbazone | Chlorpropham | Saflufenacil |
| Flucarbazone | Chlorpropham | Azafenidin |
| Flucarbazone | Chlorpropham | Benzfendizone |
| Flucarbazone | Chlorpropham | Bifenox |
| Flucarbazone | Chlorpropham | Butafenacil |
| Flucarbazone | Chlorpropham | Oxadiazon |
| Flucarbazone | Desmedipham | Acifluorfen |
| Flucarbazone | Desmedipham | Fomesafen |
| Flucarbazone | Desmedipham | Lactofen |
| Flucarbazone | Desmedipham | Flumiclorac |
| Flucarbazone | Desmedipham | Flumioxazin |
| Flucarbazone | Desmedipham | Flufenpyr-Ethyl |
| Flucarbazone | Desmedipham | Fomesafen |
| Flucarbazone | Desmedipham | Fluthiacet-Ethyl |
| Flucarbazone | Desmedipham | Saflufenacil |
| Flucarbazone | Desmedipham | Azafenidin |
| Flucarbazone | Desmedipham | Benzfendizone |
| Flucarbazone | Desmedipham | Bifenox |
| Flucarbazone | Desmedipham | Butafenacil |
| Flucarbazone | Desmedipham | Oxadiazon |
| Flucarbazone | Phenmedipham | Acifluorfen |
| Flucarbazone | Phenmedipham | Fomesafen |
| Flucarbazone | Phenmedipham | Lactofen |
| Flucarbazone | Phenmedipham | Flumiclorac |
| Flucarbazone | Phenmedipham | Flumioxazin |
| Flucarbazone | Phenmedipham | Flufenpyr-Ethyl |
| Flucarbazone | Phenmedipham | Fomesafen |
| Flucarbazone | Phenmedipham | Fluthiacet-Ethyl |
| Flucarbazone | Phenmedipham | Saflufenacil |
| Flucarbazone | Phenmedipham | Azafenidin |
| Flucarbazone | Phenmedipham | Benzfendizone |
| Flucarbazone | Phenmedipham | Bifenox |
| Flucarbazone | Phenmedipham | Butafenacil |
| Flucarbazone | Phenmedipham | Oxadiazon |
| Flucarbazone | Phenmedipham-Ethyl | Acifluorfen |
| Flucarbazone | Phenmedipham-Ethyl | Fomesafen |
| Flucarbazone | Phenmedipham-Ethyl | Lactofen |
| Flucarbazone | Phenmedipham-Ethyl | Flumiclorac |
| Flucarbazone | Phenmedipham-Ethyl | Flumioxazin |

-continued

| Triazolone Herbicide | Photosystem II Inhibitor | Third Herbicide |
|---|---|---|
| Flucarbazone | Phenmedipham-Ethyl | Flufenpyr-Ethyl |
| Flucarbazone | Phenmedipham-Ethyl | Fomesafen |
| Flucarbazone | Phenmedipham-Ethyl | Fluthiacet-Ethyl |
| Flucarbazone | Phenmedipham-Ethyl | Saflufenacil |
| Flucarbazone | Phenmedipham-Ethyl | Azafenidin |
| Flucarbazone | Phenmedipham-Ethyl | Benzfendizone |
| Flucarbazone | Phenmedipham-Ethyl | Bifenox |
| Flucarbazone | Phenmedipham-Ethyl | Butafenacil |
| Flucarbazone | Phenmedipham-Ethyl | Oxadiazon |
| Flucarbazone | Atrazine | Acifluorfen |
| Flucarbazone | Atrazine | Fomesafen |
| Flucarbazone | Atrazine | Lactofen |
| Flucarbazone | Atrazine | Flumiclorac |
| Flucarbazone | Atrazine | Flumioxazin |
| Flucarbazone | Atrazine | Flufenpyr-Ethyl |
| Flucarbazone | Atrazine | Fomesafen |
| Flucarbazone | Atrazine | Fluthiacet-Ethyl |
| Flucarbazone | Atrazine | Saflufenacil |
| Flucarbazone | Atrazine | Azafenidin |
| Flucarbazone | Atrazine | Benzfendizone |
| Flucarbazone | Atrazine | Bifenox |
| Flucarbazone | Atrazine | Butafenacil |
| Flucarbazone | Atrazine | Oxadiazon |
| Flucarbazone | Bentazon | Acifluorfen |
| Flucarbazone | Bentazon | Fomesafen |
| Flucarbazone | Bentazon | Lactofen |
| Flucarbazone | Bentazon | Flumiclorac |
| Flucarbazone | Bentazon | Flumioxazin |
| Flucarbazone | Bentazon | Flufenpyr-Ethyl |
| Flucarbazone | Bentazon | Fomesafen |
| Flucarbazone | Bentazon | Fluthiacet-Ethyl |
| Flucarbazone | Bentazon | Saflufenacil |
| Flucarbazone | Bentazon | Azafenidin |
| Flucarbazone | Bentazon | Benzfendizone |
| Flucarbazone | Bentazon | Bifenox |
| Flucarbazone | Bentazon | Butafenacil |
| Flucarbazone | Bentazon | Oxadiazon |
| Flucarbazone | Metamitron | Acifluorfen |
| Flucarbazone | Metamitron | Fomesafen |
| Flucarbazone | Metamitron | Lactofen |
| Flucarbazone | Metamitron | Flumiclorac |
| Flucarbazone | Metamitron | Flumioxazin |
| Flucarbazone | Metamitron | Flufenpyr-Ethyl |
| Flucarbazone | Metamitron | Fomesafen |
| Flucarbazone | Metamitron | Fluthiacet-Ethyl |
| Flucarbazone | Metamitron | Saflufenacil |
| Flucarbazone | Metamitron | Azafenidin |
| Flucarbazone | Metamitron | Benzfendizone |
| Flucarbazone | Metamitron | Bifenox |
| Flucarbazone | Metamitron | Butafenacil |
| Flucarbazone | Metamitron | Oxadiazon |
| Flucarbazone | Metribuzin | Acifluorfen |
| Flucarbazone | Metribuzin | Fomesafen |
| Flucarbazone | Metribuzin | Lactofen |
| Flucarbazone | Metribuzin | Flumiclorac |
| Flucarbazone | Metribuzin | Flumioxazin |
| Flucarbazone | Metribuzin | Flufenpyr-Ethyl |
| Flucarbazone | Metribuzin | Fomesafen |
| Flucarbazone | Metribuzin | Fluthiacet-Ethyl |
| Flucarbazone | Metribuzin | Saflufenacil |
| Flucarbazone | Metribuzin | Azafenidin |
| Flucarbazone | Metribuzin | Benzfendizone |
| Flucarbazone | Metribuzin | Bifenox |
| Flucarbazone | Metribuzin | Butafenacil |
| Flucarbazone | Metribuzin | Oxadiazon |
| Flucarbazone | Diuron | Acifluorfen |
| Flucarbazone | Diuron | Fomesafen |
| Flucarbazone | Diuron | Lactofen |
| Flucarbazone | Diuron | Flumiclorac |
| Flucarbazone | Diuron | Flumioxazin |
| Flucarbazone | Diuron | Flufenpyr-Ethyl |
| Flucarbazone | Diuron | Fomesafen |
| Flucarbazone | Diuron | Fluthiacet-Ethyl |
| Flucarbazone | Diuron | Saflufenacil |
| Flucarbazone | Diuron | Azafenidin |
| Flucarbazone | Diuron | Benzfendizone |
| Flucarbazone | Diuron | Bifenox |

-continued

| Triazolone Herbicide | Photosystem II Inhibitor | Third Herbicide |
|---|---|---|
| Flucarbazone | Diuron | Butafenacil |
| Flucarbazone | Diuron | Oxadiazon |
| Flucarbazone | Linuron | Acifluorfen |
| Flucarbazone | Linuron | Fomesafen |
| Flucarbazone | Linuron | Lactofen |
| Flucarbazone | Linuron | Flumiclorac |
| Flucarbazone | Linuron | Flumioxazin |
| Flucarbazone | Linuron | Flufenpyr-Ethyl |
| Flucarbazone | Linuron | Fomesafen |
| Flucarbazone | Linuron | Fluthiacet-Ethyl |
| Flucarbazone | Linuron | Saflufenacil |
| Flucarbazone | Linuron | Azafenidin |
| Flucarbazone | Linuron | Benzfendizone |
| Flucarbazone | Linuron | Bifenox |
| Flucarbazone | Linuron | Butafenacil |
| Flucarbazone | Linuron | Oxadiazon |
| Flucarbazone | Chlorpropham | Dichlobenil |
| Flucarbazone | Chlorpropham | Chlorthiamid |
| Flucarbazone | Chlorpropham | Indaziflam |
| Flucarbazone | Chlorpropham | Isoxaben |
| Flucarbazone | Chlorpropham | Dichlobenil |
| Flucarbazone | Chlorpropham | Flupoxam |
| Flucarbazone | Desmedipham | Dichlobenil |
| Flucarbazone | Desmedipham | Chlorthiamid |
| Flucarbazone | Desmedipham | Indaziflam |
| Flucarbazone | Desmedipham | Isoxaben |
| Flucarbazone | Desmedipham | Dichlobenil |
| Flucarbazone | Desmedipham | Flupoxam |
| Flucarbazone | Phenmedipham | Dichlobenil |
| Flucarbazone | Phenmedipham | Chlorthiamid |
| Flucarbazone | Phenmedipham | Indaziflam |
| Flucarbazone | Phenmedipham | Isoxaben |
| Flucarbazone | Phenmedipham | Dichlobenil |
| Flucarbazone | Phenmedipham | Flupoxam |
| Flucarbazone | Phenmedipham-Ethyl | Dichlobenil |
| Flucarbazone | Phenmedipham-Ethyl | Chlorthiamid |
| Flucarbazone | Phenmedipham-Ethyl | Indaziflam |
| Flucarbazone | Phenmedipham-Ethyl | Isoxaben |
| Flucarbazone | Phenmedipham-Ethyl | Dichlobenil |
| Flucarbazone | Phenmedipham-Ethyl | Flupoxam |
| Flucarbazone | Atrazine | Dichlobenil |
| Flucarbazone | Atrazine | Chlorthiamid |
| Flucarbazone | Atrazine | Indaziflam |
| Flucarbazone | Atrazine | Isoxaben |
| Flucarbazone | Atrazine | Dichlobenil |
| Flucarbazone | Atrazine | Flupoxam |
| Flucarbazone | Bentazon | Dichlobenil |
| Flucarbazone | Bentazon | Chlorthiamid |
| Flucarbazone | Bentazon | Indaziflam |
| Flucarbazone | Bentazon | Isoxaben |
| Flucarbazone | Bentazon | Flupoxam |
| Flucarbazone | Metamitron | Dichlobenil |
| Flucarbazone | Metamitron | Chlorthiamid |
| Flucarbazone | Metamitron | Indaziflam |
| Flucarbazone | Metamitron | Isoxaben |
| Flucarbazone | Metamitron | Flupoxam |
| Flucarbazone | Metribuzin | Chlorthiamid |
| Flucarbazone | Metribuzin | Indaziflam |
| Flucarbazone | Metribuzin | Isoxaben |
| Flucarbazone | Metribuzin | Dichlobenil |
| Flucarbazone | Metribuzin | Flupoxam |
| Flucarbazone | Diuron | Dichlobenil |
| Flucarbazone | Diuron | Chlorthiamid |
| Flucarbazone | Diuron | Indaziflam |
| Flucarbazone | Diuron | Isoxaben |
| Flucarbazone | Diuron | Flupoxam |
| Flucarbazone | Linuron | Dichlobenil |
| Flucarbazone | Linuron | Chlorthiamid |
| Flucarbazone | Linuron | Indaziflam |
| Flucarbazone | Linuron | Isoxaben |
| Flucarbazone | Linuron | Flupoxam |
| Flucarbazone | Chlorpropham | Imazamox |
| Flucarbazone | Chlorpropham | Imazapic |
| Flucarbazone | Chlorpropham | Imazapyr |
| Flucarbazone | Chlorpropham | Imazethapyr |
| Flucarbazone | Chlorpropham | Sulfentrazone |
| Flucarbazone | Chlorpropham | Bensulfuron |

-continued

| Triazolone Herbicide | Photosystem II Inhibitor | Third Herbicide |
|---|---|---|
| Flucarbazone | Chlorpropham | Halosulfuron |
| Flucarbazone | Chlorpropham | Metsulfuron |
| Flucarbazone | Chlorpropham | Metazachlor |
| Flucarbazone | Chlorpropham | Pinoxaden |
| Flucarbazone | Desmedipham | Imazamox |
| Flucarbazone | Desmedipham | Imazapic |
| Flucarbazone | Desmedipham | Imazapyr |
| Flucarbazone | Desmedipham | Imazethapyr |
| Flucarbazone | Desmedipham | Sulfentrazone |
| Flucarbazone | Desmedipham | Bensulfuron |
| Flucarbazone | Desmedipham | Halosulfuron |
| Flucarbazone | Desmedipham | Metsulfuron |
| Flucarbazone | Desmedipham | Metazachlor |
| Flucarbazone | Desmedipham | Metazachlor |
| Flucarbazone | Desmedipham | Pinoxaden |
| Flucarbazone | Phenmedipham | Imazamox |
| Flucarbazone | Phenmedipham | Imazapic |
| Flucarbazone | Phenmedipham | Imazapyr |
| Flucarbazone | Phenmedipham | Imazethapyr |
| Flucarbazone | Phenmedipham | Sulfentrazone |
| Flucarbazone | Phenmedipham | Bensulfuron |
| Flucarbazone | Phenmedipham | Halosulfuron |
| Flucarbazone | Phenmedipham | Metsulfuron |
| Flucarbazone | Phenmedipham | Metazachlor |
| Flucarbazone | Phenmedipham | Pinoxaden |
| Flucarbazone | Phenmedipham-Ethyl | Imazamox |
| Flucarbazone | Phenmedipham-Ethyl | Imazapic |
| Flucarbazone | Phenmedipham-Ethyl | Imazapyr |
| Flucarbazone | Phenmedipham-Ethyl | Imazethapyr |
| Flucarbazone | Phenmedipham-Ethyl | Sulfentrazone |
| Flucarbazone | Phenmedipham-Ethyl | Bensulfuron |
| Flucarbazone | Phenmedipham-Ethyl | Halosulfuron |
| Flucarbazone | Phenmedipham-Ethyl | Metsulfuron |
| Flucarbazone | Phenmedipham-Ethyl | Metazachlor |
| Flucarbazone | Phenmedipham-Ethyl | Pinoxaden |
| Flucarbazone | Atrazine | Imazamox |
| Flucarbazone | Atrazine | Imazapic |
| Flucarbazone | Atrazine | Imazapyr |
| Flucarbazone | Atrazine | Imazethapyr |
| Flucarbazone | Atrazine | Sulfentrazone |
| Flucarbazone | Atrazine | Bensulfuron |
| Flucarbazone | Atrazine | Halosulfuron |
| Flucarbazone | Atrazine | Metsulfuron |
| Flucarbazone | Atrazine | Metazachlor |
| Flucarbazone | Atrazine | Pinoxaden |
| Flucarbazone | Bentazon | Imazamox |
| Flucarbazone | Bentazon | Imazapic |
| Flucarbazone | Bentazon | Imazapyr |
| Flucarbazone | Bentazon | Imazethapyr |
| Flucarbazone | Bentazon | Sulfentrazone |
| Flucarbazone | Bentazon | Bensulfuron |
| Flucarbazone | Bentazon | Halosulfuron |
| Flucarbazone | Bentazon | Metsulfuron |
| Flucarbazone | Bentazon | Metazachlor |
| Flucarbazone | Bentazon | Pinoxaden |
| Flucarbazone | Metamitron | Imazamox |
| Flucarbazone | Metamitron | Imazapic |
| Flucarbazone | Metamitron | Imazapyr |
| Flucarbazone | Metamitron | Imazethapyr |
| Flucarbazone | Metamitron | Sulfentrazone |
| Flucarbazone | Metamitron | Bensulfuron |
| Flucarbazone | Metamitron | Halosulfuron |
| Flucarbazone | Metamitron | Metsulfuron |
| Flucarbazone | Metamitron | Metazachlor |
| Flucarbazone | Metamitron | Pinoxaden |
| Flucarbazone | Metribuzin | Imazamox |
| Flucarbazone | Metribuzin | Imazapic |
| Flucarbazone | Metribuzin | Imazapyr |
| Flucarbazone | Metribuzin | Imazethapyr |
| Flucarbazone | Metribuzin | Sulfentrazone |
| Flucarbazone | Metribuzin | Bensulfuron |
| Flucarbazone | Metribuzin | Halosulfuron |
| Flucarbazone | Metribuzin | Metsulfuron |
| Flucarbazone | Metribuzin | Metazachlor |
| Flucarbazone | Metribuzin | Pinoxaden |
| Flucarbazone | Diuron | Imazamox |
| Flucarbazone | Diuron | Imazapic |

-continued

| Triazolone Herbicide | Photosystem II Inhibitor | Third Herbicide |
|---|---|---|
| Flucarbazone | Diuron | Imazapyr |
| Flucarbazone | Diuron | Imazethapyr |
| Flucarbazone | Diuron | Sulfentrazone |
| Flucarbazone | Diuron | Carfentrazone |
| Flucarbazone | Diuron | Bensulfuron |
| Flucarbazone | Diuron | Halosulfuron |
| Flucarbazone | Diuron | Metsulfuron |
| Flucarbazone | Diuron | Metazachlor |
| Flucarbazone | Diuron | Pinoxaden |
| Flucarbazone | Linuron | Imazamox |
| Flucarbazone | Linuron | Imazapic |
| Flucarbazone | Linuron | Imazapyr |
| Flucarbazone | Linuron | Imazethapyr |
| Flucarbazone | Linuron | Sulfentrazone |
| Flucarbazone | Linuron | Bensulfuron |
| Flucarbazone | Linuron | Halosulfuron |
| Flucarbazone | Linuron | Metsulfuron |
| Flucarbazone | Linuron | Metazachlor |
| Flucarbazone | Linuron | Pinoxaden |
| Carfentrazone | Chlorpropham | Benzobicyclon |
| Carfentrazone | Chlorpropham | Benzofenap |
| Carfentrazone | Chlorpropham | Bicyclopyrone |
| Carfentrazone | Chlorpropham | Fenquinotrione |
| Carfentrazone | Chlorpropham | Isoxachlortole |
| Carfentrazone | Chlorpropham | Isoxaflutole |
| Carfentrazone | Chlorpropham | Mesotrione |
| Carfentrazone | Chlorpropham | Pyrasulfotole |
| Carfentrazone | Chlorpropham | Pyrazolynate |
| Carfentrazone | Chlorpropham | Pyrazoxyfen |
| Carfentrazone | Chlorpropham | Sulcotrione |
| Carfentrazone | Chlorpropham | Tefuryltrione |
| Carfentrazone | Chlorpropham | Tolpyralate |
| Carfentrazone | Chlorpropham | Topramezone |
| Carfentrazone | Desmedipham | Benzobicyclon |
| Carfentrazone | Desmedipham | Benzofenap |
| Carfentrazone | Desmedipham | Bicyclopyrone |
| Carfentrazone | Desmedipham | Fenquinotrione |
| Carfentrazone | Desmedipham | Isoxachlortole |
| Carfentrazone | Desmedipham | Isoxaflutole |
| Carfentrazone | Desmedipham | Mesotrione |
| Carfentrazone | Desmedipham | Pyrasulfotole |
| Carfentrazone | Desmedipham | Pyrazolynate |
| Carfentrazone | Desmedipham | Pyrazoxyfen |
| Carfentrazone | Desmedipham | Sulcotrione |
| Carfentrazone | Desmedipham | Tefuryltrione |
| Carfentrazone | Desmedipham | Tolpyralate |
| Carfentrazone | Desmedipham | Topramezone |
| Carfentrazone | Phenmedipham | Benzobicyclon |
| Carfentrazone | Phenmedipham | Benzofenap |
| Carfentrazone | Phenmedipham | Bicyclopyrone |
| Carfentrazone | Phenmedipham | Fenquinotrione |
| Carfentrazone | Phenmedipham | Isoxachlortole |
| Carfentrazone | Phenmedipham | Isoxaflutole |
| Carfentrazone | Phenmedipham | Mesotrione |
| Carfentrazone | Phenmedipham | Pyrasulfotole |
| Carfentrazone | Phenmedipham | Pyrazolynate |
| Carfentrazone | Phenmedipham | Pyrazoxyfen |
| Carfentrazone | Phenmedipham | Sulcotrione |
| Carfentrazone | Phenmedipham | Tefuryltrione |
| Carfentrazone | Phenmedipham | Tolpyralate |
| Carfentrazone | Phenmedipham | Topramezone |
| Carfentrazone | Phenmedipham-Ethyl | Benzobicyclon |
| Carfentrazone | Phenmedipham-Ethyl | Benzofenap |
| Carfentrazone | Phenmedipham-Ethyl | Bicyclopyrone |
| Carfentrazone | Phenmedipham-Ethyl | Fenquinotrione |
| Carfentrazone | Phenmedipham-Ethyl | Isoxachlortole |
| Carfentrazone | Phenmedipham-Ethyl | Isoxaflutole |
| Carfentrazone | Phenmedipham-Ethyl | Mesotrione |
| Carfentrazone | Phenmedipham-Ethyl | Pyrasulfotole |
| Carfentrazone | Phenmedipham-Ethyl | Pyrazolynate |
| Carfentrazone | Phenmedipham-Ethyl | Pyrazoxyfen |
| Carfentrazone | Phenmedipham-Ethyl | Sulcotrione |
| Carfentrazone | Phenmedipham-Ethyl | Tefuryltrione |
| Carfentrazone | Phenmedipham-Ethyl | Tolpyralate |
| Carfentrazone | Phenmedipham-Ethyl | Topramezone |
| Carfentrazone | Atrazine | Benzobicyclon |
| Carfentrazone | Atrazine | Benzofenap |

-continued

| Triazolone Herbicide | Photosystem II Inhibitor | Third Herbicide |
|---|---|---|
| Carfentrazone | Atrazine | Bicyclopyrone |
| Carfentrazone | Atrazine | Fenquinotrione |
| Carfentrazone | Atrazine | Isoxachlortole |
| Carfentrazone | Atrazine | Isoxaflutole |
| Carfentrazone | Atrazine | Mesotrione |
| Carfentrazone | Atrazine | Pyrasulfotole |
| Carfentrazone | Atrazine | Pyrazolynate |
| Carfentrazone | Atrazine | Pyrazoxyfen |
| Carfentrazone | Atrazine | Sulcotrione |
| Carfentrazone | Atrazine | Tefuryltrione |
| Carfentrazone | Atrazine | Tolpyralate |
| Carfentrazone | Atrazine | Topramezone |
| Carfentrazone | Bentazon | Benzobicyclon |
| Carfentrazone | Bentazon | Benzofenap |
| Carfentrazone | Bentazon | Bicyclopyrone |
| Carfentrazone | Bentazon | Fenquinotrione |
| Carfentrazone | Bentazon | Isoxachlortole |
| Carfentrazone | Bentazon | Isoxaflutole |
| Carfentrazone | Bentazon | Mesotrione |
| Carfentrazone | Bentazon | Pyrasulfotole |
| Carfentrazone | Bentazon | Pyrazolynate |
| Carfentrazone | Bentazon | Pyrazoxyfen |
| Carfentrazone | Bentazon | Sulcotrione |
| Carfentrazone | Bentazon | Tefuryltrione |
| Carfentrazone | Bentazon | Tolpyralate |
| Carfentrazone | Bentazon | Topramezone |
| Carfentrazone | Metamitron | Benzobicyclon |
| Carfentrazone | Metamitron | Benzofenap |
| Carfentrazone | Metamitron | Bicyclopyrone |
| Carfentrazone | Metamitron | Fenquinotrione |
| Carfentrazone | Metamitron | Isoxachlortole |
| Carfentrazone | Metamitron | Isoxaflutole |
| Carfentrazone | Metamitron | Mesotrione |
| Carfentrazone | Metamitron | Pyrasulfotole |
| Carfentrazone | Metamitron | Pyrazolynate |
| Carfentrazone | Metamitron | Pyrazoxyfen |
| Carfentrazone | Metamitron | Sulcotrione |
| Carfentrazone | Metamitron | Tefuryltrione |
| Carfentrazone | Metamitron | Tolpyralate |
| Carfentrazone | Metamitron | Topramezone |
| Carfentrazone | Metribuzin | Benzobicyclon |
| Carfentrazone | Metribuzin | Benzofenap |
| Carfentrazone | Metribuzin | Bicyclopyrone |
| Carfentrazone | Metribuzin | Fenquinotrione |
| Carfentrazone | Metribuzin | Isoxachlortole |
| Carfentrazone | Metribuzin | Isoxaflutole |
| Carfentrazone | Metribuzin | Mesotrione |
| Carfentrazone | Metribuzin | Pyrasulfotole |
| Carfentrazone | Metribuzin | Pyrazolynate |
| Carfentrazone | Metribuzin | Pyrazoxyfen |
| Carfentrazone | Metribuzin | Sulcotrione |
| Carfentrazone | Metribuzin | Tefuryltrione |
| Carfentrazone | Metribuzin | Tolpyralate |
| Carfentrazone | Metribuzin | Topramezone |
| Carfentrazone | Diuron | Benzobicyclon |
| Carfentrazone | Diuron | Benzofenap |
| Carfentrazone | Diuron | Bicyclopyrone |
| Carfentrazone | Diuron | Fenquinotrione |
| Carfentrazone | Diuron | Isoxachlortole |
| Carfentrazone | Diuron | Isoxaflutole |
| Carfentrazone | Diuron | Mesotrione |
| Carfentrazone | Diuron | Pyrasulfotole |
| Carfentrazone | Diuron | Pyrazolynate |
| Carfentrazone | Diuron | Pyrazoxyfen |
| Carfentrazone | Diuron | Sulcotrione |
| Carfentrazone | Diuron | Tefuryltrione |
| Carfentrazone | Diuron | Tolpyralate |
| Carfentrazone | Diuron | Topramezone |
| Carfentrazone | Linuron | Benzobicyclon |
| Carfentrazone | Linuron | Benzofenap |
| Carfentrazone | Linuron | Bicyclopyrone |
| Carfentrazone | Linuron | Fenquinotrione |
| Carfentrazone | Linuron | Isoxachlortole |
| Carfentrazone | Linuron | Isoxaflutole |
| Carfentrazone | Linuron | Mesotrione |
| Carfentrazone | Linuron | Pyrasulfotole |
| Carfentrazone | Linuron | Pyrazolynate |

-continued

| Triazolone Herbicide | Photosystem II Inhibitor | Third Herbicide |
|---|---|---|
| Carfentrazone | Linuron | Pyrazoxyfen |
| Carfentrazone | Linuron | Sulcotrione |
| Carfentrazone | Linuron | Tefuryltrione |
| Carfentrazone | Linuron | Tolpyralate |
| Carfentrazone | Linuron | Topramezone |
| Carfentrazone | Chlorpropham | Amitrole |
| Carfentrazone | Chlorpropham | Mesotrione |
| Carfentrazone | Chlorpropham | Sulcotrione |
| Carfentrazone | Chlorpropham | Isoxachlortole |
| Carfentrazone | Chlorpropham | Isoxaflutole |
| Carfentrazone | Chlorpropham | Benzofenap |
| Carfentrazone | Chlorpropham | Pyrazolynate |
| Carfentrazone | Chlorpropham | Pyrazoxyfen |
| Carfentrazone | Chlorpropham | Norflurazon |
| Carfentrazone | Chlorpropham | Diflufenican |
| Carfentrazone | Chlorpropham | Picolinafen |
| Carfentrazone | Chlorpropham | Clomazone |
| Carfentrazone | Chlorpropham | Fluometuron |
| Carfentrazone | Chlorpropham | Aclonifen |
| Carfentrazone | Desmedipham | Amitrole |
| Carfentrazone | Desmedipham | Mesotrione |
| Carfentrazone | Desmedipham | Sulcotrione |
| Carfentrazone | Desmedipham | Isoxachlortole |
| Carfentrazone | Desmedipham | Isoxaflutole |
| Carfentrazone | Desmedipham | Benzofenap |
| Carfentrazone | Desmedipham | Pyrazolynate |
| Carfentrazone | Desmedipham | Pyrazoxyfen |
| Carfentrazone | Desmedipham | Norflurazon |
| Carfentrazone | Desmedipham | Diflufenican |
| Carfentrazone | Desmedipham | Picolinafen |
| Carfentrazone | Desmedipham | Clomazone |
| Carfentrazone | Desmedipham | Fluometuron |
| Carfentrazone | Desmedipham | Aclonifen |
| Carfentrazone | Phenmedipham | Amitrole |
| Carfentrazone | Phenmedipham | Mesotrione |
| Carfentrazone | Phenmedipham | Sulcotrione |
| Carfentrazone | Phenmedipham | Isoxachlortole |
| Carfentrazone | Phenmedipham | Isoxaflutole |
| Carfentrazone | Phenmedipham | Benzofenap |
| Carfentrazone | Phenmedipham | Pyrazolynate |
| Carfentrazone | Phenmedipham | Pyrazoxyfen |
| Carfentrazone | Phenmedipham | Norflurazon |
| Carfentrazone | Phenmedipham | Diflufenican |
| Carfentrazone | Phenmedipham | Picolinafen |
| Carfentrazone | Phenmedipham | Clomazone |
| Carfentrazone | Phenmedipham | Fluometuron |
| Carfentrazone | Phenmedipham | Aclonifen |
| Carfentrazone | Phenmedipham-Ethyl | Amitrole |
| Carfentrazone | Phenmedipham-Ethyl | Mesotrione |
| Carfentrazone | Phenmedipham-Ethyl | Sulcotrione |
| Carfentrazone | Phenmedipham-Ethyl | Isoxachlortole |
| Carfentrazone | Phenmedipham-Ethyl | Isoxaflutole |
| Carfentrazone | Phenmedipham-Ethyl | Benzofenap |
| Carfentrazone | Phenmedipham-Ethyl | Pyrazolynate |
| Carfentrazone | Phenmedipham-Ethyl | Pyrazoxyfen |
| Carfentrazone | Phenmedipham-Ethyl | Norflurazon |
| Carfentrazone | Phenmedipham-Ethyl | Diflufenican |
| Carfentrazone | Phenmedipham-Ethyl | Picolinafen |
| Carfentrazone | Phenmedipham-Ethyl | Clomazone |
| Carfentrazone | Phenmedipham-Ethyl | Fluometuron |
| Carfentrazone | Phenmedipham-Ethyl | Aclonifen |
| Carfentrazone | Atrazine | Amitrole |
| Carfentrazone | Atrazine | Mesotrione |
| Carfentrazone | Atrazine | Sulcotrione |
| Carfentrazone | Atrazine | Isoxachlortole |
| Carfentrazone | Atrazine | Isoxaflutole |
| Carfentrazone | Atrazine | Benzofenap |
| Carfentrazone | Atrazine | Pyrazolynate |
| Carfentrazone | Atrazine | Pyrazoxyfen |
| Carfentrazone | Atrazine | Norflurazon |
| Carfentrazone | Atrazine | Diflufenican |
| Carfentrazone | Atrazine | Picolinafen |
| Carfentrazone | Atrazine | Clomazone |
| Carfentrazone | Atrazine | Fluometuron |
| Carfentrazone | Atrazine | Aclonifen |
| Carfentrazone | Bentazon | Amitrole |
| Carfentrazone | Bentazon | Mesotrione |

-continued

| Triazolone Herbicide | Photosystem II Inhibitor | Third Herbicide |
|---|---|---|
| Carfentrazone | Bentazon | Sulcotrione |
| Carfentrazone | Bentazon | Isoxachlortole |
| Carfentrazone | Bentazon | Isoxaflutole |
| Carfentrazone | Bentazon | Benzofenap |
| Carfentrazone | Bentazon | Pyrazolynate |
| Carfentrazone | Bentazon | Pyrazoxyfen |
| Carfentrazone | Bentazon | Norflurazon |
| Carfentrazone | Bentazon | Diflufenican |
| Carfentrazone | Bentazon | Picolinafen |
| Carfentrazone | Bentazon | Clomazone |
| Carfentrazone | Bentazon | Fluometuron |
| Carfentrazone | Bentazon | Aclonifen |
| Carfentrazone | Metamitron | Amitrole |
| Carfentrazone | Metamitron | Mesotrione |
| Carfentrazone | Metamitron | Sulcotrione |
| Carfentrazone | Metamitron | Isoxachlortole |
| Carfentrazone | Metamitron | Isoxaflutole |
| Carfentrazone | Metamitron | Benzofenap |
| Carfentrazone | Metamitron | Pyrazolynate |
| Carfentrazone | Metamitron | Pyrazoxyfen |
| Carfentrazone | Metamitron | Norflurazon |
| Carfentrazone | Metamitron | Diflufenican |
| Carfentrazone | Metamitron | Picolinafen |
| Carfentrazone | Metamitron | Clomazone |
| Carfentrazone | Metamitron | Fluometuron |
| Carfentrazone | Metamitron | Aclonifen |
| Carfentrazone | Metribuzin | Amitrole |
| Carfentrazone | Metribuzin | Mesotrione |
| Carfentrazone | Metribuzin | Sulcotrione |
| Carfentrazone | Metribuzin | Isoxachlortole |
| Carfentrazone | Metribuzin | Isoxaflutole |
| Carfentrazone | Metribuzin | Benzofenap |
| Carfentrazone | Metribuzin | Pyrazolynate |
| Carfentrazone | Metribuzin | Pyrazoxyfen |
| Carfentrazone | Metribuzin | Norflurazon |
| Carfentrazone | Metribuzin | Diflufenican |
| Carfentrazone | Metribuzin | Picolinafen |
| Carfentrazone | Metribuzin | Clomazone |
| Carfentrazone | Metribuzin | Fluometuron |
| Carfentrazone | Metribuzin | Aclonifen |
| Carfentrazone | Diuron | Amitrole |
| Carfentrazone | Diuron | Mesotrione |
| Carfentrazone | Diuron | Sulcotrione |
| Carfentrazone | Diuron | Isoxachlortole |
| Carfentrazone | Diuron | Isoxaflutole |
| Carfentrazone | Diuron | Benzofenap |
| Carfentrazone | Diuron | Pyrazolynate |
| Carfentrazone | Diuron | Pyrazoxyfen |
| Carfentrazone | Diuron | Norflurazon |
| Carfentrazone | Diuron | Diflufenican |
| Carfentrazone | Diuron | Picolinafen |
| Carfentrazone | Diuron | Clomazone |
| Carfentrazone | Diuron | Fluometuron |
| Carfentrazone | Diuron | Aclonifen |
| Carfentrazone | Linuron | Amitrole |
| Carfentrazone | Linuron | Mesotrione |
| Carfentrazone | Linuron | Sulcotrione |
| Carfentrazone | Linuron | Isoxachlortole |
| Carfentrazone | Linuron | Isoxaflutole |
| Carfentrazone | Linuron | Benzofenap |
| Carfentrazone | Linuron | Pyrazolynate |
| Carfentrazone | Linuron | Pyrazoxyfen |
| Carfentrazone | Linuron | Norflurazon |
| Carfentrazone | Linuron | Diflufenican |
| Carfentrazone | Linuron | Picolinafen |
| Carfentrazone | Linuron | Clomazone |
| Carfentrazone | Linuron | Fluometuron |
| Carfentrazone | Linuron | Aclonifen |
| Carfentrazone | Chlorpropham | Acetochlor |
| Carfentrazone | Chlorpropham | Alachlor |
| Carfentrazone | Chlorpropham | Butachlor |
| Carfentrazone | Chlorpropham | Dimethachlor |
| Carfentrazone | Chlorpropham | Dimethanamid |
| Carfentrazone | Chlorpropham | Metazachlor |
| Carfentrazone | Chlorpropham | Metolachlor |
| Carfentrazone | Chlorpropham | Pethoxamid |
| Carfentrazone | Chlorpropham | Pretilachlor |

-continued

| Triazolone Herbicide | Photosystem II Inhibitor | Third Herbicide |
|---|---|---|
| Carfentrazone | Chlorpropham | Propachlor |
| Carfentrazone | Chlorpropham | Propisochlor |
| Carfentrazone | Chlorpropham | Thenylchlor |
| Carfentrazone | Chlorpropham | Diphenamid |
| Carfentrazone | Chlorpropham | Napropamide |
| Carfentrazone | Desmedipham | Acetochlor |
| Carfentrazone | Desmedipham | Alachlor |
| Carfentrazone | Desmedipham | Butachlor |
| Carfentrazone | Desmedipham | Dimethachlor |
| Carfentrazone | Desmedipham | Dimethanamid |
| Carfentrazone | Desmedipham | Metazachlor |
| Carfentrazone | Desmedipham | Metolachlor |
| Carfentrazone | Desmedipham | Pethoxamid |
| Carfentrazone | Desmedipham | Pretilachlor |
| Carfentrazone | Desmedipham | Propachlor |
| Carfentrazone | Desmedipham | Propisochlor |
| Carfentrazone | Desmedipham | Thenylchlor |
| Carfentrazone | Desmedipham | Diphenamid |
| Carfentrazone | Desmedipham | Napropamide |
| Carfentrazone | Phenmedipham | Acetochlor |
| Carfentrazone | Phenmedipham | Alachlor |
| Carfentrazone | Phenmedipham | Butachlor |
| Carfentrazone | Phenmedipham | Dimethachlor |
| Carfentrazone | Phenmedipham | Dimethanamid |
| Carfentrazone | Phenmedipham | Metazachlor |
| Carfentrazone | Phenmedipham | Metolachlor |
| Carfentrazone | Phenmedipham | Pethoxamid |
| Carfentrazone | Phenmedipham | Pretilachlor |
| Carfentrazone | Phenmedipham | Propachlor |
| Carfentrazone | Phenmedipham | Propisochlor |
| Carfentrazone | Phenmedipham | Thenylchlor |
| Carfentrazone | Phenmedipham | Diphenamid |
| Carfentrazone | Phenmedipham | Napropamide |
| Carfentrazone | Phenmedipham-Ethyl | Acetochlor |
| Carfentrazone | Phenmedipham-Ethyl | Alachlor |
| Carfentrazone | Phenmedipham-Ethyl | Butachlor |
| Carfentrazone | Phenmedipham-Ethyl | Dimethachlor |
| Carfentrazone | Phenmedipham-Ethyl | Dimethanamid |
| Carfentrazone | Phenmedipham-Ethyl | Metazachlor |
| Carfentrazone | Phenmedipham-Ethyl | Metolachlor |
| Carfentrazone | Phenmedipham-Ethyl | Pethoxamid |
| Carfentrazone | Phenmedipham-Ethyl | Pretilachlor |
| Carfentrazone | Phenmedipham-Ethyl | Propachlor |
| Carfentrazone | Phenmedipham-Ethyl | Propisochlor |
| Carfentrazone | Phenmedipham-Ethyl | Thenylchlor |
| Carfentrazone | Phenmedipham-Ethyl | Diphenamid |
| Carfentrazone | Phenmedipham-Ethyl | Napropamide |
| Carfentrazone | Atrazine | Acetochlor |
| Carfentrazone | Atrazine | Alachlor |
| Carfentrazone | Atrazine | Butachlor |
| Carfentrazone | Atrazine | Dimethachlor |
| Carfentrazone | Atrazine | Dimethanamid |
| Carfentrazone | Atrazine | Metazachlor |
| Carfentrazone | Atrazine | Metolachlor |
| Carfentrazone | Atrazine | Pethoxamid |
| Carfentrazone | Atrazine | Pretilachlor |
| Carfentrazone | Atrazine | Propachlor |
| Carfentrazone | Atrazine | Propisochlor |
| Carfentrazone | Atrazine | Thenylchlor |
| Carfentrazone | Atrazine | Diphenamid |
| Carfentrazone | Atrazine | Napropamide |
| Carfentrazone | Bentazon | Acetochlor |
| Carfentrazone | Bentazon | Alachlor |
| Carfentrazone | Bentazon | Butachlor |
| Carfentrazone | Bentazon | Dimethachlor |
| Carfentrazone | Bentazon | Dimethanamid |
| Carfentrazone | Bentazon | Metazachlor |
| Carfentrazone | Bentazon | Metolachlor |
| Carfentrazone | Bentazon | Pethoxamid |
| Carfentrazone | Bentazon | Pretilachlor |
| Carfentrazone | Bentazon | Propachlor |
| Carfentrazone | Bentazon | Propisochlor |
| Carfentrazone | Bentazon | Thenylchlor |
| Carfentrazone | Bentazon | Diphenamid |
| Carfentrazone | Bentazon | Napropamide |
| Carfentrazone | Metamitron | Acetochlor |
| Carfentrazone | Metamitron | Alachlor |

-continued

| Triazolone Herbicide | Photosystem II Inhibitor | Third Herbicide |
|---|---|---|
| Carfentrazone | Metamitron | Butachlor |
| Carfentrazone | Metamitron | Dimethachlor |
| Carfentrazone | Metamitron | Dimethanamid |
| Carfentrazone | Metamitron | Metazachlor |
| Carfentrazone | Metamitron | Metolachlor |
| Carfentrazone | Metamitron | Pethoxamid |
| Carfentrazone | Metamitron | Pretilachlor |
| Carfentrazone | Metamitron | Propachlor |
| Carfentrazone | Metamitron | Propisochlor |
| Carfentrazone | Metamitron | Thenylchlor |
| Carfentrazone | Metamitron | Diphenamid |
| Carfentrazone | Metamitron | Napropamide |
| Carfentrazone | Metribuzin | Acetochlor |
| Carfentrazone | Metribuzin | Alachlor |
| Carfentrazone | Metribuzin | Butachlor |
| Carfentrazone | Metribuzin | Dimethachlor |
| Carfentrazone | Metribuzin | Dimethanamid |
| Carfentrazone | Metribuzin | Metazachlor |
| Carfentrazone | Metribuzin | Metolachlor |
| Carfentrazone | Metribuzin | Pethoxamid |
| Carfentrazone | Metribuzin | Pretilachlor |
| Carfentrazone | Metribuzin | Propachlor |
| Carfentrazone | Metribuzin | Propisochlor |
| Carfentrazone | Metribuzin | Thenylchlor |
| Carfentrazone | Metribuzin | Diphenamid |
| Carfentrazone | Metribuzin | Napropamide |
| Carfentrazone | Diuron | Acetochlor |
| Carfentrazone | Diuron | Alachlor |
| Carfentrazone | Diuron | Butachlor |
| Carfentrazone | Diuron | Dimethachlor |
| Carfentrazone | Diuron | Dimethanamid |
| Carfentrazone | Diuron | Metazachlor |
| Carfentrazone | Diuron | Metolachlor |
| Carfentrazone | Diuron | Pethoxamid |
| Carfentrazone | Diuron | Pretilachlor |
| Carfentrazone | Diuron | Propachlor |
| Carfentrazone | Diuron | Propisochlor |
| Carfentrazone | Diuron | Thenylchlor |
| Carfentrazone | Diuron | Diphenamid |
| Carfentrazone | Diuron | Napropamide |
| Carfentrazone | Linuron | Acetochlor |
| Carfentrazone | Linuron | Alachlor |
| Carfentrazone | Linuron | Butachlor |
| Carfentrazone | Linuron | Dimethachlor |
| Carfentrazone | Linuron | Dimethanamid |
| Carfentrazone | Linuron | Metazachlor |
| Carfentrazone | Linuron | Metolachlor |
| Carfentrazone | Linuron | Pethoxamid |
| Carfentrazone | Linuron | Pretilachlor |
| Carfentrazone | Linuron | Propachlor |
| Carfentrazone | Linuron | Propisochlor |
| Carfentrazone | Linuron | Thenylchlor |
| Carfentrazone | Linuron | Diphenamid |
| Carfentrazone | Linuron | Napropamide |
| Carfentrazone | Chlorpropham | Benfluralin |
| Carfentrazone | Chlorpropham | Butralin |
| Carfentrazone | Chlorpropham | Dinitramine |
| Carfentrazone | Chlorpropham | Pendimethalin |
| Carfentrazone | Chlorpropham | Propyzamide |
| Carfentrazone | Chlorpropham | DCPA |
| Carfentrazone | Chlorpropham | Pendimethalin |
| Carfentrazone | Chlorpropham | Ethalfluralin |
| Carfentrazone | Chlorpropham | Oryzalin |
| Carfentrazone | Chlorpropham | Trifluralin |
| Carfentrazone | Chlorpropham | Prodiamine |
| Carfentrazone | Chlorpropham | Dithiopyr |
| Carfentrazone | Desmedipham | Benfluralin |
| Carfentrazone | Desmedipham | Butralin |
| Carfentrazone | Desmedipham | Dinitramine |
| Carfentrazone | Desmedipham | Pendimethalin |
| Carfentrazone | Desmedipham | Propyzamide |
| Carfentrazone | Desmedipham | DCPA |
| Carfentrazone | Desmedipham | Pendimethalin |
| Carfentrazone | Desmedipham | Ethalfluralin |
| Carfentrazone | Desmedipham | Oryzalin |
| Carfentrazone | Desmedipham | Trifluralin |
| Carfentrazone | Desmedipham | Prodiamine |

| Triazolone Herbicide | Photosystem II Inhibitor | Third Herbicide |
|---|---|---|
| Carfentrazone | Desmedipham | Dithiopyr |
| Carfentrazone | Phenmedipham | Benfluralin |
| Carfentrazone | Phenmedipham | Butralin |
| Carfentrazone | Phenmedipham | Dinitramine |
| Carfentrazone | Phenmedipham | Pendimethalin |
| Carfentrazone | Phenmedipham | Propyzamide |
| Carfentrazone | Phenmedipham | DCPA |
| Carfentrazone | Phenmedipham | Ethalfluralin |
| Carfentrazone | Phenmedipham | Oryzalin |
| Carfentrazone | Phenmedipham | Trifluralin |
| Carfentrazone | Phenmedipham | Prodiamine |
| Carfentrazone | Phenmedipham | Dithiopyr |
| Carfentrazone | Phenmedipham-Ethyl | Benfluralin |
| Carfentrazone | Phenmedipham-Ethyl | Butralin |
| Carfentrazone | Phenmedipham-Ethyl | Dinitramine |
| Carfentrazone | Phenmedipham-Ethyl | Propyzamide |
| Carfentrazone | Phenmedipham-Ethyl | DCPA |
| Carfentrazone | Phenmedipham-Ethyl | Pendimethalin |
| Carfentrazone | Phenmedipham-Ethyl | Ethalfluralin |
| Carfentrazone | Phenmedipham-Ethyl | Oryzalin |
| Carfentrazone | Phenmedipham-Ethyl | Trifluralin |
| Carfentrazone | Phenmedipham-Ethyl | Prodiamine |
| Carfentrazone | Phenmedipham-Ethyl | Dithiopyr |
| Carfentrazone | Atrazine | Benfluralin |
| Carfentrazone | Atrazine | Butralin |
| Carfentrazone | Atrazine | Dinitramine |
| Carfentrazone | Atrazine | Oryzalin |
| Carfentrazone | Atrazine | Trifluralin |
| Carfentrazone | Atrazine | Propyzamide |
| Carfentrazone | Atrazine | DCPA |
| Carfentrazone | Atrazine | Pendimethalin |
| Carfentrazone | Atrazine | Ethalfluralin |
| Carfentrazone | Atrazine | Prodiamine |
| Carfentrazone | Atrazine | Dithiopyr |
| Carfentrazone | Bentazon | Benfluralin |
| Carfentrazone | Bentazon | Butralin |
| Carfentrazone | Bentazon | Dinitramine |
| Carfentrazone | Bentazon | Oryzalin |
| Carfentrazone | Bentazon | Pendimethalin |
| Carfentrazone | Bentazon | Propyzamide |
| Carfentrazone | Bentazon | DCPA |
| Carfentrazone | Bentazon | Pendimethalin |
| Carfentrazone | Bentazon | Ethalfluralin |
| Carfentrazone | Bentazon | Trifluralin |
| Carfentrazone | Bentazon | Prodiamine |
| Carfentrazone | Bentazon | Dithiopyr |
| Carfentrazone | Metamitron | Benfluralin |
| Carfentrazone | Metamitron | Butralin |
| Carfentrazone | Metamitron | Dinitramine |
| Carfentrazone | Metamitron | Propyzamide |
| Carfentrazone | Metamitron | DCPA |
| Carfentrazone | Metamitron | Pendimethalin |
| Carfentrazone | Metamitron | Ethalfluralin |
| Carfentrazone | Metamitron | Oryzalin |
| Carfentrazone | Metamitron | Trifluralin |
| Carfentrazone | Metamitron | Prodiamine |
| Carfentrazone | Metamitron | Dithiopyr |
| Carfentrazone | Metribuzin | Benfluralin |
| Carfentrazone | Metribuzin | Butralin |
| Carfentrazone | Metribuzin | Dinitramine |
| Carfentrazone | Metribuzin | Oryzalin |
| Carfentrazone | Metribuzin | Pendimethalin |
| Carfentrazone | Metribuzin | Trifluralin |
| Carfentrazone | Metribuzin | Propyzamide |
| Carfentrazone | Metribuzin | DCPA |
| Carfentrazone | Metribuzin | Ethalfluralin |
| Carfentrazone | Metribuzin | Prodiamine |
| Carfentrazone | Metribuzin | Dithiopyr |
| Carfentrazone | Diuron | Benfluralin |
| Carfentrazone | Diuron | Butralin |
| Carfentrazone | Diuron | Dinitramine |
| Carfentrazone | Diuron | Oryzalin |
| Carfentrazone | Diuron | Trifluralin |
| Carfentrazone | Diuron | Propyzamide |
| Carfentrazone | Diuron | DCPA |
| Carfentrazone | Diuron | Pendimethalin |
| Carfentrazone | Diuron | Ethalfluralin |

-continued

| Triazolone Herbicide | Photosystem II Inhibitor | Third Herbicide |
|---|---|---|
| Carfentrazone | Diuron | Prodiamine |
| Carfentrazone | Diuron | Dithiopyr |
| Carfentrazone | Linuron | Benfluralin |
| Carfentrazone | Linuron | Butralin |
| Carfentrazone | Linuron | Dinitramine |
| Carfentrazone | Linuron | Pendimethalin |
| Carfentrazone | Linuron | Trifluralin |
| Carfentrazone | Linuron | Propyzamide |
| Carfentrazone | Linuron | DCPA |
| Carfentrazone | Linuron | Ethalfluralin |
| Carfentrazone | Linuron | Oryzalin |
| Carfentrazone | Linuron | Prodiamine |
| Carfentrazone | Linuron | Dithiopyr |
| Carfentrazone | Chlorpropham | Acifluorfen |
| Carfentrazone | Chlorpropham | Fomesafen |
| Carfentrazone | Chlorpropham | Lactofen |
| Carfentrazone | Chlorpropham | Flumiclorac |
| Carfentrazone | Chlorpropham | Flumioxazin |
| Carfentrazone | Chlorpropham | Flufenpyr-Ethyl |
| Carfentrazone | Chlorpropham | Fomesafen |
| Carfentrazone | Chlorpropham | Fluthiacet-Ethyl |
| Carfentrazone | Chlorpropham | Saflufenacil |
| Carfentrazone | Chlorpropham | Azafenidin |
| Carfentrazone | Chlorpropham | Benzfendizone |
| Carfentrazone | Chlorpropham | Bifenox |
| Carfentrazone | Chlorpropham | Butafenacil |
| Carfentrazone | Chlorpropham | Oxadiazon |
| Carfentrazone | Desmedipham | Acifluorfen |
| Carfentrazone | Desmedipham | Fomesafen |
| Carfentrazone | Desmedipham | Lactofen |
| Carfentrazone | Desmedipham | Flumiclorac |
| Carfentrazone | Desmedipham | Flumioxazin |
| Carfentrazone | Desmedipham | Flufenpyr-Ethyl |
| Carfentrazone | Desmedipham | Fomesafen |
| Carfentrazone | Desmedipham | Fluthiacet-Ethyl |
| Carfentrazone | Desmedipham | Saflufenacil |
| Carfentrazone | Desmedipham | Azafenidin |
| Carfentrazone | Desmedipham | Benzfendizone |
| Carfentrazone | Desmedipham | Bifenox |
| Carfentrazone | Desmedipham | Butafenacil |
| Carfentrazone | Desmedipham | Oxadiazon |
| Carfentrazone | Phenmedipham | Acifluorfen |
| Carfentrazone | Phenmedipham | Fomesafen |
| Carfentrazone | Phenmedipham | Lactofen |
| Carfentrazone | Phenmedipham | Flumiclorac |
| Carfentrazone | Phenmedipham | Flumioxazin |
| Carfentrazone | Phenmedipham | Flufenpyr-Ethyl |
| Carfentrazone | Phenmedipham | Fomesafen |
| Carfentrazone | Phenmedipham | Fluthiacet-Ethyl |
| Carfentrazone | Phenmedipham | Saflufenacil |
| Carfentrazone | Phenmedipham | Azafenidin |
| Carfentrazone | Phenmedipham | Benzfendizone |
| Carfentrazone | Phenmedipham | Bifenox |
| Carfentrazone | Phenmedipham | Butafenacil |
| Carfentrazone | Phenmedipham | Oxadiazon |
| Carfentrazone | Phenmedipham-Ethyl | Acifluorfen |
| Carfentrazone | Phenmedipham-Ethyl | Fomesafen |
| Carfentrazone | Phenmedipham-Ethyl | Lactofen |
| Carfentrazone | Phenmedipham-Ethyl | Flumiclorac |
| Carfentrazone | Phenmedipham-Ethyl | Flumioxazin |
| Carfentrazone | Phenmedipham-Ethyl | Flufenpyr-Ethyl |
| Carfentrazone | Phenmedipham-Ethyl | Fomesafen |
| Carfentrazone | Phenmedipham-Ethyl | Fluthiacet-Ethyl |
| Carfentrazone | Phenmedipham-Ethyl | Saflufenacil |
| Carfentrazone | Phenmedipham-Ethyl | Azafenidin |
| Carfentrazone | Phenmedipham-Ethyl | Benzfendizone |
| Carfentrazone | Phenmedipham-Ethyl | Bifenox |
| Carfentrazone | Phenmedipham-Ethyl | Butafenacil |
| Carfentrazone | Phenmedipham-Ethyl | Oxadiazon |
| Carfentrazone | Atrazine | Acifluorfen |
| Carfentrazone | Atrazine | Fomesafen |
| Carfentrazone | Atrazine | Lactofen |
| Carfentrazone | Atrazine | Flumiclorac |
| Carfentrazone | Atrazine | Flumioxazin |
| Carfentrazone | Atrazine | Flufenpyr-Ethyl |
| Carfentrazone | Atrazine | Fomesafen |
| Carfentrazone | Atrazine | Fluthiacet-Ethyl |

-continued

| Triazolone Herbicide | Photosystem II Inhibitor | Third Herbicide |
|---|---|---|
| Carfentrazone | Atrazine | Saflufenacil |
| Carfentrazone | Atrazine | Azafenidin |
| Carfentrazone | Atrazine | Benzfendizone |
| Carfentrazone | Atrazine | Bifenox |
| Carfentrazone | Atrazine | Butafenacil |
| Carfentrazone | Atrazine | Oxadiazon |
| Carfentrazone | Bentazon | Acifluorfen |
| Carfentrazone | Bentazon | Fomesafen |
| Carfentrazone | Bentazon | Lactofen |
| Carfentrazone | Bentazon | Flumiclorac |
| Carfentrazone | Bentazon | Flumioxazin |
| Carfentrazone | Bentazon | Flufenpyr-Ethyl |
| Carfentrazone | Bentazon | Fomesafen |
| Carfentrazone | Bentazon | Fluthiacet-Ethyl |
| Carfentrazone | Bentazon | Saflufenacil |
| Carfentrazone | Bentazon | Azafenidin |
| Carfentrazone | Bentazon | Benzfendizone |
| Carfentrazone | Bentazon | Bifenox |
| Carfentrazone | Bentazon | Butafenacil |
| Carfentrazone | Bentazon | Oxadiazon |
| Carfentrazone | Metamitron | Acifluorfen |
| Carfentrazone | Metamitron | Fomesafen |
| Carfentrazone | Metamitron | Lactofen |
| Carfentrazone | Metamitron | Flumiclorac |
| Carfentrazone | Metamitron | Flumioxazin |
| Carfentrazone | Metamitron | Flufenpyr-Ethyl |
| Carfentrazone | Metamitron | Fomesafen |
| Carfentrazone | Metamitron | Fluthiacet-Ethyl |
| Carfentrazone | Metamitron | Saflufenacil |
| Carfentrazone | Metamitron | Azafenidin |
| Carfentrazone | Metamitron | Benzfendizone |
| Carfentrazone | Metamitron | Bifenox |
| Carfentrazone | Metamitron | Butafenacil |
| Carfentrazone | Metamitron | Oxadiazon |
| Carfentrazone | Metribuzin | Acifluorfen |
| Carfentrazone | Metribuzin | Fomesafen |
| Carfentrazone | Metribuzin | Lactofen |
| Carfentrazone | Metribuzin | Flumiclorac |
| Carfentrazone | Metribuzin | Flumioxazin |
| Carfentrazone | Metribuzin | Flufenpyr-Ethyl |
| Carfentrazone | Metribuzin | Fomesafen |
| Carfentrazone | Metribuzin | Fluthiacet-Ethyl |
| Carfentrazone | Metribuzin | Saflufenacil |
| Carfentrazone | Metribuzin | Azafenidin |
| Carfentrazone | Metribuzin | Benzfendizone |
| Carfentrazone | Metribuzin | Bifenox |
| Carfentrazone | Metribuzin | Butafenacil |
| Carfentrazone | Metribuzin | Oxadiazon |
| Carfentrazone | Diuron | Acifluorfen |
| Carfentrazone | Diuron | Fomesafen |
| Carfentrazone | Diuron | Lactofen |
| Carfentrazone | Diuron | Flumiclorac |
| Carfentrazone | Diuron | Flumioxazin |
| Carfentrazone | Diuron | Flufenpyr-Ethyl |
| Carfentrazone | Diuron | Fomesafen |
| Carfentrazone | Diuron | Fluthiacet-Ethyl |
| Carfentrazone | Diuron | Saflufenacil |
| Carfentrazone | Diuron | Azafenidin |
| Carfentrazone | Diuron | Benzfendizone |
| Carfentrazone | Diuron | Bifenox |
| Carfentrazone | Diuron | Butafenacil |
| Carfentrazone | Diuron | Oxadiazon |
| Carfentrazone | Linuron | Acifluorfen |
| Carfentrazone | Linuron | Fomesafen |
| Carfentrazone | Linuron | Lactofen |
| Carfentrazone | Linuron | Flumiclorac |
| Carfentrazone | Linuron | Flumioxazin |
| Carfentrazone | Linuron | Flufenpyr-Ethyl |
| Carfentrazone | Linuron | Fomesafen |
| Carfentrazone | Linuron | Fluthiacet-Ethyl |
| Carfentrazone | Linuron | Saflufenacil |
| Carfentrazone | Linuron | Azafenidin |
| Carfentrazone | Linuron | Benzfendizone |
| Carfentrazone | Linuron | Bifenox |
| Carfentrazone | Linuron | Butafenacil |
| Carfentrazone | Linuron | Oxadiazon |
| Carfentrazone | Chlorpropham | Dichlobenil |

-continued

| Triazolone Herbicide | Photosystem II Inhibitor | Third Herbicide |
| --- | --- | --- |
| Carfentrazone | Chlorpropham | Chlorthiamid |
| Carfentrazone | Chlorpropham | Indaziflam |
| Carfentrazone | Chlorpropham | Isoxaben |
| Carfentrazone | Chlorpropham | Dichlobenil |
| Carfentrazone | Chlorpropham | Flupoxam |
| Carfentrazone | Desmedipham | Dichlobenil |
| Carfentrazone | Desmedipham | Chlorthiamid |
| Carfentrazone | Desmedipham | Indaziflam |
| Carfentrazone | Desmedipham | Isoxaben |
| Carfentrazone | Desmedipham | Dichlobenil |
| Carfentrazone | Desmedipham | Flupoxam |
| Carfentrazone | Phenmedipham | Dichlobenil |
| Carfentrazone | Phenmedipham | Chlorthiamid |
| Carfentrazone | Phenmedipham | Indaziflam |
| Carfentrazone | Phenmedipham | Isoxaben |
| Carfentrazone | Phenmedipham | Dichlobenil |
| Carfentrazone | Phenmedipham | Flupoxam |
| Carfentrazone | Phenmedipham-Ethyl | Dichlobenil |
| Carfentrazone | Phenmedipham-Ethyl | Chlorthiamid |
| Carfentrazone | Phenmedipham-Ethyl | Indaziflam |
| Carfentrazone | Phenmedipham-Ethyl | Isoxaben |
| Carfentrazone | Phenmedipham-Ethyl | Dichlobenil |
| Carfentrazone | Phenmedipham-Ethyl | Flupoxam |
| Carfentrazone | Atrazine | Dichlobenil |
| Carfentrazone | Atrazine | Chlorthiamid |
| Carfentrazone | Atrazine | Indaziflam |
| Carfentrazone | Atrazine | Isoxaben |
| Carfentrazone | Atrazine | Dichlobenil |
| Carfentrazone | Atrazine | Flupoxam |
| Carfentrazone | Bentazon | Dichlobenil |
| Carfentrazone | Bentazon | Chlorthiamid |
| Carfentrazone | Bentazon | Indaziflam |
| Carfentrazone | Bentazon | Isoxaben |
| Carfentrazone | Bentazon | Flupoxam |
| Carfentrazone | Metamitron | Dichlobenil |
| Carfentrazone | Metamitron | Chlorthiamid |
| Carfentrazone | Metamitron | Indaziflam |
| Carfentrazone | Metamitron | Isoxaben |
| Carfentrazone | Metamitron | Flupoxam |
| Carfentrazone | Metribuzin | Chlorthiamid |
| Carfentrazone | Metribuzin | Indaziflam |
| Carfentrazone | Metribuzin | Isoxaben |
| Carfentrazone | Metribuzin | Dichlobenil |
| Carfentrazone | Metribuzin | Flupoxam |
| Carfentrazone | Diuron | Dichlobenil |
| Carfentrazone | Diuron | Chlorthiamid |
| Carfentrazone | Diuron | Indaziflam |
| Carfentrazone | Diuron | Isoxaben |
| Carfentrazone | Diuron | Flupoxam |
| Carfentrazone | Linuron | Dichlobenil |
| Carfentrazone | Linuron | Chlorthiamid |
| Carfentrazone | Linuron | Indaziflam |
| Carfentrazone | Linuron | Isoxaben |
| Carfentrazone | Linuron | Flupoxam |
| Carfentrazone | Chlorpropham | Imazamox |
| Carfentrazone | Chlorpropham | Imazapic |
| Carfentrazone | Chlorpropham | Imazethapyr |
| Carfentrazone | Chlorpropham | Sulfentrazone |
| Carfentrazone | Chlorpropham | Flucarbazone-Sodium |
| Carfentrazone | Chlorpropham | Bensulfuron |
| Carfentrazone | Chlorpropham | Halosulfuron |
| Carfentrazone | Chlorpropham | Metsulfuron |
| Carfentrazone | Chlorpropham | Metazachlor |
| Carfentrazone | Chlorpropham | Pinoxaden |
| Carfentrazone | Desmedipham | Imazamox |
| Carfentrazone | Desmedipham | Imazapic |
| Carfentrazone | Desmedipham | Imazapyr |
| Carfentrazone | Desmedipham | Imazethapyr |
| Carfentrazone | Desmedipham | Sulfentrazone |
| Carfentrazone | Desmedipham | Flucarbazone-Sodium |
| Carfentrazone | Desmedipham | Bensulfuron |
| Carfentrazone | Desmedipham | Halosulfuron |
| Carfentrazone | Desmedipham | Metsulfuron |
| Carfentrazone | Desmedipham | Metazachlor |
| Carfentrazone | Desmedipham | Pinoxaden |
| Carfentrazone | Phenmedipham | Imazamox |
| Carfentrazone | Phenmedipham | Imazapic |

| Triazolone Herbicide | Photosystem II Inhibitor | Third Herbicide |
| --- | --- | --- |
| Carfentrazone | Phenmedipham | Imazapyr |
| Carfentrazone | Phenmedipham | Imazethapyr |
| Carfentrazone | Phenmedipham | Sulfentrazone |
| Carfentrazone | Phenmedipham | Flucarbazone-Sodium |
| Carfentrazone | Phenmedipham | Bensulfuron |
| Carfentrazone | Phenmedipham | Halosulfuron |
| Carfentrazone | Phenmedipham | Metsulfuron |
| Carfentrazone | Phenmedipham | Metazachlor |
| Carfentrazone | Phenmedipham | Pinoxaden |
| Carfentrazone | Phenmedipham-Ethyl | Imazamox |
| Carfentrazone | Phenmedipham-Ethyl | Imazapic |
| Carfentrazone | Phenmedipham-Ethyl | Imazapyr |
| Carfentrazone | Phenmedipham-Ethyl | Imazethapyr |
| Carfentrazone | Phenmedipham-Ethyl | Sulfentrazone |
| Carfentrazone | Phenmedipham-Ethyl | Flucarbazone-Sodium |
| Carfentrazone | Phenmedipham-Ethyl | Bensulfuron |
| Carfentrazone | Phenmedipham-Ethyl | Halosulfuron |
| Carfentrazone | Phenmedipham-Ethyl | Metsulfuron |
| Carfentrazone | Phenmedipham-Ethyl | Metazachlor |
| Carfentrazone | Phenmedipham-Ethyl | Metazachlor |
| Carfentrazone | Phenmedipham-Ethyl | Pinoxaden |
| Carfentrazone | Atrazine | Imazamox |
| Carfentrazone | Atrazine | Imazapic |
| Carfentrazone | Atrazine | Imazapyr |
| Carfentrazone | Atrazine | Imazethapyr |
| Carfentrazone | Atrazine | Sulfentrazone |
| Carfentrazone | Atrazine | Flucarbazone-Sodium |
| Carfentrazone | Atrazine | Bensulfuron |
| Carfentrazone | Atrazine | Halosulfuron |
| Carfentrazone | Atrazine | Metsulfuron |
| Carfentrazone | Atrazine | Metazachlor |
| Carfentrazone | Atrazine | Pinoxaden |
| Carfentrazone | Bentazon | Imazamox |
| Carfentrazone | Bentazon | Imazapic |
| Carfentrazone | Bentazon | Imazapyr |
| Carfentrazone | Bentazon | Imazethapyr |
| Carfentrazone | Bentazon | Sulfentrazone |
| Carfentrazone | Bentazon | Flucarbazone-Sodium |
| Carfentrazone | Bentazon | Bensulfuron |
| Carfentrazone | Bentazon | Halosulfuron |
| Carfentrazone | Bentazon | Metsulfuron |
| Carfentrazone | Bentazon | Metazachlor |
| Carfentrazone | Bentazon | Pinoxaden |
| Carfentrazone | Metamitron | Imazamox |
| Carfentrazone | Metamitron | Imazapic |
| Carfentrazone | Metamitron | Imazapyr |
| Carfentrazone | Metamitron | Imazethapyr |
| Carfentrazone | Metamitron | Sulfentrazone |
| Carfentrazone | Metamitron | Flucarbazone-Sodium |
| Carfentrazone | Metamitron | Bensulfuron |
| Carfentrazone | Metamitron | Halosulfuron |
| Carfentrazone | Metamitron | Metsulfuron |
| Carfentrazone | Metamitron | Metazachlor |
| Carfentrazone | Metamitron | Pinoxaden |
| Carfentrazone | Metribuzin | Imazamox |
| Carfentrazone | Metribuzin | Imazapic |
| Carfentrazone | Metribuzin | Imazapyr |
| Carfentrazone | Metribuzin | Imazethapyr |
| Carfentrazone | Metribuzin | Sulfentrazone |
| Carfentrazone | Metribuzin | Flucarbazone-Sodium |
| Carfentrazone | Metribuzin | Bensulfuron |
| Carfentrazone | Metribuzin | Halosulfuron |
| Carfentrazone | Metribuzin | Metsulfuron |
| Carfentrazone | Metribuzin | Metazachlor |
| Carfentrazone | Metribuzin | Pinoxaden |
| Carfentrazone | Diuron | Imazamox |
| Carfentrazone | Diuron | Imazapic |
| Carfentrazone | Diuron | Imazapyr |
| Carfentrazone | Diuron | Imazethapyr |
| Carfentrazone | Diuron | Sulfentrazone |
| Carfentrazone | Diuron | Flucarbazone-Sodium |
| Carfentrazone | Diuron | Bensulfuron |
| Carfentrazone | Diuron | Halosulfuron |
| Carfentrazone | Diuron | Metsulfuron |
| Carfentrazone | Diuron | Metazachlor |
| Carfentrazone | Diuron | Pinoxaden |
| Carfentrazone | Linuron | Imazamox |

-continued

| Triazolone Herbicide | Photosystem II Inhibitor | Third Herbicide |
| --- | --- | --- |
| Carfentrazone | Linuron | Imazapic |
| Carfentrazone | Linuron | Imazapyr |
| Carfentrazone | Linuron | Imazethapyr |
| Carfentrazone | Linuron | Sulfentrazone |
| Carfentrazone | Linuron | Flucarbazone-Sodium |
| Carfentrazone | Linuron | Bensulfuron |
| Carfentrazone | Linuron | Halosulfuron |
| Carfentrazone | Linuron | Metsulfuron |
| Carfentrazone | Linuron | Metazachlor |
| Carfentrazone | Linuron | Pinoxaden |

In an embodiment, the present invention may provide a combination comprising the three herbicides as listed in the table above.

In an embodiment, the present invention may provide a composition comprising the three herbicides as listed in the table above, and at least one agrochemically acceptable excipient.

These combinations may be applied to the locus of the weeds, in an herbicidally effective amount.

In an embodiment, the combination of the present invention may be combined with at least another active ingredient such as those selected from but not limited to herbicide, insecticide, fungicide, biological agent, plant growth activator, fertilizers or combinations thereof.

Thus, in an embodiment, the combination of the present invention may be combined with another herbicide. Exemplary herbicides that may be combined with the combination of the present invention may be selected from but not limited to herbicides belonging to classes such as EPSP synthase inhibitors, synthetic auxins, auxin transport inhibitors, glutamate synthase inhibitors, HPPD inhibitors, lipid synthesis inhibitors, long chain fatty acid inhibitors, as well as herbicides with unknown modes of action. Such herbicides include, but not limited to, topramezone, orthosulfamuron, pinoxaden, metamifop, pyrimisulfan, tembotrione, thiencarbazone methyl, flucetosulfuron, aminopyralid, pyrasulfotole, saflufenacil, pyroxsulam, pyroxasulfone, pyraclonil, indaziflam, fenquinotrione, florpyrauxifen-benzyl, tiafenacil, cinmethylin, lancotrione-sodium, bixlozone, trifludimoxazin, cyclopyrimorate, methiozolin, aminocyclopyrachlor, metazosulfuron, ipfencarbazone, fenoxasulfone, bicyclopyrone, triafamone, halauxifen methyl, tolpyralate or combinations thereof.

In an embodiment, the total amount of triazolone herbicide in the composition is in the range of 0.1 to 99% by weight, preferably 0.2 to 90% by weight.

In an embodiment, the application of triazolone herbicide is in the range 50 g to 1000 g ai/ha.

In an embodiment, the application of triazolone herbicide is in the range 50 g to 500 g ai/ha.

In an embodiment, the total amount of photosystem II inhibitor in the composition may be in the range of 0.1 to 99% by weight, preferably 0.2 to 90% by weight.

In an embodiment, the total amount of ALS inhibitor in the composition may be in the range of 0.1 to 99% by weight.

In an embodiment, the total amount of chlorophyll and heme biosynthesis inhibitor in the composition may be in the range of 0.1 to 99% by weight.

In an embodiment, the constituent herbicides of the combination of the present invention may be admixed in ratio of (1-80):(1-80):(1-80) of the three herbicides respectively.

The herbicidal combination of the present invention maybe used to target weeds among the crops such as corn, rice, wheat, barley, rye, oat, sorghum, cotton, soybean, peanut, buckwheat, beet, rapeseed, sunflower, sugar cane, tobacco, etc.; vegetables: solanaceous vegetables such as eggplant, tomato, pimento, pepper, potato, etc., cucurbit vegetables such as cucumber, pumpkin, zucchini, water melon, melon, squash, etc., cruciferous vegetables such as radish, white turnip, horseradish, kohlrabi, Chinese cabbage, cabbage, leaf mustard, broccoli, cauliflower, etc., asteraceous vegetables such as burdock, crown daisy, artichoke, lettuce, etc., liliaceous vegetables such as green onion, onion, garlic, and asparagus, ammiaceous vegetables such as carrot, parsley, celery, parsnip, etc., chenopodiaceous vegetables such as spinach, Swiss chard, etc., lamiaceous vegetables such as *Perilla frutescens*, mint, basil, etc, strawberry, sweet potato, *Dioscorea japonica*, colocasia, etc., flowers, foliage plants, turf grasses, fruits: pome fruits such apple, pear, quince, etc, stone fleshy fruits such as peach, plum, nectarine, Prunus mume, cherry fruit, apricot, prune, etc., citrus fruits such as orange, lemon, rime, grapefruit, etc., nuts such as chestnuts, walnuts, hazelnuts, almond, pistachio, cashew nuts, macadamia nuts, etc. berries such as blueberry, cranberry, blackberry, raspberry, etc., grape, kaki fruit, olive, plum, banana, coffee, date palm, coconuts, etc., trees other than fruit trees; tea, mulberry, flowering plant, trees such as ash, birch, dogwood, Eucalyptus, Ginkgo biloba, lilac, maple, Quercus, poplar, Judas tree, *Liquidambar formosana*, plane tree, zelkova, Japanese arborvitae, fir wood, hemlock, juniper, Pinus, Picea, and *Taxus cuspidate*, etc.

In one preferred embodiment, the crop plant is selected from the group consisting of cereals, rice, maize, sorghum, sugar cane, cotton, canola, turf, cereals, barley, potato, sweet potato, sunflower, rye, oats, wheat, corn, soybean, sugar beet, tobacco, safflower, tomato, alfalfa, pineapple and cassava.

In an embodiment, the composition of the present invention may contain agriculturally acceptable adjuvants, carriers, diluents, emulsifiers, fillers, anti-foaming agents, thickening agents, anti-freezing agents, freezing agents etc. The compositions may be either solid or liquids. They can be solids, such as, for example, dusts, granules, water-dispersible granules, microcapsules or wettable powders, or liquids, such as, for example, emulsifiable concentrates, solutions, emulsions or suspensions, ZC formulations. They can also be provided as a pre-mix or tank mixed.

Suitable agricultural adjuvants and carriers may include, but are not limited to, crop oil concentrates; methylated seed oils, emulsified methylated seed oil, nonylphenol ethoxylate; benzylcocoalkyldimethyl quaternary ammonium salt; blend of petroleum hydrocarbon, alkyl esters, organic acid, and anionic surfactant; C9-C11 alkylpolyglycoside; phosphated alcohol ethoxylate; natural primary alcohol (C12-C16) ethoxylate; di-sec-butylphenol EO-PO block copolymer; polysiloxane-methyl cap; nonylphenol ethoxylate, urea ammonium nitrate; tridecyl alcohol (synthetic) ethoxylate (8EO); tallow amine ethoxylate; PEG(400) dioleate-99, alkyl sulfates, such as diethanolammonium lauryl sulfate; alkylarylsulfonate salts, such as calcium dodecylbenzene-sulfonate; alkylphenol-alkylene oxide addition products, such as nonylphenol-$C_{18}$ ethoxylate; alcohol-alkylene oxide addition products, such as tridecyl alcohol-$C_{16}$ ethoxylate; soaps, such as sodium stearate; alkyl-naphthalene-sulfonate salts, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryl trimethylammonium chloride; polyethylene glycol esters of fatty acids, such as polyethylene glycol stearate; block copolymers of ethylene oxide and propylene oxide; salts of mono and dialkyl phosphate esters; vegetable or seed oils such as soybean oil, rapeseed/canola oil, olive oil, castor oil, sunflower seed oil, coconut oil, corn oil, cottonseed oil, linseed oil, palm oil, peanut oil, safflower oil, sesame oil, tung oil and the like; and esters of the above vegetable oils, and in certain embodiments, methyl esters.

Suitable liquid carriers that may be employed in a composition of the present invention may include water or organic solvents. The organic solvents include, but are not limited to, petroleum fractions or hydrocarbons such as mineral oil, aromatic solvents, paraffinic oils, and the like; vegetable oils such as soybean oil, rapeseed oil, olive oil, castor oil, sunflower seed oil, coconut oil, corn oil, cottonseed oil, linseed oil, palm oil, peanut oil, safflower oil, sesame oil, tung oil and the like; esters of the above vegetable oils; esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl succinate, di-butyl adipate, di-octyl phthalate and the like; esters of mono, di and polycarboxylic acids and the like. Organic solvents include, but are not limited to toluene, xylene, petroleum naphtha, crop oil, acetone, methyl ethyl ketone, cyclohexanone, trichloroethylene, perchloroethylene, ethyl acetate, amyl acetate, butyl acetate, propylene glycol monomethyl ether and diethylene glycol monomethyl ether, methyl alcohol, ethyl alcohol, isopropyl alcohol, amyl alcohol, ethylene glycol, propylene glycol, glycerine, N-methyl-2-pyrrolidinone, N,N-dimethyl alkylamides, dimethyl sulfoxide.

Solid carriers that may be employed in the compositions of the present invention may include but are not limited to attapulgite, pyrophyllite clay, silica, kaolin clay, kieselguhr, chalk, diatomaceous earth, lime, calcium carbonate, bentonite clay, Fuller's earth, talc, cottonseed hulls, wheat flour, soybean flour, pumice, wood flour, walnut shell flour, lignin, cellulose etc.

The formulations mentioned can be prepared in a manner known per se, for example by mixing the active ingredients with at least one customary extender. According to the present invention the combination may be a composition itself, the final used composition is usually prepared by mixing the compounds of the interest, and a carrier, and if necessary, by adding a surfactant and/or another auxiliary for formulation, such as an extender, and by formulating the mixture into desired form.

According to the present invention form of compositions such as the following can be used: encapsulated suspension, dispersible concentrate, emulsifiable concentrate, emulsion of water in oil, emulsion of oil in water, microemulsion, concentrated suspension, suspicion-emulsion, soluble granules, soluble concentrate, soluble powder, tablet, tablet for direct application, tablet for dissolution in water, tablet for dispersion in water, dispersible granules, wettable powder, block, concentrated gel in paste, emulsifiable gel, water soluble gel, emulsifiable granule, emulsifiable powder, oil dispersion or suspension concentrated in oil, dispersible or miscible suspension concentrated in oil, miscible solution in oil, powder dispersible in oil, encapsulated granules, dry powder, liquid for electrostatic/electrodynamic spraying, granules, oil for spray/spreading, ultra-low volume suspension, ultra-low volume, microgranules, fine powder, fine granules, contact powder, tablet for direct application, liquid or contact gel, concentrated suspension for direct application, other liquids for direct application, other powders, powder for dry treatment of seeds, emulsion for treatment of seeds, concentrated suspension for treatment of seeds, solution for treatment of seeds, soluble powder for treatment of seeds, powder for preparation of paste in oil, powder for preparation of paste in water, encapsulated suspension for treatment of seeds, gel for treatment of seeds, aerosol, fumigant, fumigant insert, fumigant candle, fumigant cartridge, fumigant rod, fumigant tablet, fumigant granule, liquefied gas under pressure, gas generator, concentrate for thermonebulization, concentrate for cold nebulization, lacquer, vegetable rod, paste, bait, bait grains, block bait, granulated bait, bait in plates, bait in scraps, steam producer, oily paste, formulated bag, adjuvant, spreader and adhesive spreader.

Other exemplary additives which can be used in the compositions provided herein include, but not limited to, at least one compatibilizers, antifoaming agents, sequestering agents, neutralizing agents and buffers, corrosion inhibitors, coloring agents, odorants, spreading agents, permeation aids, fixing agents, dispersants, thickeners, freezing point depressants, anti-microbial agents etc.

In another aspect, the present compositions further comprise at least one adjuvant or at least one safener.

In an embodiment, the combinations of the present invention may be applied to the locus either simultaneously or sequentially, such that the three herbicides may be applied in a tank mix or as a pre-mixed composition.

Thus, in this aspect, the present invention provides a tank-mix combination comprising:

(a) at least one triazolone herbicide selected from amicarbazone, bencarbazone, carfentrazone, flucarbazone, ipfencarbazone, propoxycarbazone, sulfentrazone, or thiencarbazone;

(b) at least a photosystem II inhibitor selected from the group consisting of (i) a phenylcarbamate herbicide; (ii) a triazine herbicide; (iii) a triazinone herbicide; (iv) an uracil herbicide; (v) a benthiadiazole herbicide; (vi) a nitrile herbicide; and (vii) an urea herbicide; and (c) at least a third herbicide selected from a 4-(4-hydroxyphenyl-pyruvate dioxygenase) HPPD inhibitor, bleaching inhibitor, cell division inhibitor, PPO inhibitor, ALS inhibitor, microtubule assembly inhibitor, or a cellulose biosynthesis inhibitor.

In an embodiment, the present invention may further comprise at least one safener and may be applied either pre or post emergent. The advantage of the combination is surprisingly good residual effects, when applied in pre-emergent as well as quick knockdown when applied post emergent leading to quick control of weeds. In another embodiment, the present invention may be applied for quick burndown of weeds. Another advantage is quick knockdown in the case of burndown.

In particular embodiments, a synergistic effect of the compound combinations or compositions according to the invention is present on a target weed, either pre- or post-emergent.

The method of control of the present invention may be carried out by spraying the suggested tank mixes, or the individual herbicides may be formulated as a kit-of-parts containing various components that may be mixed as instructed prior to spraying.

The present invention also refers to a method of application of the synergistic herbicide compositions that is the object of the present invention for combating weeds in plantations.

This method comprises the following steps:

A) selecting an area of an agricultural plantation;

B) applying a sufficiently effective quantity of the herbicide composition of the present invention or the herbicide product of the present invention to each plant or the environment.

This composition may be applied to any vegetable part of the plants present in the crop directly or by allowing the compounds to act in the environment. The application of the composition or the ready product can occur in various ways, such as immersion, spraying, evaporation, mist, applying directly to the seeds and also applying directly to the soil, to parts of leaves, and to straw on the soil among other possibilities.

The target weeds may be selected from *Alopecurus myosuroides* Huds. (blackgrass, ALOMY), *Amaranthus palmeri* (Palmer amaranth, AMAPA) *Amaranthus viridis* (slender amaranth, AMAVI), *Avena fatua* (wild oat, AVEFA), *Brachiaria decumbens* Stapf. or *Urochloa decumbens* (Stapf), *Brachiaria brizantha* or *Urochloa brizantha*, *Brachiaria platyphylla* (Groseb.) Nash or *Urochloa platyphylla* (broadleaf signalgrass, BRAPP), *Brachiaria plantaginea*, or *Urochloa plantaginea* (alexandergrass, BRAPL), *Cenchrus echinatus* (southern sandbur, CENEC), *Digitaria horizontalis* Willd. (Jamaican crabgrass, DIGHO), *Digitaria insularis* (sourgrass, TRCIN), *Digitaria sanguinalis* (large crabgrass, DIGSA), *Echinochloa crus-galli* (barnyardgrass, ECHCG), *Echinochloa colonum* (junglerice, ECHCO), *Eleusine indica* Gaertn. (goosegrass, ELEIN), *Lolium multiflorum* Lam. (Italian ryegrass, LOLMU), *Panicum dichotomiflorum* Michx. (fall panicum, PANDI), *Panicum miliaceum* L. (wild-proso millet, PANMI), *Sesbania exaltata* (hemp sesbania, SEBEX), *Setaria faberi* Herrm. (giant foxtail, SETFA), *Setaria viridis* (green foxtail, SETVI), *Sorghum halepense* (Johnsongrass, SORHA), *Sorghum bicolor*, Moench ssp., *Arundinaceum* (shattercane, SORVU), *Cyperus esculentus* (yellow nutsedge, CYPES), *Cyperus rotundus* (purple nutsedge, CYPRO), *Abutilon theophrasti* (velvetleaf, ABUTH), *Amaranthus* species (pigweeds and amaranths, AMASS), *Ambrosia artemisiifolia* L. (common ragweed, AMBEL), *Ambrosia psilostachya* DC. (western ragweed, AMBPS), *Ambrosia trifida* (giant ragweed, AMBTR), *Anoda cristata* (spurred anoda, ANVCR), *Asclepias syriaca* (common milkweed, ASCSY), *Bidens pilosa* (hairy beggarticks, BIDPI), *Borreria species* (BOISS), *Borreria alata* or *Spermacoce alata* Aubl. or *Spermacoce latifolia* (broadleaf buttonweed, BOILF), *Chenopodium album* L. (common lambsquarters, CHEAL), *Cirsium arvense* (Canada thistle, CIRAR), *Commelina benghalensis* (tropical spiderwort, COMBE), *Datura stramonium* (jimsonweed, DATST), *Daucus carota* (wild carrot, DAUCA), *Euphorbia heterophylla* (wild poinsettia, EPHHL), *Euphorbia hirta* or *Chamaesyce hirta* (garden spurge, EPHHI), *Euphorbia dentata* Michx. (toothed spurge, EPHDE), *Erigeron bonariensis* or *Conyza bonariensis* (hairy fleabane, ERIBO), *Erigeron canadensis* or *Conyza canadensis* (horseweed, ERICA), *Conyza sumatrensis* (tall fleabane, ERIFL), *Helianthus annuus* (common sunflower, HELAN), *Jacquemontia tamnifolia* (smallflower morningglory, IAQTA), *Ipomoea hederacea* (ivyleaf morningglory, IPOHE), *Ipomoea lacunosa* (white morningglory, IPOLA), *Lactuca serriola* (prickly lettuce, LACSE), *Portulaca oleracea* (common purslane, POROL), *Richardia* species (pusley, RCHSS), *Salsola tragus* (Russian thistle, SASKR), *Sida* species (sida, SIDSS), *Sida spinosa* (prickly sida, SIDSP), *Sinapis arvensis* (wild mustard, SINAR), *Solanum ptychanthum* (eastern black nightshade, SOLPT), *Tridax procum-*

*bens* (coat buttons, TRQPR), *Rumex dentatus* (RUMDE) or *Xanthium strumarium* (common cocklebur, XANST).

In another embodiment, the weed is selected from crabgrass complex (*Digitaria horizontalis, Digitaria nuda* and others), guinea grass (*Panicum maximum*), Surinam grass (*Brachiaria decumbens*), morning glories (*Ipomoea grandifolia, Ipomoeanil, Ipomoea quamoclit, Ipomoea purpurea, Ipomoea hederifolia, Merremia cissoides* and *Merremia aegypta*), beggar-ticks (*Bidens pilosa*), Java grass or purple nut sedge (*Cyperus rotundus* and *Cyperus* spp), Indian goosegrass or crowfoot grass (*Eleusine indica*), southern sandbur (*Cenchrus echinatus*), velvet bean or mucuna (*Mucuna pruriens*), wild poinsettia or milkweed (*Euphorbia heterophylla*), Paraguayan starbur (*Acanthospermum australe*), Slender amaranth (*Amaranthus viridis*), Alexandergrass (*Brachiaria plantaginea*), Benghal dayflower (*Commelina benghalensis*), Lilac tasselflower (*Emilia sonchifolia*), Wild poinsettia or milkweed (*Euphorbia heterophylla*), Gallant soldier (*Galinsoga parviflora*), Purslane or pigweed (*Portulaca oleracea*), Brazilian calla-lily or Brazil pusley (*Richardia brasiliensis*), Flannel weed (*Sida cordifolia*), Southern sida (*Sida glaziovii*), Southern sida (*Sida rhombifolia*), Buttonweed or broad-leaved buttonweed (*Spermacoce latifólia*).

In one preferred embodiment, the weed is selected from the group consisting of *Amaranthus, Cyperus* and, *Brachiaria decumbens, Cenchrus echinatus, Eleusine indica, Digitaria insularis, Ipomoea grandifolia, Euphorbia heterophylla, Commelina benghalensis, Amaranthus viridis, Amaranthus spinosus, Acalypha indica, Commelina communis, Digera arvensis, Euphorbia geniculate, Portulaca oleracea, Parthenium hysterophrous, Phyllanthus maderaspatnesis, Bracchiria* spp, *Dactyloctenium ageptisian* and *Echinochloa colonum*.

In another embodiment, the method of application of a herbicide combination comprising the following steps:

a) selecting an area of an agricultural crop;

b) applying a sufficiently effective quantity of said product to the plants and/or directly to the environment/location/soil.

In another embodiment, the composition is applied as a pre-emergence treatment or a post-emergence treatment. In preferred embodiment, the composition is contacted at an application rate of from 0.01 kg/ha to 10 kg/ha to the crop.

In another embodiment, present invention provides use of herbicide combinations or compositions of the present invention for the preparation of a herbicide product to be used in combating weeds present in agricultural crops.

Typically use of combinations/compositions of the present invention provides synergistic control of one or more weeds.

In an embodiment, the present invention provides a kit-of-parts comprising a plurality of components, wherein said plurality of components comprises:

(a) at least one triazolone herbicide selected from amicarbazone, bencarbazone, carfentrazone, flucarbazone, ipfencarbazone, propoxycarbazone, sulfentrazone, or thiencarbazone;

(b) at least a photosystem II inhibitor selected from the group consisting of (i) a phenylcarbamate herbicide; (ii) a triazine herbicide; (iii) a triazinone herbicide; (iv) an uracil herbicide; (v) a benthiadiazole herbicide; (vi) a nitrile herbicide; and (vii) an urea herbicide; and (c) at least a third herbicide selected from a 4-(4-hydroxyphenyl-pyruvate dioxygenase) HPPD inhibitor, bleaching inhibitor, cell division inhibitor, PPO inhibitor, ALS inhibitor, microtubule assembly inhibitor, or a cellulose biosynthesis inhibitor.

In an embodiment, the kit-of-parts comprises an instructions manual, said instructions manual comprising instructions directing a user to admix the components before being used.

In an embodiment, the components of the present invention may be packaged such that the photosystem II inhibitor, the ALS inhibitor and the chlorophyll and heme biosynthesis inhibitor may be packaged separately and then tank mixed before the spraying.

In another embodiment, the components of the present invention may be packaged such that the triazolone herbicide, photosystem II inhibitor, at least a third herbicide may be packaged separately, whereas other additives are packaged separately, such that the two maybe tank mixed at the time of spraying.

In another embodiment, the components of the present invention may be packaged as composition such that the the triazolone herbicide, photo system II inhibitor, at least a third herbicide are formulated into one composition and other additives are packaged separately, such that the two maybe tank mixed at the time of spraying.

The herbicidal compositions of the present disclosure can be in any conventional agriculturally useful form. They can be solids, such as, for example, dusts, granules, water-dispersible granules, microcapsules or wettable powders, or liquids, such as, for example, emulsifiable concentrates, solutions, emulsions or suspensions, ZC formulations. They can also be provided for example, in the form of a ready-to-use formulation, or in the form of a tank mix.

In an aspect, the individual components of the combination of the present invention may be applied to the locus either simultaneously or sequentially, and the co-herbicide may be applied in a tank mix or as a pre-mixed composition.

In an embodiment for tank mixing, the formulation of combination of herbicides is mixed in a tank prior to application, in the appropriate ratio to provide the targeted weight ratio of the active ingredients.

In one embodiment, the herbicidal compositions of the present disclosure are tank mixes.

The rates of application of the composition, or tank-mixed separately formulated active ingredients, will vary according to prevailing conditions such as targeted volunteer crop weeds, degree of infestation, weather conditions, soil conditions, crop species, mode of application, and application time.

In an embodiment, the application rates of present composition can be between 1 and 5000 g/ha, but preferably between 5 and 1000 g/ha.

The herbicidal product described above is herbicidally efficacious.

The present invention provides a method of controlling unwanted plants, said method comprising applying to the unwanted plants or to their locus a herbicidally effective amount of compositions according to the present invention.

Mode of application of agrochemicals depends upon the selectivity and the mode of action of the active ingredient. PPI application is usually done for volatile active ingredients.

Surprisingly, it has been found by the present inventors, that the triazolone herbicide, photosystem II inhibitor, at least a third herbicide of the present invention, when applied individually, was ineffective in the control of weeds, but demonstrated excellent synergistic control on when applied together. The combination controlled the weed both pre and post emergently. As will be demonstrated by the examples, the combination of herbicides synergistically controlled broadleaf as well as grasses and sedges at a locus. The current invention therefore provides advantageous methods of controlling weeds both pre and post emergently. The present method also provides a broader spectrum of controlling weeds that helps in resistance management, thus preventing the weed from becoming resistant to either of the herbicides while providing a broader spectrum of control at lower use rates.

An exemplary combination according to the invention was used for sedge and broadleaf weed control for agricultural crops, turf, ornamentals, and landscape. The exemplary combination for the post-emergence control of sedges, as well as the control/suppression of various broadleaf and grassy weeds.

EXAMPLE 1

A field trial was conducted to evaluate effectiveness of the combinations of three active ingredients according to the invention when used post emergence, at different rates, compared to industry standards—stand alone and 2 way mixture molecules for efficacy of yellow nutsedge. The active ingredient combination used in the trial was bentazon+halosulfuron+sulfentrazone. The trial was conducted in Blacksburg, VA and was initiated on June 6 under given protocol. The plots were in fallow area primarily covered with yellow nutsedge and tall fescue and were sprayed at 4 week intervals. (2 applications total). The application dosages of the herbicides, when used in isolation and when used in the combinations were as follows:

| S No. | Combination | Concentration used | Formulation type | Rate |
|---|---|---|---|---|
| 1 | Bentazon (PSII) | 4 lb/gal | L | 0.375 oz ai/ 1000 sq ft |
| 2 | Sulfentrazone (Triazolone) | 4.16 lb/gal | L | 0.048 oz ai/ 1000 sq ft |
| 3 | Halosulfuron-methyl (ALS) | 75% | SC | 0.024 oz ai/ 1000 sq ft |
| 4 | Bentazon + Halosulfuron-methyl + Sulfentrazone | 4 lb/gal + 75% SC + 4.16 lb/gal | L | 0.125 + 0.008 + 0.016 oz ai/1000 sq ft |

The following results were noted from these trials:

| S No. | Herbicide used | Dosage | Yellow nut sedge at 29 DAT (Percentage Control) | | |
|---|---|---|---|---|---|
| | | | 13/06 | 20/6 | 05/07 |
| 1 | Untreated | — | 0 | 0 | 0 |
| 2 | Bentazone | 1 X | 65 | 75 | 76 |
| 3 | Sulfentrazone | 1 X | 58 | 73 | 75 |
| 4 | Halosulfuron | 1 X | 36 | 60 | 81 |
| 5 | Bentazone + Sulfentrazone | 0.5X | 61 | 65 | 49 |
| 6 | Bentazone + Halosulfuron | 0.5X | 50 | 73 | 84 |
| 7 | Sulfentrazone + Halosulfuron | 0.5X | 48 | 65 | 85 |
| 8 | Bentazone + Sulfentrazone + Halosulfuron | 0.33X | 56 | 74 | 90 |

The percentage weed cover in these treatment trials were observed and tabulated as hereunder:

| S No. | Herbicide used | Dosage | Yellow nut sedge at 29 DAT (Percentage weed cover) 13/06 | 20/6 | 05/07 |
|---|---|---|---|---|---|
| 1 | Untreated | — | 50 | 49 | 59 |
| 2 | Bentazone | 1X | 40 | 8 | 10 |
| 3 | Sulfentrazone | 1X | 44 | 11 | 9 |
| 4 | Halosulfuron | 1X | 50 | 16 | 8 |
| 5 | Bentazone + Sulfentrazone | 0.5X | 43 | 16 | 21 |
| 6 | Bentazone + Halosulfuron | 0.5X | 38 | 10 | 5 |
| 7 | Sulfentrazone + Halosulfuron | 0.5X | 50 | 14 | 6 |
| 8 | Bentazone + Sulfentrazone + Halosulfuron | 0.33X | 53 | 7 | 3 |

It was thus found that the combination of Halosulfuron, Bentazon and Sulfentrazone at each rate, provided superior control of yellow nutsedge compared to each individual product and 2 way mixes. A clear rate response with the three-way combination was seen from low to high application rates. The three-way combination provided faster burn down and longer residual control. The use of this three-way combination, with three different modes of action, helped provide resistance management and superior weed control.

EXAMPLE 2

Field trials were done to evaluate the efficacy and synergism of the triple mixes of amicarbazone with other herbicides for the control of weeds in pre and post-emergence application.

The composition of the present invention was applied. This test was performed for species of weeds: Grasses namely BRADC=*Brachiaria decumbens*, CCHEC=*Cenchrus echinatus*, ELEIN=*Eleusine indica*, TRCIN=*Digitaria insularis* and Broadleaves namely IAQGR=*Ipomoea grandifolia*, EPHHL=*Euphorbia heterophylla*, COMBE=*Commelina benghalensis*. Data were collected at various period after application of the composition to the soil and calculated. The results of the tests performed are presented below tables.

TABLE 1

| Treatment Stage | *Brachiaria decumbens* (BRADC) Active | Dose g ai/ha | 7 DAA % Control | 21 DAA % Control | 28 DAA % Control |
|---|---|---|---|---|---|
| Post-Emergence | Untreated | — | 0.0 | 0.0 | 0.0 |
| | Amicarbazone (AMC) | 75 | 43.8 | 38.8 | 40.0 |
| | Isoxaflutole (IFT) | 15 | 66.3 | 65.0 | 68.8 |
| | Atrazine (ATZ) | 250 | 37.5 | 21.3 | 23.8 |
| | AMC + IFT + ATZ | 75 + 15 + 250 | 97.3 | 99.5 | 99.5 |
| Pre-Emergence | Untreated | — | 0.0 | 0.0 | 0.0 |
| | Amicarbazone | 75 | 0.0 | 0.0 | 0.0 |
| | Isoxaflutole | 15 | 86.3 | 53.8 | 50.0 |
| | Atrazine | 250 | 0.0 | 0.0 | 0.0 |
| | AMC + IFT + ATZ | 75 + 15 + 250 | 90.5 | 86.3 | 80.3 | g of i.a./ha—grams of active ingredient per hectare
DAA: days after application

TABLE 2

| Treatment Stage | *Cenchrus echinatus* (CCHEC) Active | Dose g ai/ha | 7 DAA % Control | 28 DAA % Control | 35 DAA % Control |
|---|---|---|---|---|---|
| Post-Emergence | Untreated | — | 0.0 | 0.0 | 0.0 |
| | Amicarbazone | 75 | 33.8 | 40.0 | 36.3 |
| | Isoxaflutole | 15 | 68.8 | 91.3 | 93.3 |
| | Atrazine | 250 | 47.5 | 26.3 | 23.8 |
| | AMC + IFT + ATZ | 75 + 15 + 250 | 92.3 | 100.0 | 100.0 |

TABLE 3

| Treatment Stage | *Ipomoea grandifolia* (IAQGR) Active | Dose g ai/ha | 14 DAA % Control | 21 DAA % Control | 28 DAA % Control |
|---|---|---|---|---|---|
| Pre-Emergence | Untreated | — | 0.0 | 0.0 | 0.0 |
| | Amicarbazone | 75 | 11.3 | 0.0 | 0.0 |
| | Isoxaflutole | 15 | 15.0 | 0.0 | 0.0 |
| | Atrazine | 250 | 0.0 | 0.0 | 0.0 |
| | AMC + IFT + ATZ | 75 + 15 + 250 | 43.8 | 52.5 | 42.5 |

TABLE 4

| Treatment Stage | *Ipomoea grandifolia* Active | Dose g ai/ha | 7 DAA % Control | 14 DAA % Control | 28 DAA % Control |
|---|---|---|---|---|---|
| Pre-Emergence | Untreated | — | 0.0 | 0.0 | 0.0 |
| | Amicarbazone (AMC) | 250 | 18.8 | 73.8 | 86.5 |
| | Clomazone (CMZ) | 250 | 57.5 | 41.3 | 39.5 |
| | Diuron (DRN) | 250 | 10.0 | 0.0 | 0.0 |
| | AMC + CMZ + DRN | 250 + 250 + 250 | 73.0 | 94.5 | 98.0 |

TABLE 5

| Treatment Stage | *Brachiaria decumbens* Active | Dose g ai/ha | 21 DAA % Control | 28 DAA % Control | 35 DAA % Control |
|---|---|---|---|---|---|
| Post-Emergence | Untreated | — | 0.0 | 0.0 | 0.0 |
| | Amicarbazone (AMC) | 250 | 25.0 | 16.3 | 13.8 |
| | Clomazone | 250 | 71.3 | 63.8 | 61.3 |
| | Diuron | 250 | 81.3 | 75.0 | 76.3 |
| | AMC + CMZ + DRN | 250 + 250 + 250 | 100.0 | 100.0 | 100.0 |
| Pre-Emergence | Untreated | — | 0.0 | 0.0 | 0.0 |
| | Amicarbazone | 250 | 63.8 | 50.0 | 46.3 |
| | Clomazone | 250 | 89.5 | 86.5 | 86.3 |
| | Diuron | 250 | 0.0 | 0.0 | 0.0 |
| | AMC + CMZ + DRN | 250 + 250 + 250 | 99.5 | 98.8 | 97.5 |

TABLE 6

| *Cenchrus echinatus* | | | 21 DAA | 28 DAA | 35 DAA |
|---|---|---|---|---|---|
| Treatment Stage | Active | Dose g ai/ha | % Control | % Control | % Control |
| Post-Emergence | Untreated | — | 0.0 | 0.0 | 0.0 |
| | Amicarbazone (AMC) | 250 | 0.0 | 0.0 | 0.0 |
| | Sulfentrazone (STZ) | 150 | 86.3 | 83.8 | 82.5 |
| | Diuron (DRN) | 250 | 38.8 | 35.0 | 28.8 |
| | AMC + STZ + DRN | 250 + 150 + 250 | 96.3 | 92.5 | 90.0 |
| Pre-Emergence | Untreated | — | 0.0 | 0.0 | 0.0 |
| | Amicarbazone | 250 | 7.5 | 5.0 | 3.3 |
| | Sulfentrazone | 150 | 17.5 | 13.8 | 9.5 |
| | Diuron | 250 | 0.0 | 0.0 | 0.0 |
| | AMC + STZ + DRN | 250 + 150 + 250 | 50.0 | 40.0 | 34.5 |

TABLE 7

| *Euphorbia heterophylla* | | | 7 DAA | 14 DAA | 21 DAA |
|---|---|---|---|---|---|
| Treatment Stage | Active | Dose g ai/ha | % Control | % Control | % Control |
| Pre-Emergence | Untreated | — | 0.0 | 0.0 | 0.0 |
| | Amicarbazone | 250 | 3.8 | 28.8 | 56.3 |
| | Sulfentrazone | 150 | 0.0 | 10.0 | 17.5 |
| | Diuron | 250 | 0.0 | 0.0 | 0.0 |
| | AMC + STZ + DRN | 250 + 150 + 250 | 23.8 | 63.8 | 78.3 |

TABLE 8

| *Eleusine indica* | | | 14 DAA | 21 DAA | 28 DAA |
|---|---|---|---|---|---|
| Treatment Stage | Active | Dose g ai/ha | % Control | % Control | % Control |
| Post-Emergence | Untreated | — | 0.0 | 0.0 | 0.0 |
| | Amicarbazone | 250 | 13.8 | 16.3 | 13.8 |
| | Sulfentrazone | 150 | 70.0 | 63.8 | 55.0 |
| | Diuron | 250 | 53.8 | 35.0 | 30.0 |
| | AMC + STZ + DRN | 250 + 150 + 250 | 92.8 | 95.0 | 91.3 |
| Pre-Emergence | Untreated | — | 0.0 | 0.0 | 0.0 |
| | Amicarbazone | 250 | 68.8 | 92.0 | 87.0 |
| | Sulfentrazone | 150 | 93.3 | 96.5 | 92.0 |
| | Diuron | 250 | 0.0 | 0.0 | 0.0 |
| | AMC + STZ + DRN | 250 + 150 + 250 | 98.0 | 99.5 | 99.5 |

TABLE 9

| *Digitaria insularis* | | | 21 DAA | 28 DAA | 35 DAA |
|---|---|---|---|---|---|
| Treatment Stage | Active | Dose g ai/ha | % Control | % Control | % Control |
| Post-Emergence | Untreated | — | 0.0 | 0.0 | 0.0 |
| | Amicarbazone (AMC) | 75 | 7.5 | 1.3 | 0.5 |
| | S-metolachlor (MTS) | 300 | 0.0 | 0.0 | 0.0 |
| | Atrazine (ATZ) | 250 | 21.3 | 13.8 | 7.5 |

TABLE 9-continued

| *Digitaria insularis* | | | 21 DAA | 28 DAA | 35 DAA |
|---|---|---|---|---|---|
| Treatment Stage | Active | Dose g ai/ha | % Control | % Control | % Control |
| | AMC + MTS + ATZ | 75 + 300 + 250 | 67.5 | 60.0 | 55.0 |

TABLE 10

| *Eleusine indica* | | | 14 DAA | 21 DAA | 28 DAA |
|---|---|---|---|---|---|
| Treatment Stage | Active | Dose g ai/ha | % Control | % Control | % Control |
| Post-Emergence | Untreated | — | 0.0 | 0.0 | 0.0 |
| | Amicarbazone (AMC) | 75 | 0.0 | 0.0 | 0.0 |
| | Mesotrione (MST) | 38 | 57.5 | 43.8 | 35.0 |
| | Ametryn (AME) | 250 | 53.8 | 27.5 | 22.5 |
| | AMC + AME + MST | 75 + 38 + 250 | 95.3 | 93.8 | 93.8 |
| Pre-Emergence | Untreated | — | 0.0 | 0.0 | 0.0 |
| | Amicarbazone | 75 | 0.0 | 0.0 | 0.0 |
| | Mesotrione | 38 | 26.3 | 2.5 | 0.0 |
| | Ametryn | 250 | 51.3 | 42.5 | 35.0 |
| | AMC + AME + MST | 75 + 38 + 250 | 78.8 | 80.8 | 81.3 |

TABLE 11

| *Commelina benghalensis* | | | 21 DAA | 28 DAA | 35 DAA |
|---|---|---|---|---|---|
| Treatment Stage | Active | Dose g ai/ha | % Control | % Control | % Control |
| Pre-Emergence | Untreated | — | 0.0 | 0.0 | 0.0 |
| | Amicarbazone | 75 | 8.8 | 7.3 | 6.8 |
| | Mesotrione | 38 | 67.5 | 65.0 | 51.3 |
| | Ametryn | 250 | 15.0 | 8.8 | 2.5 |
| | AMC + AME + MST | 75 + 38 + 250 | 95.5 | 95.0 | 95.0 |

As can be concluded from the results presented above, the synergy between the compounds present in the composition that is the object of the present invention is confirmed for several proportions.

We claim:

1. A synergistic herbicidal combination for the control of weeds in agricultural crops consisting of:

a ternary mixture of active ingredients selected from the group consisting of:

a mixture of amicarbazone, isoxaflutole and atrazine, a mixture of amicarbazone, clomazone and diuron, a mixture of amicarbazone, S-metolachlor and atrazine, a mixture of amicarbazone, sulfentrazone and diuron, and a mixture of amicarbazone, mesotrione and ametryn;

wherein the herbicidal combination provides synergistic control of one or more weeds.

2. The combination as claimed in claim 1, wherein said amicarbazone is present in a quantity ranging from 1.0% to 99.0%, by weight of total combination.

3. A method for controlling undesirable weeds, comprising contacting a crop plant or a non-crop area in need of weed control or at risk of undesirable weeds with the herbicidal combination of claim 1.

4. The method as claimed in claim 3, wherein the crop plant is selected from the group consisting of cereals, rice, maize, sorghum, sugar cane, cotton, canola, turf, barley, potato, sweet potato, sunflower, rye, oats, wheat, corn, soybean, sugar beet, tobacco, safflower, tomato, alfalfa, pineapple, and cassava.

5. A method of application of the herbicidal combination as claimed in claim 1, comprising selecting an area of an agricultural crop; and applying a sufficiently effective quantity of said herbicidal combination to plants in the area and/or directly to an environment or a location or a soil in the area.

6. The method as claimed in claim 5, wherein the herbicidal combination is applied as a pre-emergence treatment or a post-emergence treatment.

7. The method as claimed in claim 5, wherein the herbicidal combination is applied at an application rate of from 0.01 kg/ha to 10 kg/ha to the crop.

8. The herbicidal combination as claimed in claim 1, wherein the weed is selected from the group consisting of *Amaranthus, Cyperus* and, *Brachiaria decumbens, Cenchrus echinatus, Eleusine indica, Digitaria insularis, Ipomoea grandifolia, Euphorbia heterophylla, Commelina benghalensis, Amaranthus viridis, Amaranthus spinosus, Acalypha indica, Commelina communis, Digera arvensis, Euphorbia geniculate, Portulaca oleracea, Parthenium hysterophrous, Phyllanthus maderaspatnesis, Bracchiria* spp, *Dactyloctenium ageptisian* and *Echinochloa colonum.*

9. The method as claimed in claim 3, wherein said amicarbazone is applied in a range of 50 to 1000 g ai/ha for the control of the weeds.

* * * * *